United States Patent
Xie et al.

(10) Patent No.: US 10,192,236 B2
(45) Date of Patent: Jan. 29, 2019

(54) METHODS AND SYSTEMS FOR AUTOMATICALLY GENERATING ADVERTISEMENTS

(71) Applicant: Guangzhou Kuaizi Information Technology Co., Ltd., Guangzhou, Guangdong (CN)

(72) Inventors: Tongling Xie, Guangdong (CN); Haiyang Wu, Guangdong (CN); Shaohui Li, Guangdong (CN); Winder Chen, Guangdong (CN)

(73) Assignee: Guangzhou Kuaizi Information Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/741,268

(22) PCT Filed: Jun. 15, 2017

(86) PCT No.: PCT/CN2017/088473
§ 371 (c)(1),
(2) Date: Dec. 31, 2017

(87) PCT Pub. No.: WO2017/219911
PCT Pub. Date: Dec. 28, 2017

(65) Prior Publication Data
US 2018/0189823 A1 Jul. 5, 2018

(30) Foreign Application Priority Data

Jun. 23, 2016 (CN) .......................... 2016 1 0482162
Jun. 23, 2016 (CN) .......................... 2016 1 0482164
(Continued)

(51) Int. Cl.
*G06Q 30/00* (2012.01)
*G06Q 30/02* (2012.01)

(52) U.S. Cl.
CPC ..... *G06Q 30/0244* (2013.01); *G06Q 30/0241* (2013.01); *G06Q 30/0243* (2013.01); *G06Q 30/0246* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 2002/0010757 A1* | 1/2002 | Granik | ............. G06F 17/30876 709/218 |
| 2006/0247981 A1* | 11/2006 | Singh | ................ G06F 17/30864 705/14.71 |

(Continued)

FOREIGN PATENT DOCUMENTS

| | | |
|---|---|---|
| CN | 102208083 A | 10/2011 |
| CN | 105046527 A | 11/2015 |

(Continued)

OTHER PUBLICATIONS

International Search Report in PCT/CN2017/088473 dated Sep. 15, 2017, 4 pages.
(Continued)

Primary Examiner — Matthew T Sittner
(74) Attorney, Agent, or Firm — Metis IP LLC

(57) ABSTRACT

A system and method for generating advertisement automatically are provided. The system may comprise at least one computer-readable storage medium including a set of instructions; at least one processor in communication with the at least one computer-readable storage medium, wherein when executing the set of instructions, the at least one processor is configured to cause the system to generate a first plurality of ads, the first plurality of ads including a first plurality of advertisement elements and a first plurality of information components; transmit, via a network, the first plurality of ads to a first group of user terminals; determine (Continued)

at least one of a click-through rate, a number of impressions, or a conversion rate for the first plurality of ads; and analyze the at least one of the click-through rate, the number of impressions, or the conversion rate of the first plurality of ads.

20 Claims, 21 Drawing Sheets

(30) Foreign Application Priority Data

Jun. 23, 2016 (CN) .......................... 2016 1 0482221
Jun. 23, 2016 (CN) .......................... 2016 1 0485383

(56) References Cited

U.S. PATENT DOCUMENTS

| | | | |
|---|---|---|---|
| 2008/0040221 A1* | 2/2008 | Wiseman | G06Q 30/02 705/14.54 |
| 2008/0086362 A1* | 4/2008 | Lee | G06Q 30/02 705/14.54 |
| 2008/0140502 A1 | 6/2008 | Birnholz et al. | |
| 2008/0243592 A1* | 10/2008 | Song | G06Q 30/02 705/14.71 |
| 2008/0256018 A1* | 10/2008 | Chaudhury | G06F 17/30675 |
| 2010/0030647 A1* | 2/2010 | Shahshahani | G06Q 30/02 705/14.66 |
| 2010/0274669 A1* | 10/2010 | Carlson | G06Q 30/0261 705/14.58 |
| 2011/0197220 A1 | 8/2011 | Rowe et al. | |
| 2011/0246285 A1* | 10/2011 | Ratnaparkhi | G06Q 30/00 705/14.42 |
| 2011/0276388 A1* | 11/2011 | Deng | G06Q 30/02 705/14.41 |
| 2012/0042025 A1* | 2/2012 | Jamison | G06Q 10/107 709/206 |
| 2012/0054004 A1* | 3/2012 | Priyadarshan | G06Q 30/02 705/14.4 |
| 2012/0078720 A1* | 3/2012 | Pappas | G06F 8/38 705/14.55 |
| 2012/0084141 A1* | 4/2012 | Quinn | G06Q 30/0244 705/14.43 |
| 2013/0211909 A1* | 8/2013 | Tanaka | G06Q 30/0246 705/14.45 |
| 2013/0226711 A1* | 8/2013 | Wu | G06Q 30/02 705/14.69 |
| 2013/0339126 A1 | 12/2013 | Cui et al. | |
| 2014/0129959 A1* | 5/2014 | Battles | G06F 3/0484 715/751 |
| 2014/0372203 A1* | 12/2014 | Powell | G06Q 30/0243 705/14.42 |
| 2015/0039416 A1* | 2/2015 | Sullivan | G06Q 30/0244 705/14.43 |
| 2015/0058136 A1* | 2/2015 | Jain | G06O 30/0269 705/14.66 |
| 2015/0248484 A1* | 9/2015 | Yu | G06F 17/30867 707/711 |
| 2015/0302472 A1* | 10/2015 | Zhang | G06Q 30/02 705/14.52 |
| 2015/0379569 A1* | 12/2015 | Li | G06Q 30/0256 705/14.52 |
| 2016/0148276 A1* | 5/2016 | O'Kelley | G06Q 30/0275 705/14.42 |
| 2016/0180441 A1* | 6/2016 | Hasan | G06Q 30/0631 705/26.7 |
| 2016/0275572 A1* | 9/2016 | Omachi | G06Q 30/0277 |

FOREIGN PATENT DOCUMENTS

| | | |
|---|---|---|
| CN | 105678584 A | 6/2016 |
| CN | 105894337 A | 8/2016 |
| CN | 105976203 A | 9/2016 |
| CN | 106202188 A | 12/2016 |
| CN | 106204099 A | 12/2016 |
| CN | 106204102 A | 12/2016 |

OTHER PUBLICATIONS

Written Opinion in PCT/CN2017/088473 dated Sep. 15, 2017, 5pages.
Extended European Search Report in European Application No. 17814649.4 dated Apr. 5, 2018, 8 pages.

* cited by examiner

METHODS AND SYSTEMS FOR AUTOMATICALLY GENERATING ADVERTISEMENTS

CROSS-REFERENCE TO RELATED APPLICATION

This application is a U.S. national stage of International Application No. PCT/CN2017/088473, filed on Jun. 15, 2017, which claims priority of Chinese Patent Application No. 201610482221.6 filed on Jun. 23, 2016, Chinese Application No. 201610482162.2 filed on Jun. 23, 2016, Chinese Application No. 201610485383.5 filed on Jun. 23, 2016, and Chinese Application No. 201610482164.1 filed on Jun. 23, 2016, the entire contents of each of which are hereby incorporated by reference.

TECHNICAL FIELD

The present disclosure generally relates to methods and systems for providing information for an online advertisement service, and in particular, to methods and systems for generating one or more advertisements and dispatching the one or more advertisements to one or more users.

BACKGROUND

An advertisement, such an internet advertisement, may include some image and background related to a product or service. It is desirable to provide systems and method for automatically generating advertisements and dispatching the advertisements to the end users.

SUMMARY

In one aspect of the present disclosure, a system is provided. The system may include at least one computer-readable storage medium including a set of instructions and at least one processor in communication with the at least one computer-readable storage medium. When executing the set of instructions, the at least one processor may be configured to cause the system to: generate a first plurality of ads, the first plurality of ads including a first plurality of advertisement elements and a first plurality of information components; transmit, via a network, the first plurality of ads to a first group of user terminals; determine at least one of a click-through rate, a number of impressions, or a conversion rate for the first plurality of ads; and analyze the at least one of the click-through rate, the number of impressions, or the conversion rate of the first plurality of ads.

In some embodiments, the at least one processor may be further configured to cause the system to generate a second plurality of ads based, at least in part, on a result of the analysis of the at least one of the click-through rate, the number of impressions, or the conversion rate of the first plurality of ads.

In some embodiments, to generate the first plurality of ads, the at least one processor may be further configured to cause the system to: obtain the first plurality of advertisement elements; and generate at least one of the first plurality of ads according to two of the obtained first plurality of advertisement elements.

In some embodiments, to obtain the first plurality of advertisement elements, the at least one processor may be further configured to: cause the system to segment one or more pre-existing ads; and obtain at least one of the first plurality of advertisement elements based on the segmentation of the one or more pre-existing ads.

In some embodiments, the plurality of information components include a plurality of images, and the at least one processor may be further configured to cause the system to: obtain a number of impressions of the first plurality of ads; determine, for each of the first plurality of advertisement elements, a click-through rate; determine, for each of the first plurality of images, a click-through rate; and determine a number of impressions of at least one of the first plurality of images based on click-through rates of the first plurality of advertisement elements, click-through rates of the first plurality of images, and the number of impressions of the first plurality of ads.

In some embodiments, to determine the number of impressions of the at least one of the plurality of images, the at least one processor may be further configured to cause the system to: determine a weight of the at least one of the first plurality of images, the weight being a ratio of a click-through rate of the at least one of the first plurality of images to a click-through rate of an advertisement element including the at least one of the first plurality of images; determine a total weight of the first plurality of images, the total weight being a sum of weights of the first plurality of images; and determine the number of impressions of the at least one of the first plurality of images based on the weight of the at least one of the first plurality of images and the total weight of the first plurality of images.

In some embodiments, the determining the at least one of the click-through rate, the number of impressions, or the conversion rate of the first plurality of ads may include: determining the at least one of the click-through rate, the number of impressions, or the conversion rate for of the first plurality of ads being displayed within a pre-determined time period.

In some embodiments, to analyze the at least one of the click-through rate, the number of impressions, or the conversion rate of the first plurality of ads, the at least one processor may be further configured to cause the system to: determine a number of clicks of each of the first plurality of ads; determine a number of clicks of each of the first plurality of information components; determine an average number of clicks of the first plurality of information components; determine whether the average number of clicks of the first plurality of information components; and in response to the determination the average number of clicks is greater than a threshold, analyze the number of clicks of each of the first plurality of ads and the number of clicks of each of the first plurality of information components to obtain an analysis result.

In some embodiments, the analysis result may include at least one of: a ranking of the first plurality of ads or an analysis of the first plurality of information components. In some embodiments, the threshold may be 300.

In some embodiments, to analyze the at least one of the click-through rate, the number of impressions, or the conversion rate of the first plurality of ads, the at least one processor may be further configured to cause the system to: determine at least one of a click-through rate, a number of impressions or a conversion rate of the first plurality of information components according to the at least one of the click-through rate, the number of impressions or the conversion rate of the first plurality of ads; and rank the first plurality of ads or the first plurality of information components according to the at least one of the click-through rate, the number of impressions or the conversion rate of the first plurality of ads and the at least one of the click-through rate, the number of impressions or the conversion rate of the first plurality of information components.

In some embodiments, the at least one processor may be further configured to cause the system to: assign a weight to the at least one of the click-through rate, the number of impressions or the conversion rate of the first plurality of ads to generate at least one of a weighted click-through rate, a weighted number of impressions, or a weighted conversion rate of the first plurality of ads; determine a sum of the at least one of the weighted click-through rate, the weighted number of impressions, or the weighted conversion rate; and rank the first plurality of ads according to the sum of the at least one of the weighted click-through rate, the weighted number of impressions, or the weighted conversion rate.

In some embodiments, the at least one processor may be further configured to cause the system to: assign a weight to the at least one of the click-through rate, the number of impressions or the conversion rate of the first plurality of information components to generate at least one of a weighted click-through rate, a weighted number of impressions, or a weighted conversion rate of the first plurality of information components; determine a sum of the at least one of the weighted click-through rate, the weighted number of impressions, or the weighted conversion rate of the first plurality of information components; and rank the plurality of information components according to the sum of the at least one of the weighted click-through rate, the weighted number of impressions, or the weighted conversion rate of the first plurality of information components.

In some embodiments, the plurality of information components may include at least one of an image, a text, or a video.

In some embodiments, to analyze the at least one of the click-through rate, the number of impressions, or the conversion rate of the first plurality of ads, the at least one processor may be further configured to cause the system to: determine a click-through rate of the first plurality of information components according to the click-through rate of the first plurality of ads; determine a label of at least one of the first plurality of information components; and determine a click-through rate of the label according to the click-through rate of the first plurality of information components.

In some embodiments, to determine the label of the at least one of the first plurality of information components, the at least one processor may be further configured to cause the system to: acquire an identifier of the at least one of the first plurality of information components; determine a physical attribute of the at least one of the first plurality of information components according to the identifier; determine a position of the at least one of the first plurality of information components in an ad; and, determine the label of the at least one of the first plurality of information components based on the physical attribute and the position.

In some embodiments, the physical attribute of the information component may include an area ratio of the at least one of the first plurality of information components in the ad, a color of the at least one of the first plurality of information components, a number of models included in the at least one of the first plurality of information components, a race of a model, a gender of a model included in the at least one of the first plurality of information components, or a package of a product included in the at least one of the first plurality of information components.

In some embodiments, the at least one processor may be further configured to cause the system to: determine a label in an advertisement element level; and, determine a click-through of the label in the advertisement element level.

In some embodiments, wherein to determine the label in the advertisement element level, the at least one processor may be further configured to cause the system to: generate a first label related to physical attributes of an advertisement element; and generate a second label related to cultural attributes of the advertisement element.

In another aspect of the present disclosure, a system for generating one or more ads is provided. The system may include at least one computer-readable storage medium including a set of instructions; at least one processor in communication with the at least one computer-readable storage medium. When executing the set of instructions, the at least one processor may be configured to cause the system to: access a database including a plurality of advertisement elements, each of the plurality of advertisement elements including at least one information component; access a plurality of advertisement templates, each of the plurality of advertisement templates including at least one advertisement region, the at least advertisement corresponding to an advertisement element; receive an ad generation request for generating one or more ads; obtain one or more advertisement templates for the one or more ads to be generated according to the plurality of advertisement templates and the ad generation request; insert one or more information components into the one or more advertisement template; and, rate the one or more ads based on the one or more advertisement templates inserted with the one or more information components.

In some embodiments, the at least one processor is further configured to cause the system to: determine one or more size groups based on a plurality of advertisement slots; obtain one or more layout templates based on the one or more size groups; obtain a plurality of advertisement elements according to the one or more layout templates; and, determine the one or more advertisement templates based on the plurality of advertisement elements and the one or more layout templates.

In some embodiments, the ad generation request includes an image as an information component to be generated, and the at least one processor may be further configured to cause the system to: determine one or more size scaling ratios of the image; determine one or more spatial compression ratios of the image; and, generate one or more processed images for the image as the information component to be generated according to the determined one or more size scaling ratios and the determined one or more spatial compression ratios.

In yet another aspect of the present disclosure, a system for dispatching advertisement is provided. The system may include at least one computer-readable storage medium including a set of instructions; at least one processor in communication with the at least one computer-readable storage medium. When executing the set of instructions, the at least one processor is configured to cause the system to: receive, via a network, a request for displaying an ad at a user terminal, the request including ad information, the ad information including at least one of: keyword information, size information of one or more advertisement slots on a web page, and a trigger condition for displaying an ad at the user terminal, wherein the keyword information includes information related to one or more keywords entered at the user terminal; obtain an ad, the ad being generated in response to the request; and, dispatch, via the network, the generated ad to the user terminal.

In some embodiments, the request may include the keyword information, and the keyword information may include information related to one or more keywords entered at the user terminal, and to obtain the ad generated to in response to the request, the at least one processor may be configured to cause the system to: determine one or more labels based on the keywords; determine a plurality of candidate ads based on the on one or more labels; determine a matching probability of at least one of the plurality of candidate ads being associated with the one or more labels; and, determine the ad among the plurality of candidate ads based on the matching probability.

In some embodiments, the request may include the size information of one or more advertisement slots on the web page, and to obtain the ad generated to in response to the request, the at least one processor may be configured to cause the system to: determine an aspect ratio for each of the one or more advertisement slots; obtain a plurality of layout templates; determine an aspect ratio for each of the plurality of layout templates; for the each of the plurality layout template, determine a similarity ratio between the layout template and the one or more advertisement slots according to the aspect ratios of the one or more advertisement slots and the aspect ratios of the plurality layout templates; determine a target layout template based on the similarity ratios; and generate the ad based on the determined target layout template.

In some embodiments, the request may include a trigger condition, and to obtain the ad generated to in response to the request, the at least one processor may be configured to cause the system to determine the ad based on the trigger condition and a relationship between an advertisement design of the ad and the trigger condition.

In some embodiments, the relationship between the advertisement design of the ad and the trigger condition may be determined by a process, including: obtaining an advertising design; decomposing the advertisement design into a plurality of advertisement elements; determining one or more images for each of the advertisement elements; and determining the relationship according to the trigger condition for the one or more images.

In yet another aspect of the present disclosure, a system for analyzing advertisement performance is provided. The system may include at least one computer-readable storage medium including a set of instructions; at least one processor in communication with the at least one computer-readable storage medium. When executing the set of instructions, the at least one processor is configured to cause the system to: determine at least one of: a click-through rate of a plurality of ads, a number of impressions of the plurality of ads, or a conversion rate of the plurality of ads; and analyze the at least one of: the click-through rate of the plurality of ads, the number of impressions of the plurality of ads, or the conversion rate of the plurality of ads.

In some embodiments, the plurality of ads may include a plurality of information components, and the at least one processor may be further configured to cause the system to: determine a click-through rate of each of the plurality of information components according to the click-through rate of the plurality of ads; determine a label of at least one of the plurality of information components; and, determine a click-through rate of the label of the at least one of the plurality of information components according to the click-through rate of each of the plurality of information components.

In some embodiments, one of the plurality of ads may include an information component, and the at least one processor may be further configured to cause the system to: determine a physical attribute of the information component; determine a position of the information component in the one of the plurality of the plurality of ads; and, generate a label of the information component based on the physical attribute and the position of the information component.

In yet another aspect of the present disclosure, a method implemented on a computing device having at least one processor, at least one computer-readable storage medium, and a communication platform connected to a network is provided. The method may include: generating a first plurality of ads, the first plurality of ads including a first plurality of advertisement elements and a first plurality of information components; transmitting, via a network, the first plurality of ads to a first group of user terminals; determining at least one of a click-through rate, a number of impressions, or a conversion rate for the first plurality of ads; and analyzing the at least one of the click-through rate, the number of impressions, or the conversion rate of the first plurality of ads.

In some embodiments, the method may further include generating a second plurality of ads based, at least in part, on a result of the analysis of the at least one of the click-through rate, the number of impressions, or the conversion rate of the first plurality of ads.

In some embodiments, the generating the first plurality of ads may include: obtaining the first plurality of advertisement elements; and generating at least one of the first plurality of ads according to two of the obtained first plurality of advertisement elements.

In some embodiments, the obtaining the first plurality of advertisement elements may include: segmenting one or more pre-existing ads; and obtaining at least one of the first plurality of advertisement elements based on the segmentation of the one or more pre-existing ads.

In some embodiments, the plurality of information components includes a plurality of images, and the method may further include: obtaining a number of impressions of the first plurality of ads; determining, for each of the first plurality of advertisement elements, a click-through rate; determining, for each of the first plurality of images, a click-through rate; and determining a number of impressions of at least one of the first plurality of images based on click-through rates of the first plurality of advertisement elements, click-through rates of the first plurality of images, and the number of impressions of the first plurality of ads.

In some embodiments, the determining the number of impressions of the at least one of the plurality of images may include: determining a weight of the at least one of the first plurality of images, the weight being a ratio of a click-through rate of the at least one of the first plurality of images to a click-through rate of an advertisement element including the at least one of the first plurality of images; determining a total weight of the first plurality of images, the total weight being a sum of weights of the first plurality of images; and, determining the number of impressions of the at least one of the first plurality of images based on the weight of the at least one of the first plurality of images and the total weight of the first plurality of images.

In some embodiments, the determining the at least one of the click-through rate, the number of impressions, or the conversion rate for of the first plurality of ads may include determining the at least one of the click-through rate, the number of impressions, or the conversion rate for of the first plurality of ads being displayed within a pre-determined time period.

In some embodiments, the analyzing the at least one of the click-through rate, the number of impressions, or the conversion rate of the first plurality of ads, may include: determining a number of clicks of each of the first plurality of ads; determining a number of clicks of each of the first plurality of information components; determining an average number of clicks of the first plurality of information components; determining whether the average number of clicks of the first plurality of information components; and in response to the determination the average number of clicks is greater than a threshold, analyzing the number of clicks of each of the first plurality of ads and the number of clicks of each of the first plurality of information components to obtain an analysis result.

In some embodiments, the analysis result may include at least one of a ranking of the first plurality of ads or an analysis of the first plurality of information components. In some embodiments, the threshold is 300.

In some embodiments, the analyzing the at least one of the click-through rate, the number of impressions, or the conversion rate of the first plurality of ads, may include: determining at least one of a click-through rate, a number of impressions or a conversion rate of the first plurality of information components according to the at least one of the click-through rate, the number of impressions or the conversion rate of the first plurality of ads; and ranking the first plurality of ads or the first plurality of information components according to the at least one of the click-through rate, the number of impressions or the conversion rate of the first plurality of ads and at least one of the click-through rate, the number of impressions or the conversion rate of the first plurality of information components.

In some embodiments, the method may further include: assigning a weight to the at least one of the click-through rate, the number of impressions or the conversion rate of the first plurality of ads to generate at least one of a weighted click-through rate, a weighted number of impressions, or a weighted conversion rate of the first plurality of ads; determining a sum of the at least one of the weighted click-through rate, the weighted number of impressions, or the weighted conversion rate; and ranking the first plurality of ads according to the sum of the at least one of the weighted click-through rate, the weighted number of impressions, or the weighted conversion rate.

In some embodiments, the method may further include: assigning a weight to the at least one of the click-through rate, the number of impressions or the conversion rate of the first plurality of information components to generate at least one of a weighted click-through rate, a weighted number of impressions, or a weighted conversion rate of the first plurality of information components; determining a sum of the at least one of the weighted click-through rate, the weighted number of impressions, or the weighted conversion rate of the first plurality of information components; and ranking the plurality of information components according to the sum of the at least one of the weighted click-through rate, the weighted number of impressions, or the weighted conversion rate of the first plurality of information components.

In some embodiments, the plurality of information components may include at least one of an image, a text, or a video.

In some embodiments, the analyzing the at least one of the click-through rate, the number of impressions, or the conversion rate of the first plurality of ads, may include: determining a click-through rate of the first plurality of information components according to the click-through rate of the first plurality of ads; determining a label of at least one of the first plurality of information components; and determining a click-through rate of the label according to the click-through rate of the first plurality of information components.

In some embodiments, the determining the label of the at least one of the first plurality of information components may include: acquiring an identifier of the at least one of the first plurality of information components; determining a physical attribute of the at least one of the first plurality of information components according to the identifier; determining a position of the at least one of the first plurality of information components in an ad; and determining the label of the at least one of the first plurality of information components based on the physical attribute and the position.

In some embodiments, the physical attribute of the information component may include an area ratio of the at least one of the first plurality of information components in the ad, a color of the at least one of the first plurality of information components, a number of models included in the at least one of the first plurality of information components, a race of a model, a gender of a model included in the at least one of the first plurality of information components, or a package of a product included in the at least one of the first plurality of information components.

In some embodiments, the method may further include: determining the label in an advertisement element level; and determining a click-through of the label in the advertisement element level.

In some embodiments, the determining the label in the advertisement element level may include: generating a first label related to physical attributes of an advertisement element; and generating a second label related to cultural attributes of the advertisement element.

In yet another aspect of the present disclosure, a method implemented on a computing device having at least one processor, at least one computer-readable storage medium, and a communication platform connected to a network is provided. The method may include: accessing a database including a plurality of advertisement elements, each of the plurality of advertisement elements including at least one information component; accessing a plurality of advertisement templates, each of the plurality of advertisement templates including at least one advertisement region, the at least advertisement corresponding to an advertisement element; receiving an ad generation request for generating one or more ads; obtaining one or more advertisement templates for the one or more ads to be generated according to the plurality of advertisement templates and the ad generation request; inserting one or more information components into the one or more advertisement template; and generating the one or more ads based on the one or more advertisement templates inserted with the one or more information components.

In some embodiments, the method may further include: determining one or more size groups based on a plurality of advertisement slots; obtaining one or more layout templates based on the one or more size groups; obtaining a plurality of advertisement elements according to the one or more layout templates; and determining the one or more advertisement templates based on the plurality of advertisement elements and the one or more layout templates.

In some embodiments, the ad generation request includes an image as an information component to be generated, and the method may further include: determining one or more size scaling ratios of the image; determining one or more spatial compression ratios of the image; and generating one or more processed images for the image as the information component to be generated according to the determined one or more size scaling ratios and the determined one or more spatial compression ratios.

In yet another aspect of the present disclosure, a method implemented on a computing device having at least one processor, at least one computer-readable storage medium, and a communication platform connected to a network is provided. The method may include: receiving a request for displaying an ad at a user terminal, the request including ad information, the ad information including at least one of: keyword information, size information of one or more advertisement slots on a web page, and a trigger condition for displaying an ad at the user terminal, wherein the keyword information includes information related to one or more keywords entered at the user terminal; obtaining an ad, the ad being generated in response to the request; and dispatching the generated ad to the user terminal.

In some embodiments, the method may further include: determining one or more labels based on the keywords; determining a plurality of candidate ads based on the on one or more labels; determining a matching probability of at least one of the plurality of candidate ads being associated with the one or more labels; and determining the ad among the plurality of candidate ads based on the matching probability.

In some embodiments, the request may include the size information of one or more advertisement slots on the web page, and the process may further include: determining an aspect ratio for each of the one or more advertisement slots; obtaining a plurality of layout templates; determining an aspect ratio for each of the plurality of layout templates; for the each of the plurality layout template, determining a similarity ratio between the layout template and the one or more advertisement slots according to the aspect ratios of the one or more advertisement slots and the aspect ratios of the plurality layout templates; determining a target layout template based on the similarity ratios; and generating the ad based on the determined target layout template.

In some embodiments, the request includes a trigger condition, and the method may further include determining the ad based on the trigger condition and a relationship between an advertisement design of the ad and the trigger condition.

In some embodiments, the relationship between the advertisement design of the ad and the trigger condition is determined by a process, the method may further include: obtaining an advertising design; decomposing the advertisement design into a plurality of advertisement elements; determining one or more images for each of the advertisement elements; and determining the relationship according to the trigger condition for the one or more images.

In yet another aspect of the present disclosure, a method implemented on a computing device having at least one processor, at least one computer-readable storage medium, and a communication platform connected to a network is provided. The method may include: determining at least one of: a click-through rate of a plurality of ads, a number of impressions of the plurality of ads, or a conversion rate of the plurality of ads; and analyzing the at least one of: the click-through rate of the plurality of ads, the number of impressions of the plurality of ads, or the conversion rate of the plurality of ads.

In some embodiments, the plurality of ads may include a plurality of information components, and the method may further include: determining a click-through rate of each of the plurality of information components according to the click-through rate of the plurality of ads; determining a label of at least one of the plurality of information components; and determining a click-through rate of the label of the at least one of the plurality of information components according to the click-through rate of each of the plurality of information components.

In some embodiments, one of the plurality of ads may include an information component, and the method may further include: determining a physical attribute of the information component determining a position of the information component in the one of the plurality of the plurality of ads; and generating a label of the information component based on the physical attribute and the position of the information component.

In yet another aspect of the present disclosure, a non-transitory computer readable medium embodying a computer program product is provided. The computer program product may include instructions configured to cause a computing device to: generate a first plurality of ads, the first plurality of ads including a first plurality of advertisement elements and a first plurality of information components; transmit, via a network, the first plurality of ads to a first group of user terminals; determine at least one of a click-through rate, a number of impressions, or a conversion rate for the first plurality of ads; and analyze the at least one of the click-through rate, the number of impressions, or the conversion rate of the first plurality of ads.

In yet another aspect of the present disclosure, a non-transitory computer readable medium embodying a computer program product is provided. The computer program product may include instructions configured to cause a computing device to: access a database including a plurality of advertisement elements, each of the plurality of advertisement elements including at least one information component; access a plurality of advertisement templates, each of the plurality of advertisement templates including at least one advertisement region, the at least advertisement corresponding to an advertisement element; receive an ad generation request for generating one or more ads; obtain one or more advertisement templates for the one or more ads to be generated according to the plurality of advertisement templates and the ad generation request; insert one or more information components into the one or more advertisement template; and generate the one or more ads based on the one or more advertisement templates inserted with the one or more information components.

In yet another aspect of the present disclosure, a non-transitory computer readable medium embodying a computer program product is provided. The computer program product may include instructions configured to cause a computing device to: receive a request for displaying an ad at a user terminal, the request including ad information, the ad information including at least one of: keyword information, size information of one or more advertisement slots on a web page, and a trigger condition for displaying an ad at the user terminal, wherein the keyword information includes information related to one or more keywords entered at the user terminal; obtain an ad, the ad being generated in response to the request; and dispatching the generated ad to the user terminal.

In yet another aspect of the present disclosure, a non-transitory computer readable medium embodying a computer program product is provided, the computer program product may include instructions configured to cause a computing device to: determine at least one of: a click-through rate of a plurality of ads, a number of impressions of the plurality of ads, or a conversion rate of the plurality of ads; and analyze the at least one of: the click-through rate of the plurality of ads, the number of impressions of the plurality of ads, or the conversion rate of the plurality of ads.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for purposes of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Figure 1:
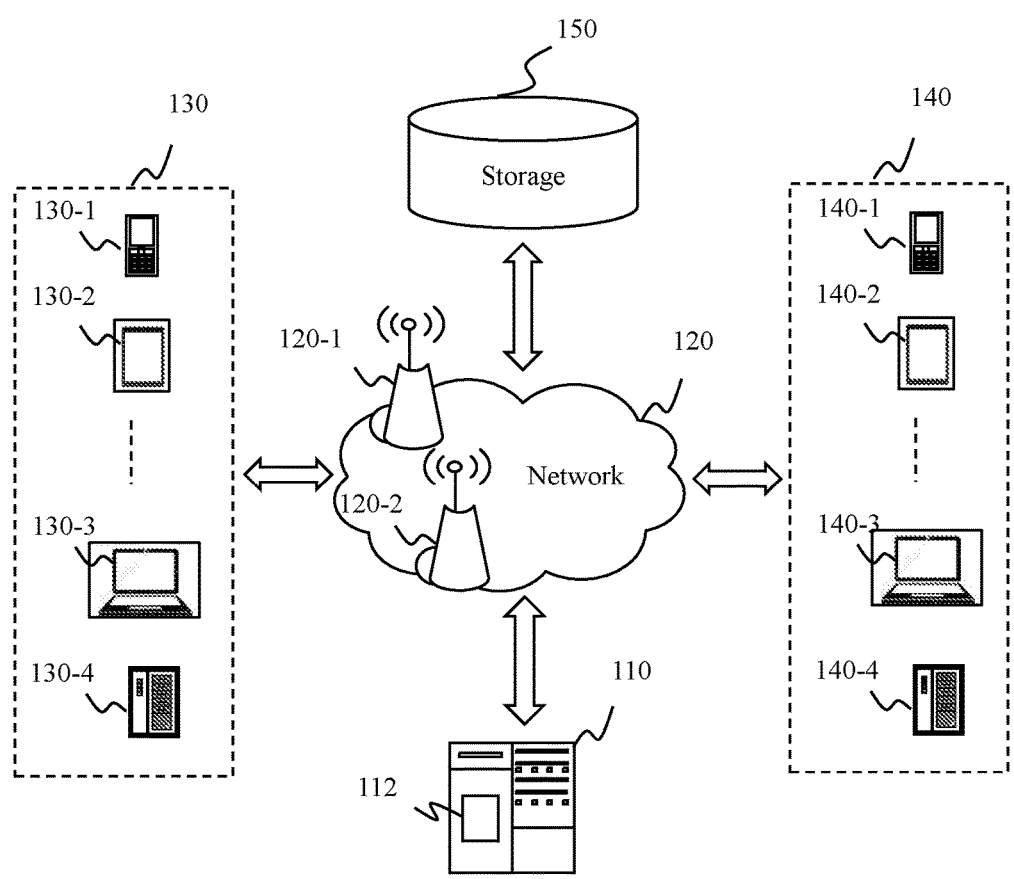
FIG. 1 illustrates an exemplary network environment of providing an online advertisement service according to some embodiments.

FIG. 1 illustrates an exemplary network environment of providing an online advertisement service system according to some embodiments. The online advertisement service system 100 may include a server 110, a network 120, an ad generation requester terminal 130, a user terminal 140, and a storage 150.

The server 110 may be a computer server. The server 110 may communicate with the ad generation requester terminal 130 and/or the user terminal 140 to provide the various functionality of an online advertisement service. In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the ad generation requester terminal 130, the user terminal 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to performing one or more functions described in the present disclosure. The processing engine 112 may analyze a request from an ad generation requester terminal 130. In some embodiments, the processing engine 112 may perform other functions (e.g., a web search, a map search, etc.) after determining the one or more segments. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing engine 112 may be implemented on CPU 220 of computing device 200 illustrated in FIG. 2.

The network 120 may facilitate exchange of information and/or data. In some embodiments, one or more components in the online advertisement service system 100 (e.g., the server 110, the ad generation requester terminal 130, the user terminal 140, the storage 150) may send information and/or data to other component(s) in the online advertisement service system 100 via the network 120. For example, the server 110 may access and/or obtain a plurality of advertisements or advertisement templates from the storage 150 via the network 120. For example, the server 110 may transmit the one or more advertisements or advertisement templates to the ad generation requester terminal 130. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, ..., through which one or more components of the online advertisement service system 100 may be connected to the network 120 to exchange data and/or information.

A user may input a text, an image, audio, or a video via the ad generation requester terminal 130 to initiate a request for generating an ad. The ad generation requester terminal 130 may transmit the text, image, audio, or video to the server 110 via the network 120. In some embodiments, the ad generation requester terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc.

The user terminal 140 may display one or more advertisements. The server 110 may transmit one or more advertisements to user terminal 140 via the network 120. In some embodiments, the user terminal 140 may include a mobile device 140-1, a tablet computer 140-2, a laptop computer 140-3, a built-in device in a vehicle 140-4, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 140-4 may include a built-in computer, a built-in onboard television, a built-in tablet, etc.

The storage 150 may store data and/or instructions. The data may include data related to advertisements, data related to advertisements components, data related to a plurality of click-through rate, data related to impression, etc.

In some embodiments, the storage 150 may store data and/or instructions that the server 110 may execute to provide the online advertisement services described in the present disclosure. In some embodiments, the storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, one or more components in the online advertisement service system 100 may access the data or instructions stored in the storage 150 via the network 120. In some embodiments, the storage 150 may be directly connected to the server 110 as a backend storage.

In some embodiments, one or more components in the online advertisement service system 100 (e.g., the server 110, the ad generation requester terminal 130, the user terminal 140, etc.) may have permissions to access the storage 150.

Figure 2:
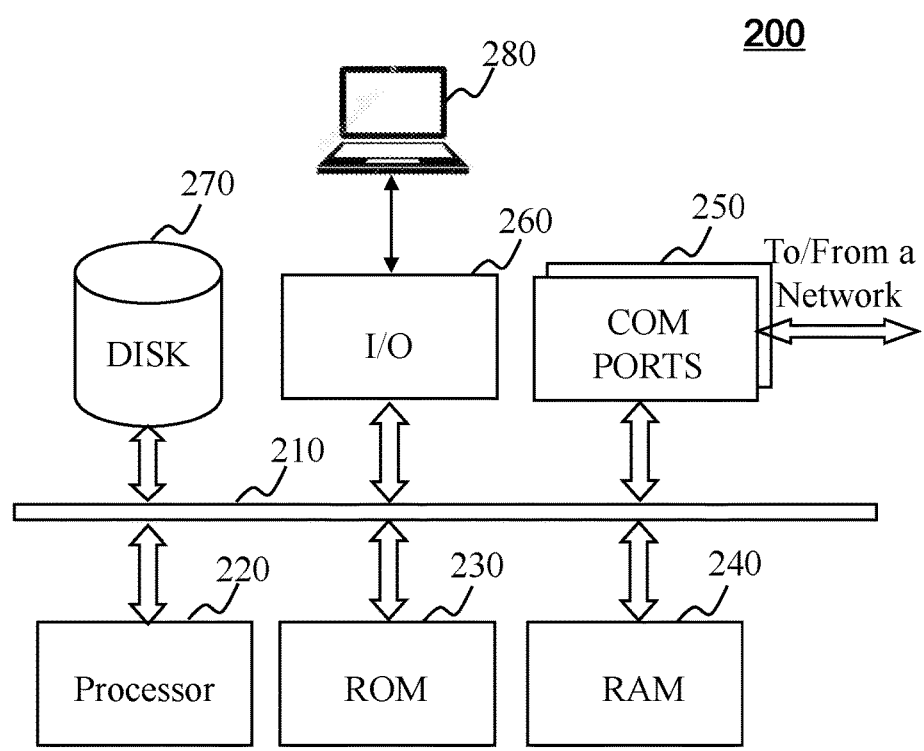
FIG. 2 illustrates an exemplary computing device according to some embodiments of the present disclosure.

FIG. 2 illustrates an exemplary computing device on which the online advertisement service system can be implemented, according to some embodiments of the present disclosure.

The computing device 200 may be a general-purpose computer or a special-purpose computer. Both may be used to implement an online advertisement service system of the present disclosure. The computing device 200 may be used to implement any component of the service as described herein. For example, the processing engine 112 of the server may be implemented on the computing device 200, via its hardware, software program, firmware, or a combination thereof. Although only one such computer is shown for convenience, the computer functions related to the service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a CPU 220, in the form of one or more processors, for executing program instructions. The exemplary computer platform may include an internal communication bus 210, program storage and data storage of different forms, for example, a disk 270, and a ROM 230, or a RAM 240, for various data files to be processed and/or transmitted by the computer. The exemplary computer platform may also include program instructions stored in the ROM 230, the RAM 240, and/or another type of non-transitory storage medium to be executed by the CPU 220. The methods and/or processes of the present disclosure may be implemented as the program instructions. The computing device 200 also includes an I/O component 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
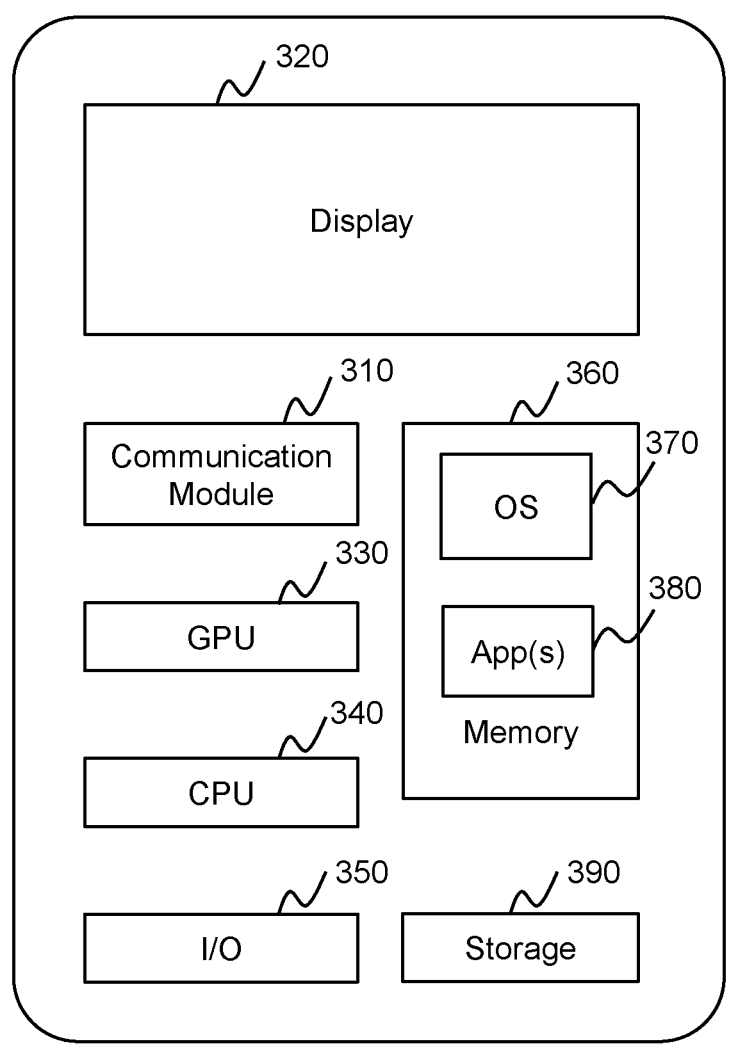
FIG. 3 illustrates an exemplary mobile device according to some embodiments of the present disclosure.

FIG. 3 illustrates an exemplary mobile device on which the online advertisement service can be implemented, according to some embodiments of the present disclosure.

As illustrated in FIG. 3, the mobile device 300 may include a communication module 310, a display 320, a graphic processing unit (GPU) 330, a CPU 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser, a map application, or any other suitable mobile apps for transmitting, receiving and presenting information relating to a service request from the processing engine 112 and/or the storage 150. User interactions with the information stream may be achieved via the I/O 350 and provided to the processing engine 112 and/or other components of the online advertisement service system 100 via the network 120.

Figure 4:
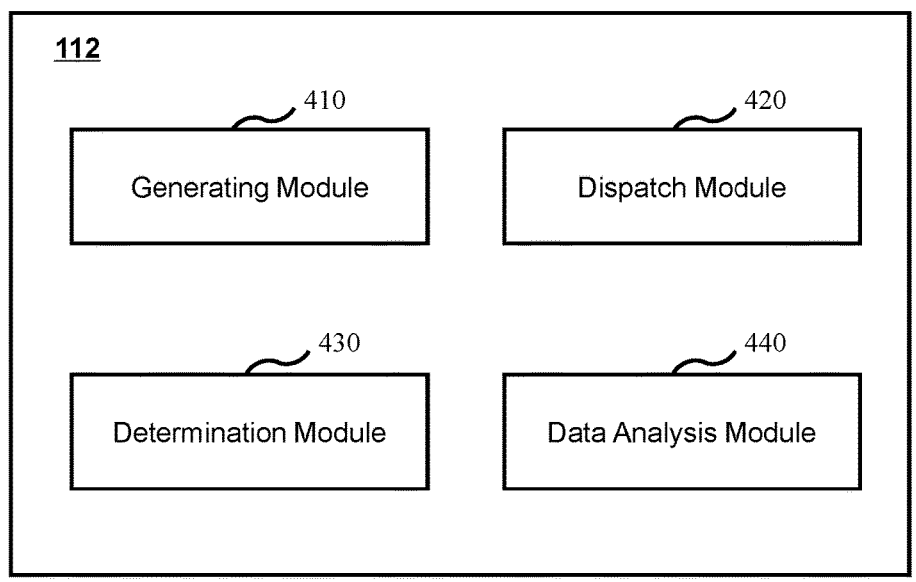
FIG. 4 illustrates an exemplary processing engine according to some embodiments of the present disclosure.

FIG. 4 illustrates an exemplary processing engine 112 according to some embodiments of the present disclosure. The processing engine 112 of the server 110 may include a generating module 410, a dispatch module 420, a determination module 430, and a data analysis module 440. One or more modules in the processing engine 112 may be implemented by at least one processor, such as the CPU 220.

The generating module 410 may generate a plurality of ads. An ad may include a plurality of advertisement elements. In some embodiments, an advertisement element may relate to a logo, a product, a model, a copywrite, a button, a background, an ornament, an industry classification, an industry subclassification, a business name, or the like, or a combination thereof. Merely by way of example, for an ad of a lipstick, the ad may include four advertisement elements relating to logos, products, copywrite, and/or models. The advertisement element may include a plurality of images. It should be noted that an image is merely a material (also referred to as information component) of the advertisement element and is not intended to be limiting. The information component may include other suitable forms, for example, a text, a video. For example, for an advertisement element relating to products, the advertisement element may include one or more images of the products. More particularly, for example, the advertisement element may include four images of the products including an image of product A, an image of product B, an image of product C, and an image of product D.

In some embodiments, the generating module 410 may generate the plurality of ads by combining one or more advertisement elements, i.e., by combining one or more information components (e.g., one or more images) included in the one or more advertisements respectively. For illustration purposes only, a generation of the plurality of ads is used below as an example and is not intended to be limiting. Assume that an ad includes four advertisement elements (for example, an advertisement element relating to products, copywrite, logos, and buttons), the advertisement element relating to products includes three images (for example, an image of product A, an image of product B, an image of product C), the advertisement element relating to copywrite includes four images, the advertisement element relating to logos includes one image, and the advertisement element relating to buttons includes one image. The generating unit 410 may select one image of the advertisement element relating to products, copywrite, logos, and buttons respectively and generate an ad. For example, the generating unit 410 may select one of the images of product A, the image of product B, and the product C as an advertisement element to generate the ad. Accordingly, the generating unit 410 may generate twelve (i.e., 3*41*1) ads based on the advertisement elements relating to products, copywrite, logos, and buttons.

In some embodiments, the plurality of ads may be generated according to the process 600, process 700, process 800, process 900, process 1000, process 1200, or a combination of thereof.

In some embodiments, the dispatch module 420 may transmit the determined one or more ads to the user terminal via the network. The transmission may be wired or wireless. The dispatch module 420 may determine one or more ads based on the request. In some embodiments, the determination may include selecting the one or more ads from an ads store database. In some embodiments, the dispatch module 420 may determine the one or more ads based on the demand information included in the request. For example, in process 1400, the dispatch module 420 may determine the one or more ads based on the keyword information.

In some embodiments, the dispatch module 420 may transmit a plurality of ads to one or more user terminals. The dispatch module 420 may receive a request for displaying an ad at a user terminal The determination module 430 may determine the number of clicks of each of the plurality of ads and a number of clicks of each of information components included in the plurality of ads. In some embodiments, the number of clicks and the number of impressions of each of the plurality of ads may be obtained in a pre-determined period. The predetermined period may be set manually by a user or automatically by, for example, the determination module 430. The predetermined period may be set within a given period, for example, from 14:00 p.m. to 18:00 p.m. The pre-determined period may be one hour, two hours, or any suitable ranges.

The data analysis module 440 may determine, for each of the plurality of ads, a click-through rate for the plurality of advertisement elements and a click-through rate for the plurality of images based on the click-through rate of each of the plurality of ads. The click-through rate of an advertisement element may refer to an average of click-through rates of information components included in the advertisement element. For illustration purposes only, assume that an advertisement element includes four images. The click-through rate of the advertisement element may refer to an average of click-through rates of the four images. The click-through rate of an image may refer to a ratio of the total number of clicks of one or more ads including the image to the total number of impressions of the one or more ads. For illustration purposes only, for an image, assume that four ads include the image. The click-through rate of the image may refer to a ratio of the number of clicks of the four ads to the number of impressions of the four ads.

In some embodiments, the data analysis module 440 may determine a number of impressions of at least one of images included in the plurality of ads based on click-through rates of the plurality of advertisement elements, click-through rates of the images included in the plurality of ads and a number of impressions of the plurality of ads. The number of impressions of the plurality of ads may be pre-determined by a user or determined automatically by, for example, the dispatch module 420. For example, a user may determine the number of impressions of the plurality of ads as one million.

In some embodiments, the data analysis module 440 may determine the number of impressions of an image based on a ratio of a weight of the image and a total weight of images included in the plurality of ads and the number of impressions of the plurality of ads. The weight of the image may refer to a ratio of a click-through rate of the image to a click-through rate of an advertisement element including the image.

Figure 5:
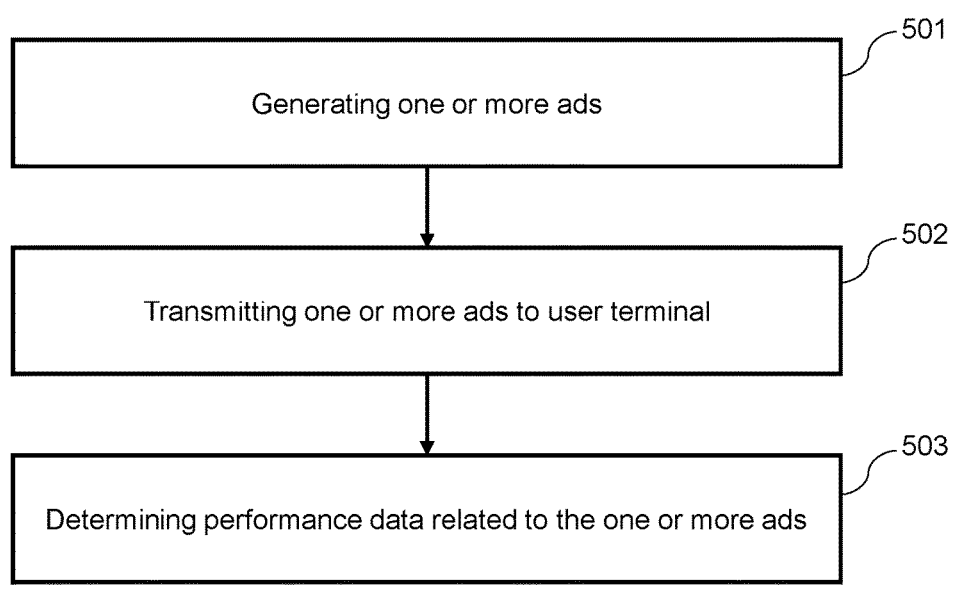
FIG. 5 is a flowchart illustrating an exemplary process for processing one or more ads according to some embodiments of the present disclosure.

FIG. 5 is a flowchart illustrating an exemplary process and/or method 500 for processing one or more ads according to some embodiments of the present disclosure. The process and/or method 500 may be executed by the online advertisement service system 100. For example, the process and/or method 500 may be implemented as a set of instructions (e.g., an application) stored in the storage 150. The CPU 220 may execute the set of instructions, and when executing the instructions, the processor may accordingly be directed to perform the process and/or method 500. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 5 and described below is not intended to be limiting.

In 501, the generating unit 410 may generate a plurality of ads. An ad may include a plurality of advertisement elements. In some embodiments, an advertisement element may relate to a logo, a product, a model, a copywrite, a button, a background, an ornament, an industry classification, an industry subclassification, a business name, or the like, or a combination thereof. Merely by way of example, for an ad of a lipstick, the ad may include four advertisement elements relating to logos, products, copywrite, and models. The advertisement element may include a plurality of images. It should be noted that an image is merely a material (also referred to as information component) of the advertisement element and is not intended to be limiting. The information component may include other suitable forms, for example, words, a video. For example, for an advertisement element relating to products, the advertisement element may include one or more images of the products. More particularly, for example, the advertisement element may include four images of the products including an image of product A, an image of product B, an image of product C, and an image of product D.

In some embodiments, the generating module 410 may generate the plurality of ads by combining one or more advertisement elements, i.e., by combining one or more information components (e.g., one or more images) included in the one or more advertisements respectively. For illustration purposes only, a generation of the plurality of ads is used below as an example and is not intended to be limiting. Assume that an ad includes four advertisement elements (for example, an advertisement element relating to products, copywrite, logos, and buttons), the advertisement element relating to products includes three images (for example, an image of product A, an image of product B, an image of product C), the advertisement element relating to copywrite includes four images, the advertisement element relating to logos includes one image, and the advertisement element relating to buttons includes one image. The generating unit 410 may select one image of the advertisement element relating to products, copywrite, logos, and buttons respectively and generate an ad. For example, the generating unit 410 may select one of the images of product A, the image of product B, and the product C as an advertisement element to generate the ad. Accordingly, the generating unit 410 may generate twelve (i.e., 3*41*1) ads based on the advertisement elements relating to products, copywrite, logos, and buttons.

In some embodiments, step 501 may be performed according to process 600 (illustrated in FIG. 6 and described below), process 700 (illustrated in FIG. 7 and described below), process 800 (illustrated in FIG. 8 and described below), process 900 (illustrated in FIG. 9 and described below), process 1000 (illustrated in FIG. 10 and described below), process 1200 (illustrated in FIG. 12 and described below), or a combination of thereof.

In 502, the dispatch module 420 may dispatch the generated ads to one or more user terminals. The one or more user terminals may display the ads received on one or more channels. The one or more channels refer to mediums displaying the plurality of ads, for example, Facebook, Weibo, and Twitter. In some embodiments, the plurality of ads may be shown at the user terminals in a given period. The period may be set automatically by, for example, by the dispatch module 420, or manually by an operator of the dispatch module 420. The period may be set falling in a specific period, for example, from 14:00 p.m. to 18:00 p.m. The period may be one hour, two hours, or any suitable ranges.

In some embodiments, the generated ads may be dispatched to one or more user terminals according to the process 1300 (illustrated in FIG. and described below), process 1400 (illustrated in FIG. 14 and described below), process 1500 (illustrated in FIG. 15 and described below), process 1600 (illustrated in FIG. 16 and described below), or a combination thereof.

In 503, the determination module 430 may determine performance data for each of the plurality of ads. In some embodiments, the performance data includes a click-through rate. The click-through rate of an ad used herein refers to a ratio of the number of clicks on the ad to the number of impressions of the ad, and the impression refers to a visit by a user terminal to one or more channels displaying the ad.

In some embodiments, the number of clicks and the number of impressions of each of the plurality of ads may be measured in a pre-determined period. The predetermined period may be set manually by a user or automatically by, for example, the determination module 430. The predetermined period may be set falling in a given period, for example, from 14:00 p.m. to 18:00 p.m. The pre-determined period may be one hour, two hours, one day, one week, one month, or any suitable ranges.

In some embodiments, step 503 may be performed based on process 2000 (illustrated in FIG. 20 and described below), process 2100 (illustrated in FIG. 21 and described below), or process 2200 (illustrated in FIG. 22 and described below), or a combination thereof.

In some embodiments, in 501, the generation module 410 may generate an ad based, at least in part on, the performance data of one or more other ads. For example, the determination module 430 may generate a first plurality of ads, the first plurality of ads including a first plurality of advertisement elements and a first plurality of information components. The dispatch module 420 may transmit, via a network (e.g., the network 120), the first plurality of ads to the first group of user terminals (e.g., user terminals 140). The determination module 430 may determine at least one of a click-through rate, a number of impressions, and/or a conversion rate for the first plurality of ads. The determination module 430 may further analyze the at least one of the click-through rate, the number of impressions, or the conversion rate of the first plurality of ads. The generation module 410 may receive the performance data related to the first plurality of ads (e.g., the determined click-through rate, number of impressions, and/or a conversion rate for the first plurality of ads) and/or the analysis results obtained by the determination module 430. The generation module 410 may also generate an ad based, at least in part on the performance data of one of the first plurality of ads (or the information components and/or the advertisement included therein). For instance, the generation module 410 may generate a new ad including the information component(s) that has the highest ranking among all the information components included in the first plurality of ads, which may be determined by the determination module 430 according to the performance data of the first plurality ads. The dispatch module 420 may receive the new ad generated by the generation module 420 and dispatch the new ad to one or more user terminals. The one or more user terminals may be the same with or different from the user terminal(s) that received one or more of the first plurality of ads.

Figure 6:
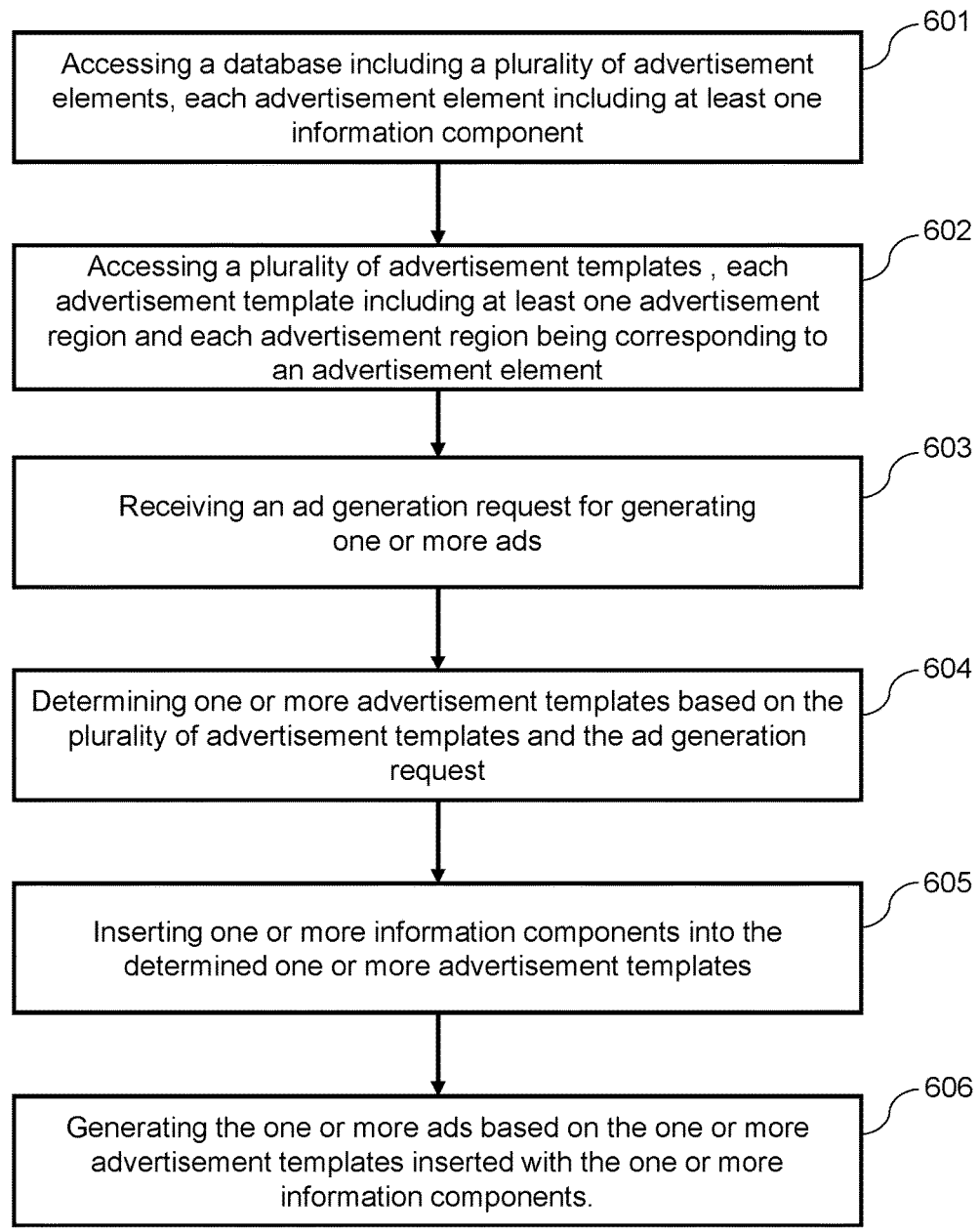
FIG. 6 is a flowchart illustrating an exemplary process for generating one or more ads according to some embodiments of the present disclosure.

FIG. 6 is a flowchart illustrating an exemplary process and/or method for generating one or more ads according to some embodiments of the present disclosure. The process and/or method 600 may be executed by the online advertisement service system 100. For example, the process and/or method 600 may be implemented as a set of instructions (e.g., an application) stored in the storage 150. The CPU 220 may execute the set of instructions, and when executing the instructions, the processor may accordingly be directed to perform the process and/or method 600. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 6 and described below is not intended to be limiting.

In 601, the generating module 410 (e.g., the access unit in the generating module 410) may access a database including a plurality of advertisement elements. In some embodiments, the generating module 410 (e.g., the access unit) may access the database and data stored in the storage 150. The advertisement elements may include at least one category of a plurality of information components. The advertisement element may include a company logo, a company name, industry, a product, a model, a copywrite, a trademark, a celebrity, or the like, or any combination thereof. In some embodiments, each advertisement element may include at least one information component. The information component may include an image, a word, a phrase, a sentence, a video, audio, or the like, or any combination thereof. The image may include a portrait image, an animal image, a scene image, a button image, or the like, or any combination thereof. The word may include a company name, a product name, a copywrite, or the like, or any combination thereof. The video may include a product video, a service video, or the like, or any combination thereof. A plurality of logo images of one or more companies may be classified as an advertisement element of company logo and stored in the database. A plurality of product images may be classified as an advertisement element of a product and stored in the database. In some embodiments, generating module 410 may update the database after generating an ad.

In 602, the generating module 410 (e.g., the access unit) may access a plurality of advertisement templates. An advertisement template may include at least one advertisement region. In some embodiments, each advertisement region may correspond to an advertisement element. For example, the advertisement template may include three advertisement regions, which may correspond to a company logo, a product and a copywrite, respectively. In some embodiments, each advertisement region may be associated with more than one advertisement element. For example, the advertisement template may include two advertisement regions, the first advertisement region be corresponding to a company logo and/or a model, and the second advertisement region be corresponding to industry, a company name, and/or a model. In some embodiments, the advertisement element corresponding to different regions may be the same or different. For example, an advertisement template may include four regions. One region may correspond to a company logo. One region may correspond to a celebrity. The other two regions may correspond to a product.

In some embodiments, the advertisement templates may have different sizes. An advertisement template may have more than one size. The size of the advertisement template may be determined based on an ad slot, an ad generation requester, etc. The process and/or method of generating a plurality of advertisement templates with different sizes may be described in an exemplary process and/or method 900 illustrated in FIG. 9. In some embodiments, the plurality of advertisement templates may be stored in a storage medium (e.g., the storage 150, the storage 150, the storage 390). The generating module 410 (e.g., the access unit) may access the plurality of advertisement templates from the storage medium.

In 603, the generating module 410 (e.g., the receiving unit in the generating module 410) may receive an ad generation request for generating one or more ads. The ad generation request may be initiated by an ad generation requester via the ad generation requester terminal 130. In some embodiments, the ad generation request may be received from the I/O 230 or the I/O 350. In some embodiments, the ad generation request may include a total number of ads the ad generation requester wants to generate, one or more information components to be generated, one or more information elements, or the like, or any combination thereof. The one or more information components to be generated may include an image, a word, a video, audio, or the like, or any combination thereof. For example, the ad generation request from the ad generation requester may include three ads, a video of a product, and a company logo image. In some embodiments, the information component(s) in the ad generation request may be processed before generating one or more ads according to an exemplary process and/or method 1200 illustrated in FIG. 12 and described in detail below.

In 604, the generating module 410 (e.g., the determination unit in the generation module 410) may obtain one or more advertisement templates for the one or more ads to be generated according to the plurality of advertisement templates and the ad generation request. In some embodiments, the generating module 410 may first determine a demand quantity of the one or more advertisement templates based on the ad generation request. The generating module 410 may then determine the advertisement templates from the plurality of advertisement templates based on scores of the plurality of advertisement templates. The generation module 410 may determine a score for each advertisement template of the plurality of advertisement templates. The determined advertisement templates may have the same number as the demand number specified in the ad generation request. In some embodiments, the one or more advertisement templates may be determined according to an exemplary process and/or method 700 illustrated in FIG. 7

In some embodiments, one advertisement template may be used to generate one or more ads. For example, an advertisement template may include four advertisement elements. The first advertisement element may include three information components included in the ad generation request. The second advertisement element may include two information components included in the ad generation request. The third and the fourth advertisement element may each include one information component included the ad generation request. Then the advertisement template may generate 6 ads (3*2*1*1). In some embodiments, a demand quantity of advertisement templates may be less than or equal to the total number of ads. The demand quantity of advertisement templates may be determined based on the ad generation request.

In 605, the generating module 410 (e.g., the inserting unit in the generating module 410) may insert one or more information components into the determined one or more advertisement templates. In some embodiments, for a determined advertisement template, the generating module 410 (e.g., the inserting unit) may determine whether the ad generation request matches an advertisement element in an advertisement region of the determined advertisement template. The generating module 410 (e.g., the inserting unit) may determine the number of the information components in the ad generation request equal to a predetermined number of the advertisement region of the determined advertisement template. Then the generating module 410 (e.g., the inserting unit) may insert the predetermined number of information components included in the ad generation request and/or the database into the advertisement region(s) of the determined advertisement template. The one or more information components may be inserted into the determined advertisement templates according to an exemplary process and/or method 800 illustrated in FIG. 8.

In 606, the generating module 410 (e.g., a generation unit in the generating module 410) may generate one or more ads based on the one or more determined advertisement templates inserted with the one or more information components. For example, if an advertisement template includes three advertisement regions 1, 2 and 3, corresponding to three advertisement elements respectively, e.g., a company name, industry, a model. The information components in the ad generation request may include a company name A corresponding to the company name, an industry B corresponding to the industry, and a model image C corresponding to the model. The generating module 410 may insert the information components of the company name A, the industry B and the model image C into the three advertisement regions 1, 2, and 3 respectively to generate an ad.

In some embodiments, the generation module 410 may determine one or more new ads based on pre-existing ads. For example, the generation module 410 may segment one or more pre-existing ads and obtain at least one of advertisement elements based on the segmentation of the one or more pre-existing ads. The generation module 410 may generate one or more new ads including the obtained advertisement element(s).

In some embodiment, the generation module 410 may further generation one or more new ads from the determined one or more ads based on a result of the analysis from the data analysis module 440. The result of the analysis may include a click-through rate, the number of impressions, a conversion rate of the determined one or more ads, or the like, or any combination thereof.

In some embodiments, the generation module 410 may obtain a first plurality of advertisement elements. The generation module 410 may determine the at least one of the one or more ads according to two of the obtained first plurality of advertisement elements.

In some embodiments, the one or more generated ads may be stored in an ads database (e.g., the storage 150, the storage 150, the storage 390). In some embodiments, the dispatch module 420 may determine one or more ads from the ad database to transmit the one or more ads to a user terminal. For example, the dispatch module 420 may transmit the one or more ads according to process 1300 in the present disclosure. In some embodiments, the one or more generated ads may be stored in the ad database, and each generated ad may include one or more labels associated with the generated ad. The one or more labels may be generated according to process 2000 (illustrated in FIG. 20), process 2100 (illustrated in FIG. 21), or process 2200 (illustrated in FIG. 22), or a combination thereof.

It should be noted that the above description of the process/method for generating the one or more ads is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, step 601 and step 602 may be performed simultaneously. As another example, step 602 may be performed before step 601.

Figure 7:
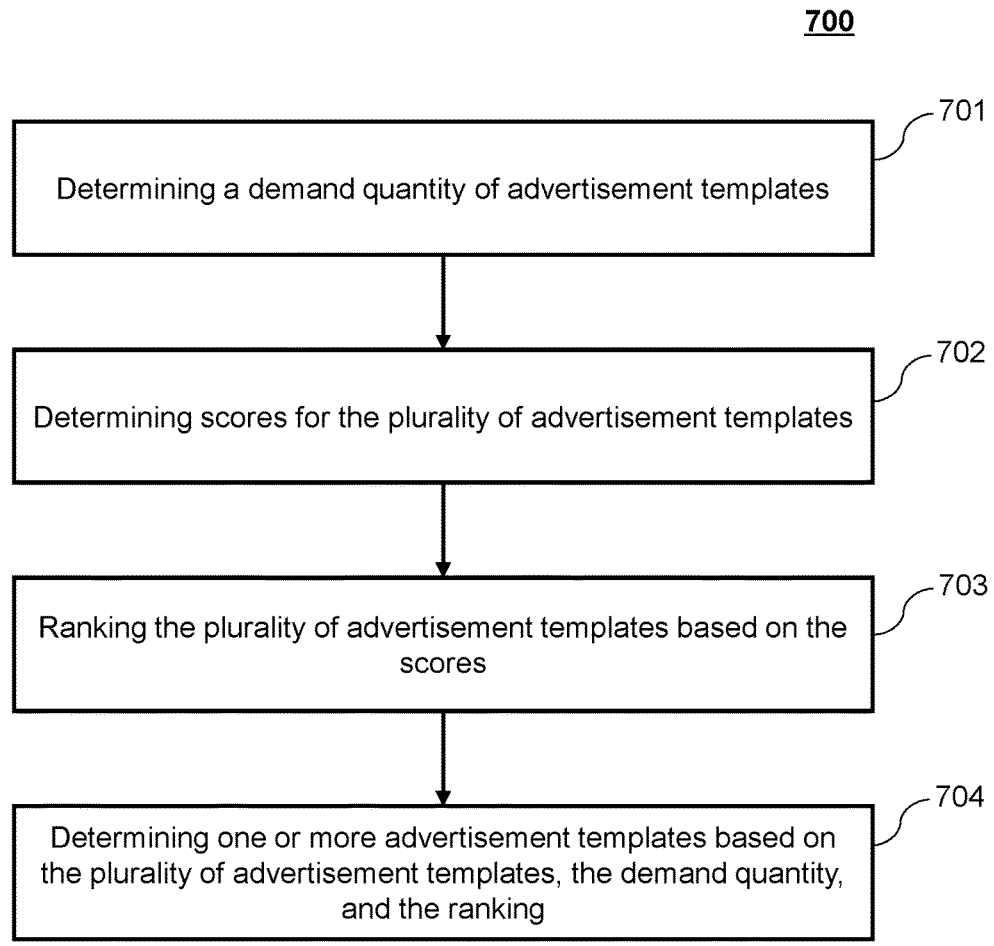
FIG. 7 is a flowchart illustrating an exemplary process for determining one or more advertisement templates according to some embodiments of the present disclosure.

FIG. 7 is a flowchart illustrating an exemplary process and/or method 700 for determining one or more advertisement templates according to some embodiments of the present disclosure. The process and/or method 700 may be executed by the online advertisement service system 100. For example, the process and/or method 700 may be implemented as a set of instructions (e.g., an application) stored in the storage 150. The CPU 220 may execute the set of instructions, and when executing the instructions, the CPU 220 may accordingly be directed to perform the process and/or method 700. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 7 and described below is not intended to be limiting.

In 701, the generating module 410 (e.g., the determination unit) may determine a demand quantity of advertisement templates for generating one or more ads. The generating module 410 (e.g., the determination unit) may determine the demand quantity of advertisement templates according to Equation (1):

$$M = \begin{cases} N, & T \geq N \\ T, & T < N \end{cases}, \quad (1)$$

wherein M represents the demand quantity of advertisement templates, N represents the total number of ads to be generated, and T represents the total number of advertisement templates. For example, if the total number of advertisement templates T is 50, the total number of ads to be generated N is 12, the generating module 410 (e.g., the determination unit) may determine the demand quantity of advertisement templates M is 12. As another example, if the total number of advertisement templates T is 20, the total number of ads to be generated N is 50, the generating module 410 (e.g., the determination unit) may determine the demand quantity of advertisement templates M is 20. The generating module 410 (e.g., the determination unit) may also determine a number of ads that an advertisement template may generate according to Equation (2):

$$C = [N/M] \quad (2),$$

wherein C represents the number of ads that an advertisement template may generate, M represents the demand quantity of advertisement templates, N represents the total number of ads to be generated, and [ ] represents that C is an integer associated with N/M.

In 702, the generating module 410 (e.g., the determination unit) may determine scores for the plurality of advertisement templates. Each advertisement template may have a score. In some embodiments, for an advertisement template, the generating module 410 (e.g., the determination unit) may determine the score for the advertisement template according to Equation (3):

$$\text{Score}(i) = a^*\text{auditRate}(i) + c^*\text{ctr}(i) + m^*\text{matchRat}(i) + u^*\text{useRate}(i) + f^*\text{freshnessRate}(i) \quad (3),$$

wherein i represents an advertisement template i in the plurality of advertisement templates, Score(i) represents a score of the advertisement template I, and auditRate(i) represents an audit rate of the advertisement template i. For example, the advertisement template i generates 100 ads and there are 95 ads are audited to be dispatched. The audit rate auditRate(i) is 0.95. ctr(i) represents an overall click-through rate (CTR rate) of the advertisement template i. For example, the total exposure amount of the ads that the advertisement template i generated is 10000 and the total number of clicking of the corresponding ads is 100. The overall CTR ctr(i) is 100/10000. matchRat(i) represents a matching rate of the advertisement template i and the ad generation request. For example, the advertisement template i is inserted with four information components and three information components are from the ad generation request. The matching rate matchRat(i) is 3/4. useRate(i) represents a use rate of the advertisement template i. For example, the advertisement template i includes three advertisement elements and the three advertisement elements may correspond to 3, 4, and 5 information components, respectively. The total number of ads that may be totally generated with respect to the advertisement template i may be 3*4*5=60. If the number of generated ads with respect to advertisement template i is 30, the use rate useRate(i) is 30/60. freshnessRate(i) represents a freshness rate. For example, a timestamp of recently being used the advertisement template i is 1460217600, and the current timestamp is 1460397594. The freshness rate freshnessRate(i) is 1460217600/1460397594. The letters a, c, m, u and f in the Equation (3) represent corresponding coefficients. The coefficients (e.g., a, c, m, u and f) are non-zero values. The larger the coefficient is, the more important the factor (e.g., auditRate(i), ctr(i), matchRat(i), useRate(i) or reshnessRate(i)) is. For example, if coefficient a is the largest, the contribution of auditRate(i) to the score may be greatest.

In some embodiments, the audit rate auditRate(i), the overall CTR rate ctr(i), the matching rate matchRat(i), the use rate useRate(i), and the freshness rate freshnessRate(i) may be acquired from the storage 150. In some embodiments, the audit rate auditRate(i), the overall CTR rate ctr(i), the matching rate matchRat(i), the use rate useRate(i) and the freshness rate freshnessRate(i) may be updated according to a feedback from the data analysis module 440. In some embodiments, the values of the coefficients (e.g., a, c, m, u, and f) may be adjusted according to the feedback from the data analysis module 440. The generating module 410 (e.g., the determination unit) may determine scores for a plurality of advertisement templates according to the factors and the coefficients.

In 703, the generating module 410 (e.g., the determination unit) may rank the plurality of advertisement templates based on their scores. In some embodiments, the generating module 410 (e.g., the determination unit) may rank the plurality of advertisement templates in descending order based on the scores. For example, the generating module 410 (e.g., the determination unit) may compare scores of two advertisement templates. The generating module 410 (e.g., the determination unit) may rank the two advertisement templates in descending order. The ranking of the plurality of advertisement templates may be determined accordingly.

In some embodiments, the rank of the plurality of advertisement templates may be updated based on an analysis result determined by the data analysis module 440. The analysis result may be determined according to the processes 1700, 1800, 1900, 2000, 2100, 2200 discussed below. For example, the data analysis module 440 may analyze the number of clicks on an ad and/or the number of clicks of the information components of the ad to obtain an analysis result. The data analysis module 440 (or the generation module 410) may rank this advertisement template by comparing its score with other advertisement templates. Alternatively or additionally, the data analysis module 440 may obtain an analysis result by analyzing the number of impressions of the ad and/or the number of impressions of the information components of the ad. Alternatively or additionally, the data analysis module 440 may analyze the conversion rate of the ad and the conversion rate of the information components of the ad. The data analysis module 440 may also determine a score of the advertisement template based on which the ad is generated according to the analysis result.

In 704, the generating module 410 (e.g., the determination unit) may determine one or more advertisement templates based on the plurality of advertisement templates, the demand quantity, and the ranking. In some embodiments, the generating module 410 (e.g., the determination unit) may select the demand quantity of advertisement templates from the plurality of advertisement templates based on the ranking. For example, the demand quantity of the advertisement template is 8, and the generating module 410 may select 8 advertisement templates with the 8 top ranking from the plurality of advertisement templates. The generating module 410 may determine the 8 advertisement templates with the 8 top ranking with respect to the ad generation request.

It should be noted that the above description of the process/method for determining the one or more advertisement templates is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, before step 701, a pre-filtered step may be added to pre-filter the plurality of advertisement templates according to the information component and/or advertisement elements from the ad generation request.

Figure 8:
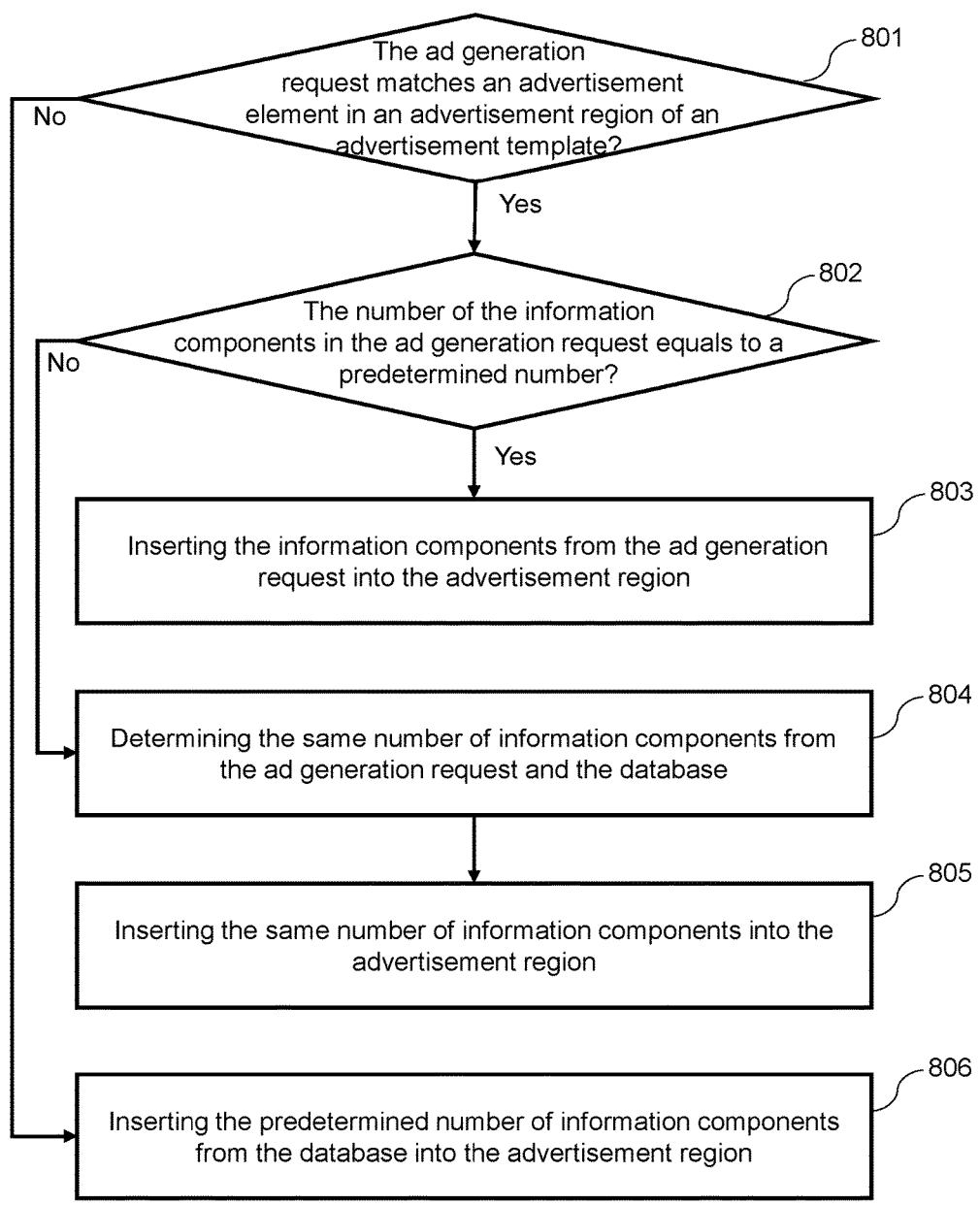
FIG. 8 is a flowchart illustrating an exemplary process for inserting one or more information components into one or more advertisement templates according to some embodiments of the present disclosure.

FIG. 8 is a flowchart illustrating an exemplary process and/or method 800 for inserting one or more information components into one or more advertisement templates according to some embodiments of the present disclosure. The process and/or method 800 may be executed by the online advertisement service system 100. For example, the process and/or method 800 may be implemented as a set of instructions (e.g., an application) stored in the storage 150. The CPU 220 may execute the set of instructions, and when executing the instructions, the CPU 220 may accordingly be directed to perform the process and/or method 800. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 8 and described below is not intended to be limiting.

In 801, the generating module 410 (e.g., a determination unit of the generating module 410) may determine whether the ad generation request matches an advertisement element in an advertisement region of an advertisement template. The ad generation request may include one or more information components corresponding to one or more advertisement elements. The generating module 410 (e.g., the determination unit) may determine whether one of the information components in the ad generation request matches an advertisement element in an advertisement region of an advertisement template. For example, the ad generation request may include an image of a model corresponding to an advertisement element of "model." One of the advertisement regions of an advertisement template may correspond to an advertisement element of "model." The generating module 410 (e.g., a determination unit) may determine that the ad generation request matches the advertisement element in the advertisement region of the advertisement template.

In response to the determination that the ad generation request matches an advertisement element in an advertisement region of the advertisement template, the generating module 410 (e.g., the determination unit) may perform step 802.

In 802, the generating module 410 (e.g., the determination unit) may determine whether the number of information components in the ad generation request equals to a predetermined number of information components in the advertisement region. The number of information components may be determined based on the ad generation request. In some embodiments, the predetermined number may be determined based on the advertisement template.

In response to the determination that the number of information components in the ad generation request equals to the predetermined number of information components for an advertisement region of the advertisement template, the generating module 410 (e.g., the determination unit) may perform step 803.

In 803, the generating module 410 (e.g., the inserting unit) may insert the information components from the ad generation request into the advertisement region. For example, for an advertisement region of the advertisement template, the advertisement region may correspond to an advertisement element, e.g., product. The advertisement element (e.g., product) may include three information components (three product pictures). The predetermined number of information component in the advertisement region is 3. The generating module 410 (e.g., the inserting unit) may insert the three information components (three product pictures) into the advertisement region.

Referring back to step 802, in response to the determination that the number of information components in the ad generation request does not equal to the predetermined number of information components for an advertisement region of the advertisement template, the generating module 410 (e.g., the determination unit) may perform step 804. In 804, the generating module 410 (e.g., the determination unit) may determine the same number of information components from the ad generation request and the database. In some embodiments, for an advertisement region, if the number of information components in the ad generation request is less than a predetermined number, the generating module 410 (e.g., the determination unit) may access the database to acquire one or more information components corresponding to the advertisement region. The total number of information components from the ad generation request and the database may equal to the predetermined number. For example, an advertisement template may include three advertisement regions. The first region may correspond to five information components. The second region may correspond to two information components. The third region may correspond to one information component. The number of information components in the ad generation request corresponding the first region may be two. The number of information component in the ad generation request corresponding to the second region may be one. The number of information component in the ad generation request may be one. The generating module 410 (e.g., the determination unit) may access the database to acquire three information components corresponding to the first region, and one information component corresponding to the second region.

In some embodiments, the information components obtained from the database may be determined by scores for the information components corresponding to the advertisement regions of the advertisement template. The generating module 410 (e.g., the determination unit) may determine scores for the information components according to Equation (4):

$$\text{Score}(k) = ea^* \text{auditRate}(k) + ec^* \text{ctrRate}(k) + ef^* \text{freshnessRate}(k) \quad (4),$$

wherein k represents an information components k corresponding to the advertisement regions of the advertisement template; Score (k) represents a score for the information component k; auditRate(k) represents an audit rate of the information component k; ctrRate(k) represents an overall CTR rate of the information component k; freshnessRate(k) represents a freshness rate of the information component k. ea, ec, ef represent corresponding coefficients. The coefficients (e.g., ea, ec, ef) is non-zero values. In some embodiments, the larger the coefficient is, the more important the factor (e.g., auditRate(k), ctr(k), matchRat(k), useRate(k) or reshnessRate(k)) is.

In some embodiments, the coefficient of the plurality of information component may be updated based on an analysis result determined by the data analysis module 440. The analysis result may be determined according to the processes 1700, 1800, 1900, 2000, 2100, 2200 discussed below. For example, the data analysis module 440 may analyze the number of clicks on an ad and/or the number of clicks of the information components of the ad to obtain an analysis result. The data analysis module 440 (or the generation module 410) may rank this advertisement template by comparing its score with other advertisement templates. Alternatively or additionally, the data analysis module 440 may obtain an analysis result by analyzing the number of impressions of the ad and/or the number of impressions of the information components of the ad. Alternatively or additionally, the data analysis module 440 may analyze the conversion rate of the ad and the conversion rate of the information components of the ad. The data analysis module 440 may also determine a score of the information component based on which the ad is generated according to the analysis result.

In 805, the generating module 410 (e.g., the inserting unit) may insert the same number of information components into the advertisement region. In some embodiments, if the total number of information components from the ad generation request and the database equals to the predetermined number corresponding to the advertisement region, the generating module 410 (e.g., the inserting unit) may insert the information components from the ad generation request and the database into the corresponding advertisement region of the advertisement template.

Referring back to step 801, in response to the determination that the ad generation request does not match an advertisement element in an advertisement region of the advertisement template, the generating module 410 (e.g., the determination unit) may perform step 806. In 806, the generating module 410 (e.g., the inserting unit) may insert the predetermined number of information components from the database into the advertisement region. In some embodiments, if the ad generation request does not match the advertisement element in the advertisement region of the advertisement template, the generating module 410 (e.g., the determination unit) may access the database to acquire the predetermined number of information component for the advertisement region. The generating module 410 (e.g., the inserting unit) may insert the acquired predetermined number of information components into the advertisement region. The information components obtained from the database may be determined based on the method for determining scores of the information components similar to the Equation (4) described above.

It should be noted that the above description of the process/method for calibrating the alignment device is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure.

Figure 9:
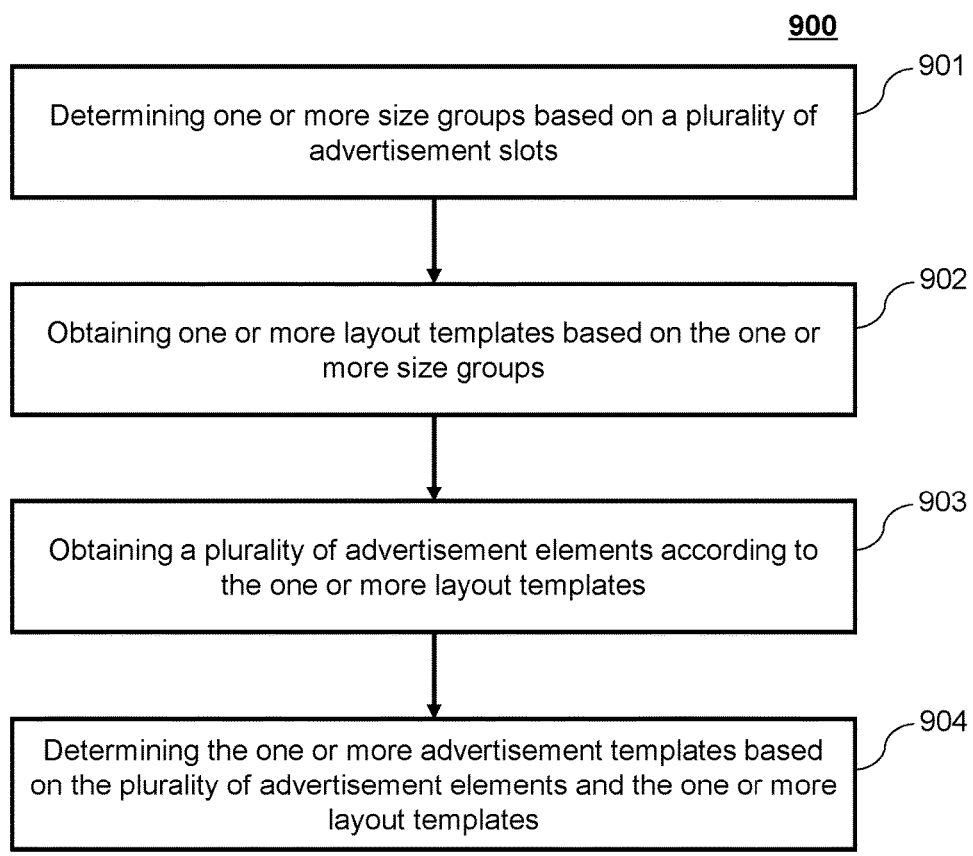
FIG. 9 is a flowchart illustrating an exemplary process for determining one or more advertisement templates according to some embodiments of the present disclosure.

FIG. 9 is a flowchart illustrating an exemplary process and/or method 900 for determining one or more advertisement templates according to some embodiments of the present disclosure. The process and/or method 900 may be executed by the online advertisement service system 100. For example, the process and/or method 900 may be implemented as a set of instructions (e.g., an application) stored in the storage 150. The CPU 220 may execute the set of instructions, and when executing the instructions, the CPU 220 may accordingly be directed to perform the process and/or method 900. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 9 and described below is not intended to be limiting.

In 910, the generating module 410 (e.g., the generation unit) may determine one or more size groups based on a plurality of advertisement slots. In some embodiments, the plurality of advertisement slots may include one or more aspect ratios. The generating module 410 (e.g., the template generation unit) may determine one or more size groups based on the one or more aspect ratios. The aspect ratio may be determined according to Equation (5):

$$r = w/h \qquad (5),$$

wherein r represents the aspect ratio of an advertisement slot; w represents the width of the advertisement slot; h represents the height of the advertisement slot.

In some embodiments, the generating module 410 (e.g., the generation unit) may determine at least one size group based on the aspect ratio. For example, the generating module 10 may determine six size groups based on the aspect ratio. The six size groups may include a full column, a banner, a small banner, a rectangle, a small vertical picture, and a vertical picture. As shown in Table 1, if an aspect ratio r of an advertisement slot is larger than 9, the advertisement slot may be classified as the full column. If an aspect ratio r of an advertisement slot is within a range of 9≥r>10/3, the advertisement slot may be classified as the banner. If an aspect ratio of an advertisement slot is within a range of 10/3≥r>10/7, the advertisement slot may be classified as the small banner. If an aspect ratio of an advertisement slot is within a range of 10/7≥r>7/10, the advertisement slot may be classified as the rectangle. If an aspect ratio of an advertisement slot is within a range of 7/10≥r>4/10, the advertisement slot may be classified as the small vertical picture. If an aspect ratio of an advertisement slot is less than or equal to 4/10, the advertisement slot may be classified as the vertical picture. As shown in Table 1, each size group may include five sizes for illustration purpose. In some embodiments, a size group may include more than five sizes according to practical situations.

TABLE 1

| Size Group | Aspect Ratio Range (r = w/h) | Exemplary Size (ppi) |
| --- | --- | --- |
| Full column | r > 9 | 960 × 60 |
|  |  | 960 × 70 |
|  |  | 960 × 80 |
|  |  | 960 × 90 |
|  |  | 960 × 100 |
| Banner | 9 ≥ r > 10/3 | 810 × 90 |
|  |  | 728 × 90 |
|  |  | 640 × 90 |
|  |  | 580 × 90 |
|  |  | 360 × 90 |
| Small banner | 10/3 ≥ r > 10/7 | 300 × 90 |
|  |  | 300 × 120 |
|  |  | 300 × 150 |
|  |  | 300 × 180 |
|  |  | 300 × 200 |
| Rectangle | 10/7 ≥ r > 7/10 | 300 × 210 |
|  |  | 300 × 250 |
|  |  | 250 × 250 |
|  |  | 250 × 300 |
|  |  | 225 × 300 |
| Small vertical | 7/10 ≥ r > 4/10 | 140 × 200 |
|  |  | 140 × 220 |
|  |  | 140 × 240 |
|  |  | 120 × 240 |
|  |  | 120 × 270 |
| Vertical | r ≤ 4/10 | 240 × 600 |
|  |  | 200 × 600 |
|  |  | 160 × 600 |
|  |  | 140 × 600 |
|  |  | 120 × 600 |

In 902, the generating module 410 (e.g., the generating unit) may obtain one or more layout templates based on the one or more size groups. In some embodiments, the generating module 410 (e.g., the generating unit) may determine one layout template for one size group. A size group may have the same layout. For example, the generating module 410 (e.g., the generating unit) may determine a template with size 960×80 as a layout template for the full column. The generating module 410 (e.g., the generating unit) may determine a template with size 640×90 as a layout template for the banner. The generating module 410 (e.g., the generating unit) may determine a template with size 300×150 as a layout template for the small banner. The generating module 410 (e.g., the generating unit) may determine a template with size 250×250 as a layout template for the rectangle. The generating module 410 (e.g., the generating unit) may determine a template with size 140×240 as a layout template for the small vertical picture. The generating module 410 (e.g., the generating unit) may determine a template with size 160×600 as a layout template for the vertical picture. In some embodiments, the generating module 410 may store the determined one or more layout templates in a layout template database (in e.g., the storage 150, the storage 150, the storage 390).

In 903, the generating module 410 (e.g., the generating unit) may obtain a plurality of advertisement elements according to the one or more layout templates. For example, the generating module 410 may obtain the plurality of advertisement elements from the one or more layout templates. In some embodiments, a layout template may include one or more layers. A layer may include at least one information component. An information component may correspond to one advertisement element. The generating module 410 (e.g., the generating unit) may extract a plurality of advertisement elements for the one or more layers of the layout template. In some embodiments, the plurality of advertisement elements may correspond to different advertisement regions of the layout template. For example, a company logo may correspond to region A of the layout template, and product may correspond to region B. The generating module 410 (e.g., the generating unit) may determine the plurality of advertisement elements in the corresponding advertisement regions of the one more layout templates.

In 904, the generating module 410 (e.g., the generating unit) may determine the one or more advertisement templates based on the plurality of advertisement elements and the one or more layout templates. The generating module 410 may generate the one or more advertisement templates having a different size based on the plurality of advertisement elements and the one or more layout templates. For example, the plurality of advertisement elements may include a plurality of images determined by the one or more layout templates. The generating module 410 may automatically layout the plurality of images based on the one or more layout templates to generate the plurality of advertisement template.

In some embodiments, the generating module 410 (e.g., the generating unit) may access a plurality of information components corresponding the plurality of advertisement elements from the database. In some embodiments, the generating module 410 (e.g., the generating unit) may access a plurality of information components in the layout templates. An advertisement element may correspond to an advertisement region of the layout template. The generating module 410 (e.g., the generating unit) may determine the location of the advertisement element in the advertisement template accordingly. In some embodiments, the advertisement element may be located at a known location in the layout template, for example, the top left corner of the layout template. Then the location of the advertisement element in the advertisement template may be known, i.e., the top left corner of the advertisement template. The generating module 410 (e.g., the generating unit) may insert the information components corresponding to the advertisement element into the known location in the advertisement template. In some embodiments, the advertisement element is located at an unknown location in the layout template. Then the location of the advertisement element in the advertisement template may be determined according to coordinates of the advertisement element in the layout template. The generating module 410 (e.g., the generating unit) may insert the information components corresponding to the advertisement element into the determined location in the advertisement template. The advertisement template may be determined according to an exemplary process 1000 illustrated in FIG. 10 and described in detail below.

It should be noted that the above description of the process/method for determining a plurality of advertisement templates is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, in 902, the generating module 410 (e.g., the generating unit) may determine a template with different sizes from the layout templates of the full column, the banner, the small banner, the rectangle, the small vertical picture, or the vertical picture. As another example, an advertisement region of a layout template may correspond to one or more advertisement elements. One or more advertisement templates may be generated based on the corresponding one or more advertisement elements in the advertisement region and the layout template.

Figure 10:
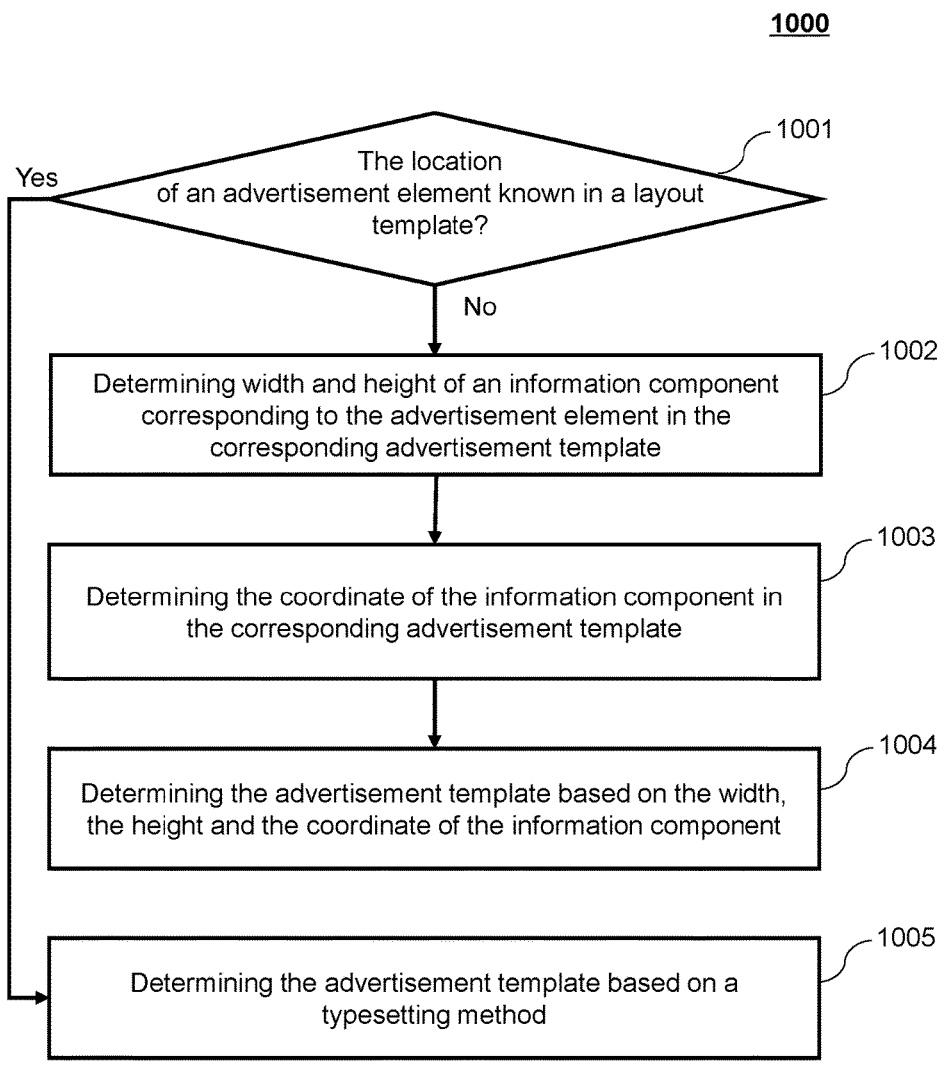
FIG. 10 is a flowchart illustrating an exemplary process for determining an advertisement template according to some embodiments of the present disclosure.

FIG. 10 is a flowchart illustrating an exemplary process and/or method 1000 for determining an advertisement template according to some embodiments of the present disclosure. The process and/or method 1000 may be executed by the online advertisement service system 100. For example, the process and/or method 1000 may be implemented as a set of instructions (e.g., an application) stored in the storage 150. The CPU 220 may execute the set of instructions, and when executing the instructions, the CPU 220 may accordingly be directed to perform the process and/or method 1000. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 10 and described below is not intended to be limiting.

In 1001, the generating module 410 (e.g., the determination unit) may determine whether the location of an advertisement element is known in a layout template. For example, the location of the advertisement element in the layout template may be the top left corner, the top right corner, the bottom left corner, the bottom right corner, the center, or the like. In response to the determination that the location of the advertisement element is not known in the layout template, the generating module 410 (e.g., the determination unit) may perform step 1002.

Figure 11A:
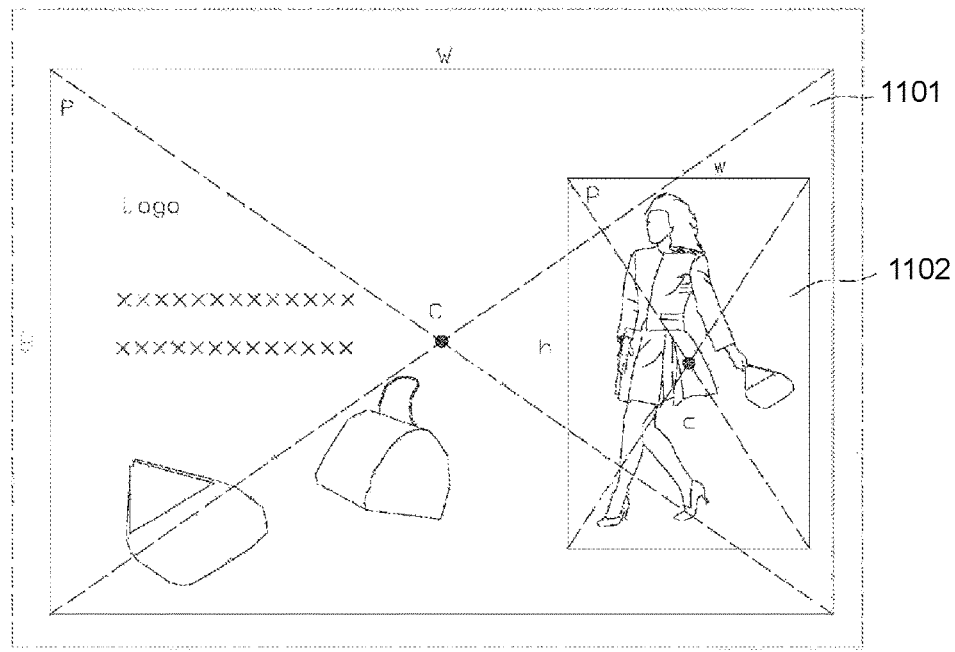
FIG. 11A illustrates an exemplary information component in a layout template according to some embodiments of the present disclosure.
Figure 11B:
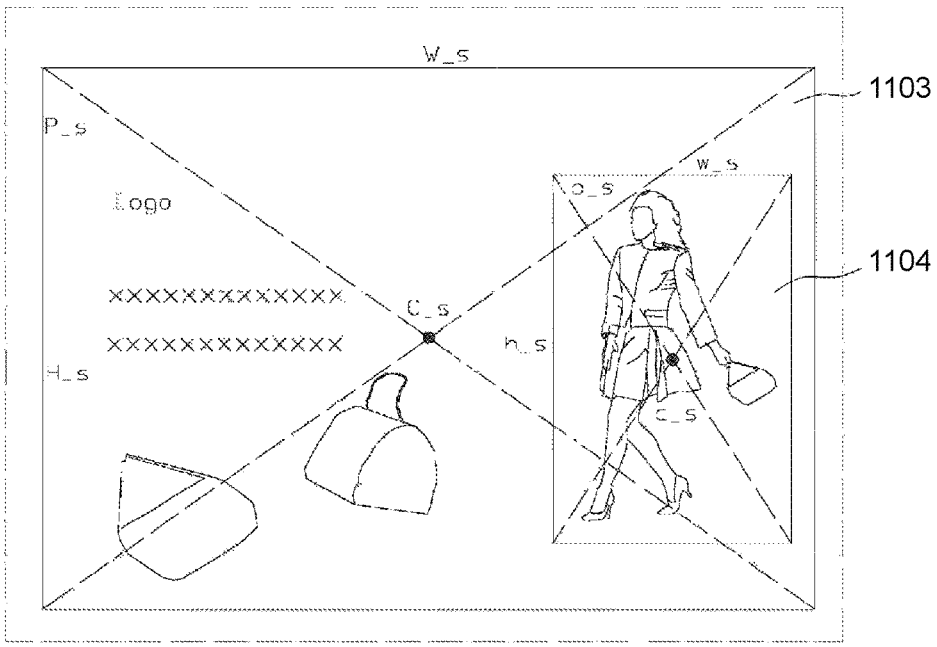
FIG. 11B illustrates an exemplary information component in an advertisement template according to some embodiments of the present disclosure.

In 1002, the generating module 410 (e.g., the determination unit) may determine the width and height of an information component corresponding to the advertisement element in the corresponding advertisement template. FIGS. 11A and 11B show an exemplary information component corresponding to an advertisement element placed in a layout template 1101 and a corresponding advertisement template 1103 respectively according to some embodiments of the present disclosure. As shown in FIG. 11A, the W represents the width of the layout template 1101. The H represents the height of the layout template 1101. The w represents the width of the information component 1102 in the layout template. The h represents the height of the information component 1102 in the layout template. As shown in FIG. 11B, the W_s represents the width of the advertisement template 1103. The H_s represents the height of the advertisement template 1103. The w_s represents the width of the information component 1104 in the advertisement template 1103. The h_s represents the height of the information component 1104 in the advertisement template 1103. In some embodiments, the width and height of the layout template 1101 and the corresponding advertisement template 1103 may be known. The width and height of the information component 1102 in the layout template may be known. The width of the information component 1104 in the corresponding advertisement template may be determined according to Equation (6):

$$w\_s = w * (W\_s / W) \qquad (6).$$

Moreover, the height of the information component 1104 in the corresponding advertisement template may be determined according to Equation (7):

$$h\_s = h * (w\_s/w) \quad (7).$$

In 1003, the generating module 410 (e.g., the determination unit) may determine the coordinates of the information component in the corresponding advertisement template. The coordinates of the information component in the layout template may be known. The generating module 410 (e.g., the determination unit) may determine the coordinates of the information component in the corresponding template based on the coordinates of the information component in the layout template. Taking FIGS. 11A and 11B as an example, the determination of the coordinates of the information component in the corresponding advertisement template may be described as follow. The top left coordinates of the information component in the layout template may be denoted as p(x, y). The top left coordinates of the information component in the corresponding advertisement template may be denoted as p(x_s, y_s).

The generating module 410 (e.g., the determination unit) may determine the center coordinates of the layout template C(x, y), wherein C(x)=W/2, C(y)=H/2.

The generating module 410 (e.g., the determination unit) may determine the center coordinates of the information component in the corresponding advertisement template c(x, y), wherein c(x)=x+w/2, c(y)=y+h/2.

The generating module 410 (e.g., the determination unit) may determine a horizontal offset ratio of the center of the information component in the layout template R(x) as Equation (8):

$$R(x) = c(x)/C(x) = (x+w/2)/(W/2) \quad (8).$$

The generating module 410 (e.g., the determination unit) may determine a vertical offset ratio of the center of the information component in the layout template R(y) as Equation (9):

$$R(y) = c(y)/C(y) = (y+h/2)/(H/2) \quad (9).$$

The generating module 410 (e.g., the determination unit) may determine the center coordinates of the corresponding advertisement template C(x_s, y_s), wherein C(x_s)=W_s/2, C(y_s)=H_s/2.

The generating module 410 (e.g., the determination unit) may determine the center coordinates of the information component in the corresponding advertisement template c(x_s, y_s).

The generating module 410 (e.g., the determination unit) may determine a horizontal offset ratio of the center of the information component in the corresponding advertisement template R(x_s) as Equation (10):

$$R(x\_s) = c(x\_s)/C(x\_s) \quad (10).$$

The generating module 410 (e.g., the determination unit) may determine a vertical offset ratio of the center of the information component in the corresponding advertisement template R(y_s) as Equation (11):

$$R(y\_s) = c(y\_s)/C(y\_s) \quad (11).$$

The horizontal offset ratio R(x_s) and the vertical offset ratio R(y_s) of the center of the information component in the advertisement template may be same with that in the layout template. For example, R(x_s)=R(x)=(x+w/2)/(W/2); and R(y_s)=R(y)=(y+h/2)/(H/2).

The horizontal coordinate of the center of the information component in the corresponding advertisement template c(x_s) may be determined according to Equation (12):

$$c(x\_s) = C(x\_s)*R(x\_s) = W\_s/2*((x+w/2)/(W/2)) \quad (12).$$

The vertical coordinate of the center of the information component in the corresponding advertisement template c(y_s) may be determined according to Equation (13):

$$c(y\_s) = C(y\_s)*R(y\_s) = H\_s/2*((y+h/2)/(H/2)) \quad (13).$$

The top left coordinates of the information component in the corresponding advertisement template p(x_s, y_s) may be determined. The horizontal coordinate of the top left of the information component in the corresponding advertisement template may be determined according to Equation (14):

$$p(x\_s) = c(x\_s) - w\_s/2 = W\_s/2*((x+w/2)/(W/2)) - w\_s/2 \quad (14).$$

The vertical coordinate of the top left of the information component in the corresponding advertisement template may be determined according to Equation (15):

$$p(y\_s) = c(y\_s) - w\_s/2 = H\_s/2*((y+h/2)/(H/2)) - h\_s/2 \quad (15).$$

For example, the width of a layout template W is 300. The height of the layout template H is 250. The width of a corresponding advertisement template W_s is 285. The height of the corresponding advertisement template H_s is 200. The width of an information component in the layout template w is 135. The height of the information component in the layout template h is 168. The top left coordinates of the information component in the layout template p(x, y) are (157, 50). The width of the information component in the corresponding advertisement template w_s may be determined according to the Equation (6):

$$w\_s = w*(W\_s/W) = 135*(285/300) = 128.$$

The height of the information component in the corresponding advertisement template h_s may be determined according to the Equation (7):

$$h\_s = h*(w\_s/w) = 168*(128/135) = 159.$$

The horizontal coordinate of the top left of the information component in the corresponding advertisement template p(x_s) may be determined according to Equation (14):

$$p(x\_s) = W\_s/2*((x+w/2)/(W/2)) - w\_s/2 = 285/2*((157+135/2)/(300/2)) - 128/2 = 149.$$

The vertical coordinate of the top left of the information component in the corresponding advertisement template p(y_s) may be determined according to Equation (15):

$$p(y\_s) = H\_s/2*((y+h/2)/(H/2)) - h\_s/2 = 200/2*((50+168/2)/(250/2)) - 159/2 = 28.$$

In 1004, the generating module 410 (e.g., the generating unit) may determine the advertisement template based on the width, the height, and the coordinates of the information component. The width and the height of the information component may determine a size of the information component in the corresponding advertisement template. The generating module 410 (e.g., the generating unit) may process the information component according to the determined size. The coordinates of the information component may determine the location of the information component in the corresponding advertisement template. Then the generating module 410 (e.g., the generating unit) may insert the processed information component into the corresponding region of the corresponding advertisement template to generate the advertisement template.

Referring back to step 1001, in response to the determination that the location of the advertisement element is known in the layout template, the generating module 410 (e.g., the determination unit) may perform step 1005. In 1005, the generating module 410 (e.g., the generating unit) may determine the advertisement template based on a typesetting method. The typesetting method may include a top alignment, a bottom alignment, a left alignment, a right alignment, a top left alignment, a top right alignment, a bottom left alignment, a bottom right alignment, a horizontal center alignment, a vertical center alignment, an absolute center alignment (horizontal center alignment and vertical center alignment), the wide of the advertisement element same with the advertisement template, the height of the advertisement element same with the advertisement template, the area of the advertisement element same with the advertisement template, or the like, or any combination thereof. After determining the location of the advertisement element in the layout template, the generating module 410 (e.g., the generating unit) may insert the information components corresponding to the advertisement element into the advertisement region using the typesetting method based on the determined location in the advertisement template. The generating module 410 (e.g., the determination unit) may determine the advertisement template by inserting the information components into the corresponding regions of the advertisement template.

It should be noted that the above description of the process/method for determining the advertisement template is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, a fine-tuned step and a preview step may be added after generating the advertisement template. The generation module 410 may fine-tune the information component in the advertisement template to reach optimal display. The generation module 410 may preview the display effect and to assist the fine-tuned step to fine-tune the information component.

In some embodiments, the generation module 410 may process the information components in the ad generation request before inserting the information components into the one or more advertisement templates. For illustration purpose, an image may be an exemplary information component in the ad generation request to be processed as described in FIG. 12.

Figure 12:
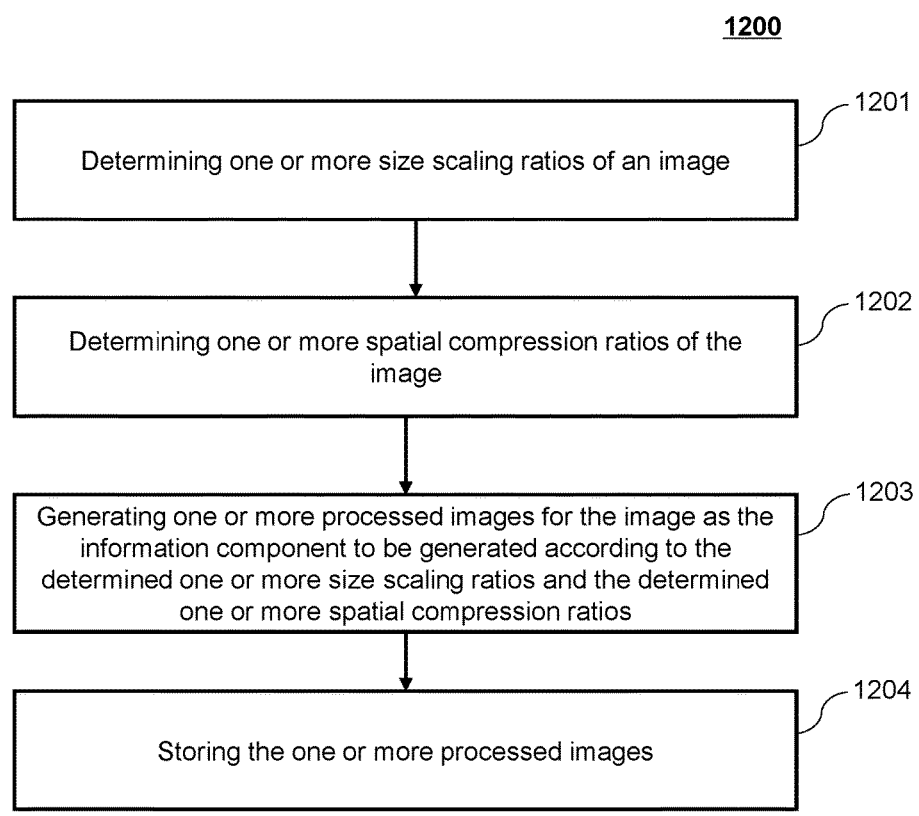
FIG. 12 is a flowchart illustrating an exemplary process for processing an image (i.e., an information component) in an ad generation request according to some embodiment of the present disclosure.

FIG. 12 is a flowchart illustrating an exemplary process and/or method 1200 for processing an image (i.e., an information component) in an ad generation request according to some embodiment of the present disclosure. The process and/or method 1200 may be executed by the online advertisement service system 100. For example, the process and/or method 1200 may be implemented as a set of instructions (e.g., an application) stored in the storage 150. The CPU 220 may execute the set of instructions, and when executing the instructions, the processor may accordingly be directed to perform the process and/or method 1200. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 12 and described below is not intended to be limiting.

In 1201, the generating module 410 (e.g., the determination unit) may determine one or more size scaling ratios of an image. In some embodiments, the image may include an image in an ad generation request received from the ad generation requester or the company which transmits the ad generation request.

In some embodiments, the generating module 410 may determine the one or more size scaling ratios of the image based the areas of the layouts in one or more advertisement templates and the area of the image. For example, the area s(n) of a layout n may be determined as s(n)=W(n)*H(n), wherein W(n) represents the width W of the layout, n and H(n) represent the height H of the layout n. The area s(p) of the image p may be determined as s(p)=W(p)*H(p), where W(p) represents the width W of the image p, and H(p) represents the height H of the image p.

The generating module 410 may determine a size scaling ratio r(s) of the image p based on Equation (16) as follows:

$$r(s)=s(n)/s(p) \qquad (16).$$

In 1202, the generating module 410 (e.g., the determination unit) may determine one or more spatial compression ratios of the image. In some embodiments, the one or more spatial compression ratios of the image may be determined based on the maximum space occupations of the layouts in one or more advertisement templates and the maximum space occupation of the image. The maximum space occupation may be a maximum space that an image or a layout occupies.

For example, a spatial compression ratio r(k) of the image p may be determined by Equation (17):

$$r(k)=100*k(n)/k(p) \qquad (17),$$

wherein k(n) represents the maximum space occupation of the layout n, and k(p) represents the maximum space occupation of the image p.

The maximum space occupation of a layout may be determined based on the maximum space occupation of an advertisement template and an area occupation of the layout to the advertisement template. For example, the maximum space occupation k(n) may be determined based on k(n)=k(m)*r(n), wherein k(m) represents the maximum space occupation of an advertisement template m, and r(n) represents an area occupation of the layout n to the one or more advertisement templates.

In some embodiments, the generating module 410 may predetermine a plurality of maximum space occupations and/or a plurality of compression levels based on the areas of a plurality of advertisement templates. For example, the generation module 410 may classify the maximum space occupations and/or the compression levels into four categories according to areas of the advertisement templates. The exemplary maximum space occupation k and/or the compression level l with respect to each category may be shown in Table 2.

TABLE 2

| area of an advertisement template (s) | s ≥ 108000 | 64800 ≤ s < 108000 | 43200 ≤ s < 64800 | s < 43200 |
|---|---|---|---|---|
| maximum space occupation (k) | 250K | 200K | 150K | 100K |
| compression level (l) | level 1 | level 2 | level 3 | level 4 |

The generating module 410 may determine the maximum space occupation k(m) and the compression level l(m) of the advertisement template m from Table 2 based on the area of the advertisement template.

The area occupation of a layout may be determined based on the area of the layout and the area of an advertisement template. For example, the generating module 410 may determine the area occupation r(n) of the layout n as r(n)=s(n)/s(m). The area s(n) of the layout n may be determined according to s(n)=W(n)*H(n), wherein W(n) represents the width W of the layout n and H(n) represents the height H of the layout n. The area s(m) of an advertisement template m may be determined according to s(m)=W(m)*H(m), wherein W(m) represents the width W of the advertisement template m, and H(m) represents the height H of the advertisement template m.

In 1203, the generating module 410 (e.g., the determination unit) may generate one or more processed images for the image as the information component to be generated according to the determined one or more size scaling ratios and the determined one or more spatial compression ratios. In some embodiments, the generating module 410 may scale and/or compress the image based on the one or more size scaling ratios and/or the one or more spatial compression ratios to generate one or more processed images. For example, the generating module 410 may scale an image in response to the determination that the size scaling ratio r(s) of the image determined by Equation (16) is less than 1. The generating module 410 may not scale the image in response to the determination that the size scaling ratio r(s) of the image determined by Equation (16) is larger than or equal to 1. As another example, the generating module 410 may compress an image in response to the determination that the spatial compression ratio r(k) of the image determined by Equation (17) is less than 100. The generating module 410 may not compress the image in response to the determination that the spatial compression ratio r(k) of the image determined by Equation (17) is larger than or equal to 1.

In some embodiments, the generating module 410 may scale and/or compress the image according to an image processing application. Exemplary image processing application may include a pngquant application, an imagemagick application, etc.

In some embodiments, the generating module 410 may determine the one or more processed images based on the following process and/or method. First, the generating module 410 may determine a format of the image. For example, the generating module 410 may determine the format of the image by invoking a function "getimagsize" of the Professional Hypertext Preprocessor (PHP). The format of the image may include a Bitmap format (BMP), a Graphics Interchange Format (GIF), a Joint Photographic Experts Group (JPEP), a Portable Network Graphics (PNG), a Tag Image File Format (TIFF), or the like, or any combination thereof.

Second, the generating module 410 may determine a name of the image based on the format and the one or more compression levels. For example, the format of the image is JPEG, and the compression level is 1. The generating module 410 may determine the name of the image as "p_1.jpg".

Third, the generating module 410 may scale the image based on the corresponding size scaling ratio r(s) of the image to generate the first image. In some embodiments, the generating module 410 may determine the name of the first image based on the format. For example, if the format of the image is JPEG, the generating module 410 may determine the name of the first image as "p_resize.jpg". In some embodiments, the generating module 410 may invoke a command of the application to scale the image. For example, the generating module 410 may invoke a "convert" command of the imagemagick application. The "convert" command may include a code of "/user/sbin/convert./p.jpg-resize width(n)*height(n)./p_resize.jpg".

Fourth, the generating module 410 may compress the first image based on the spatial compression ratio r(k) of the corresponding image to generate a processed image. In some embodiments, the generating module 410 may invoke a command of the application to compress the first image. For example, the generating module 410 may invoke a "convert" command of the application. The "convert" command operation on a JPEG image may include a code of "/user/bin/convert-quality r(k)./p_resize.jpg./p_1.jpg". The "convert" command to a PNG image may include a code of "/user/sbin/pngquant./p_resize.png-quanlity=0~r(k)-f-output=./p_1.png".

In 1204, the generating module 410 may store the one or more processed images. For example, the generating module 410 may store the one or more processed images in a storage medium (e.g., the storage 150, the storage 150, the storage 390). In some embodiments, the generating module 410 may access the stored one or more processed images to determine a processed image based on the image to be dispatched and the corresponding advertisement template. For example, the image to be dispatched in the ad generation request may be inserted in an advertisement template 1. The compress level of the advertisement template 1 is 2. The generating module 410 may access the one or more processed images to output a processed image corresponding to the advertisement template with a compression level 2.

It should be noted that the above description of the process/method for processing the image in the ad generation request is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure.

Figure 13:
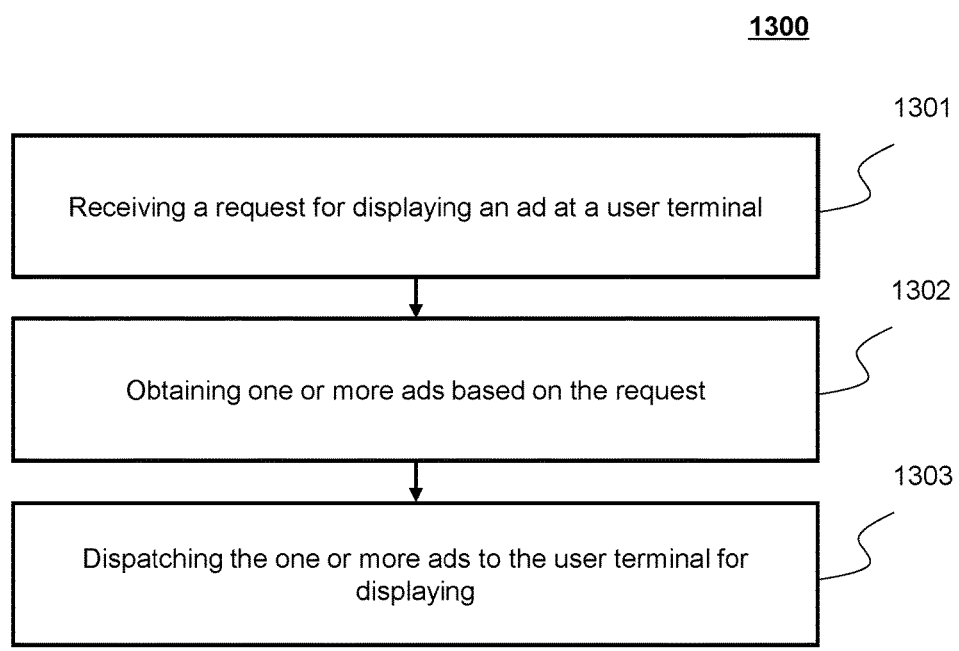
FIG. 13 is a flowchart illustrating an exemplary process for dispatching ads according to some embodiment of the present disclosure.

FIG. 13 is a flowchart illustrating an exemplary process for dispatching ads according to some embodiments of the present disclosure. The process and/or method 1300 may be executed by the online advertisement service system 100. For example, the process and/or method 1300 may be implemented as a set of instructions (e.g., an application) stored in the storage 150. The CPU 220 may execute the set of instructions, and when executing the instructions, the processor may accordingly be directed to perform the process and/or method 1300. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 13 and described below is not intended to be limiting.

In 1301, the dispatch module 420 may receive a request for displaying an ad at a user terminal. In some embodiments, the request may be an electrical signal transmitted from the user terminal via, for example, the network 120. The user terminal may include a mobile phone, a personal digital assistance (PDA), a gaming device, a navigation device, a point of sale (POS) device, a laptop, a tablet computer, a desktop, or the like, or any combination thereof.

The transmission may be wired or wireless. The electrical signal may be generated by the user terminal in response to opening a web page by a user. The web page may be a landing page designated by a company. When the landing page is opened, a script code embedded in the landing page may direct the user terminal to generate the electrical signal. Exemplary script code may include asp code, PHP code, asp.net code, javascript code, jquery code, VBScript code, dos code, etc. For example, a user may click an icon on a display of the user terminal to open a web page. The web page may have an ad slot at a corner of the web page. The codes embedded in the page may direct the user terminal to generate the request signal.

In some embodiments, the request may be an electrical signal transmitted from a third party. The third party may be a service provider associated with the landing page. For example, a user opens a web page of The New York Times on Google browser. The New York Times and Google may be regarded as two service providers. Merely by way of an example, the service provider The New York Times may generate a request for displaying an ad according to information collected from the user terminal and transmit the request to the dispatch module 420.

In some embodiments, the request for displaying an ad may include various ad information for assisting a determination of one or more ads to be displayed at the user terminal. For example, the ad information may include keyword information, size information of one or more advertisement slots on a web page, a trigger condition for displaying an ad at the user terminal, etc. The keyword information may include the keywords that the user entered to find the landing page. The size information of one or more ad slots may include the widths and heights of the one or more ad slots. The trigger condition may be the conditions that when satisfied, the dispatch module 420 may determine one or more ads based on the trigger condition. The trigger condition may include a time trigger, a location trigger, a weather trigger, a population trigger, a preference trigger, a label trigger, or the like, or the combination thereof. In some embodiments, the displaying of an ad may include displaying an ad at a site of a landing page at the user terminal, for example, a corner of the landing page.

In 1302, the dispatch module 420 may obtain one or more ads based on the request. In some embodiments, the obtaining may include selecting the one or more ads from an ads database. The ads database may be constructed based on related approaches disclosed in the present disclosure (e.g., in the description of the method and/or process 600 in FIG. 6). In some embodiments, the dispatch module 420 may determine the one or more ads based on the ad information included in the request. For example, in process 1400, the dispatch module 420 may determine the one or more ads based on the keyword information. In process 1500, the dispatch module 420 may determine the one or more ads based on the size information of one or more advertisement slots on a web page. In process 1600, the dispatch module 420 may determine the one or more ads based on the trigger condition. In some embodiments, two or more of the process 1400, process 1500, and process 1600 may be implemented by the dispatch module 420 to determine the one or more ads simultaneously. For example, the dispatch module 420 may firstly determine a plurality of candidate ads based on the keyword information. The dispatch module 420 may then determine the one or more ads from the candidate ads based on the size information of one or more advertisement slots on a web page.

In some embodiments, the dispatching may also take a data analysis of ads into consideration. The data analysis of dispatched ads may include determining at least one of a click-through rate, a number of impressions, or a conversion rate for the ads. In some embodiments, the dispatching module 420 may determine a plurality of candidate ads in 1302, and then determine one or more ads from the plurality of candidate ads based on the click-through rate of the candidate ads. For example, the candidate ads with click-through rate greater than a threshold may be determined to be transmitted to the user terminal.

In 1303, the dispatch module 420 may dispatch the obtained one or more ads to the user terminal via the network. The transmission may be wired or wireless. Alternatively, the dispatch module 420 may dispatch the determined one or more ads to the third party. The third party may further transmit the one or more ads to the user terminal.

In some embodiments, the determined one or more ads may be transmitted to the user terminal at one time. For example, five ads are determined to be displayed on the user terminal. The five ads may be transmitted to the user terminal simultaneously by the dispatch module 420 and displayed dynamically by the user terminal. In some embodiments, the determined one or more ads may be transmitted periodically to the user terminal for display. For example, five ads are determined to be displayed on the user terminal. One ad among the five ads may be transmitted to the user terminal firstly. Then after a predetermined time interval, another ad may be transmitted to the user terminal to substitute the first ad if the first ad is not clicked within the predetermined time interval.

In some embodiments, the dispatch module 420 may transmit, via the network 120, the first plurality of ads to a first group of user terminals and a second plurality of ads to a second group of user terminals. The first group of user terminals and the second group of user terminals may or may not have one or more common user terminals. For example, The dispatch module 420 may transmit, via a network (e.g., the network 120), the first plurality of ads to the first group of user terminals (e.g., user terminals 140). The determination module 430 may determine at least one of a click-through rate, a number of impressions, and/or a conversion rate for the first plurality of ads. The determination module 430 may further analyze the at least one of the click-through rate, the number of impressions, or the conversion rate of the first plurality of ads. The generation module 410 may receive the performance data related to the first plurality of ads (e.g., the determined click-through rate, number of impressions, and/or a conversion rate for the first plurality of ads) and/or the analysis results obtained by the determination module 430. The generation module 410 may also generate an ad based, at least in part on the performance data of one of the first plurality of ads (or the information components and/or the advertisement included therein). For instance, the generation module 410 may generate a new ad including the information component(s) that has the highest ranking among all the information components included in the first plurality of ads, which may be determined by the determination module 430 according to the performance data of the first plurality ads. The dispatch module 420 may receive the new ad generated by the generation module 420 and dispatch the new ad to the second group of user terminals.

Figure 14:
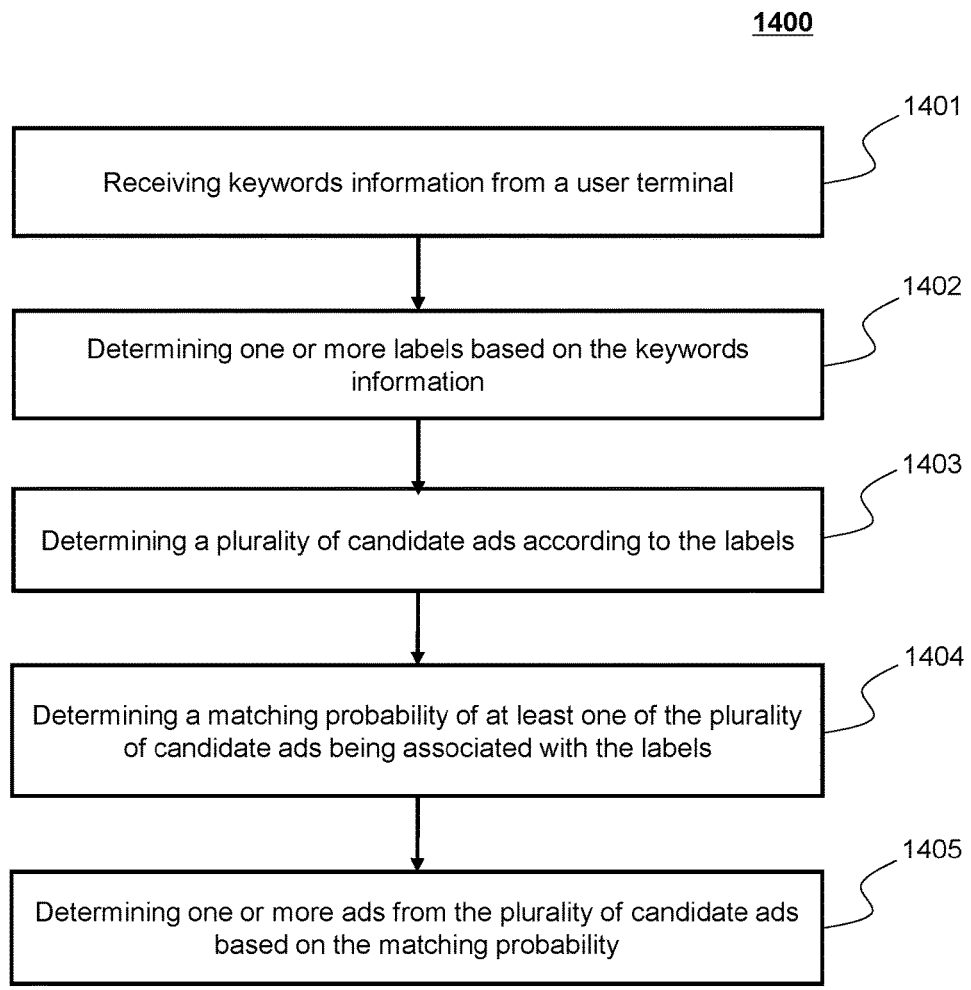
FIG. 14 is a flowchart illustrating an exemplary process for determining one or more ads based on keyword information according to some embodiment of the present disclosure.

FIG. 14 is a flowchart illustrating an exemplary process for determining one or more ads based on the keyword information according to some embodiments of the present disclosure. The process and/or method 1400 may be executed by the online advertisement service system 100. For example, the process and/or method 1400 may be implemented as a set of instructions (e.g., an application) stored in the storage 150. The CPU 220 may execute the set of instructions, and when executing the instructions, the processor may accordingly be directed to perform the process and/or method 1400. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 14 and described below is not intended to be limiting. In some embodiments, step 1302 may be performed according to the process 1400 for determining one or more ads based on the request (e.g., the keyword information included in the request).

In 1401, the dispatch module 420 may receive keyword information from a user terminal. In some embodiments, the keyword information may include the keywords entered by the user via the user terminal. The keywords may include various types including a text, a sound, an image, a video, etc. In some embodiments, the keywords in various formats may be a word, a phrase, a sentence, or the like, or a combination thereof. In some embodiments, the keywords may be provided by the landing page. For example, a script code may be embedded in the landing page for keywords extraction. When the user visits the landing page through clicking a web page link as a searching result based on one or more keywords, the embedded codes may direct the user terminal to extract the keywords. The user terminal may then transmit the request including information about the extracted keywords. Alternatively, the third party may generate a request according to the keyword information from a user terminal and transmit the request including information about the extracted keywords to the dispatch module 420.

In 1402, the dispatch module 420 may determine one or more labels based on the keywords. The labels may represent the groups associated with the keywords. The labels may also be bridges between the keywords and the one or more ads to be determined. For example, a keyword may be associated with one or more labels. A label may be associated with one or more ads. Thus, the keyword may be associated with the one or more ads. In some embodiments, a keyword may be associated with one or more labels. For example, a keyword "apple" may correspond to a label $P_1$ representing a kind of fruit, a label $P_2$ representing a company, a label $P_3$ representing a movie, etc. Alternatively or additionally, a label may correspond to one or more keywords. For example, a label "taxi" may associate with keywords such as "DiDi," "KuaiDi," "Uber," etc. In some embodiments, the relationship between the labels and the keywords may be determined in advance by semantic analysis based on one or more keywords provided by the company requesting for dispatching ads. The keywords may include a word, a phrase, a sentence, etc. The semantic analysis may include Latent semantic analysis, Latent Dirichlet allocation, etc. The semantic analysis may be performed based on a database. The database may include an elementary-term database, a general-term database, a specialized-term database, a private-term database, etc. For example, according to keywords such as "LOL," "Lee Sin," "Yasso," and "Summoner's Rift," a label "League of Legends" may be determined to correspond to the keywords.

In 1403, the dispatch module 420 may determine a plurality of candidate ads according to the labels. In some embodiments, dispatch module 420 may select the plurality of candidate ads from the ad database (e.g., determined by the method and/or process 600 in FIG. 6) based on the labels. As explained above, a label may be associated with one or more ads. The relationship between the labels and the ads may be predetermined. The one or more ads may be complete ads, the elements included in the ads, or the like, or a combination thereof. The elements may include a text, a product image, a logo image, or the like.

In some embodiments, the dispatch module 420 may determine one or more correlation parameters between a label determined in 1402 and the corresponding candidate ads. The correlation parameters may represent a correlation between a label and an ad. For example, a label A may be associated with an ad N1, an ad N2, and an ad N3. Three correlation parameters of the label A may be determined by the dispatch module 420 for the ad N1, the ad N2, and the ad N3, respectively. In some embodiments, the correlation parameters may be initialized as 1. The correlation parameter of an ad may be adjusted according to a Click-through Rate (CTR) of the ad. For example, the data analysis module 440 may perform a statistical analysis on the CTR of an ad under different labels and adjust correlation parameters of the ad with the different labels.

In 1404, the dispatch module 420 may determine a matching probability of at least one of the plurality of candidate ads being associated with the labels. The matching probability used herein refers to a probability of an ad being associated with a keyword. For example, the dispatch module 420 may determine the matching probability based on correlation parameters of the plurality of ads being associated with the labels. Merely by way of example, the dispatch module 420 may determine that a keyword may be associated with a label B, a label C, and a label D. The dispatch module 420 may determine that the label B may be associated with an ad N4 (i.e., a candidate ad) with a correlation parameter of 5. The dispatch module 420 may also determine that the label C may be associated with the ad N4 with a correlation parameter of 2, an ad N5 with a correlation parameter of 3, and an ad N6 with a correlation parameter of 4. The dispatch module 420 may further determine that the label D may be associated with the ad N6 with a correlation parameter of 1. Then the correlation parameter of an ad with the keyword may be determined by the sum of correlation parameters of an ad with each of associated labels. For example, the correlation parameter of the ad N4 with the keyword may be determined by the sum of correlation parameters of the ad N4 with labels B, C, and D. As such, the correlation parameter of the ad N4 with the keyword may be determined to be 7. The correlation parameter of the ad N5 with the keyword may be determined to be 3. The correlation parameter of the ad N6 with the keyword may be determined to be 5. Then the matching probability of an ad with the keyword may be determined based on the correlation parameters. For example, the matching probability of the ad N4 with the keyword may be determined by determining a ratio of the correlation parameter of the ad N4 with the keyword to the sum of the correlation parameters of the ads N4, N5, and N6 with the keyword. As such, the matching probability of the ad N4 with the keyword may be determined to be 7/15. The matching probability of the ad N5 with the keyword may be determined to be 3/15. The matching probability of the ad N6 with the keyword may be determined to be 5/15.

In 1405, the dispatch module 420 may determine one or more ads among the plurality of candidate ads based on the matching probability. In some embodiments, the dispatch module 420 may determine the ad with the highest matching probabilities of being associated with the keywords in the candidate ads as the ad to be displayed at the user terminal. In some embodiments, the dispatch module 420 may rank the matching probabilities of the candidate ads with the keywords and determine a part of the candidate ads as the ads to be displayed at the user terminal based on the ranking. For example, the top three ads in the ranking may be determined as the ads to be displayed at the user terminal.

It should be noted that the above description of the process/method for generating the one or more ads is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the operations 1404 and 1405 may be combined. For another example, operation 1404 may be omitted. As an example, there is only one candidate ad determined in 1403.

Figure 15:
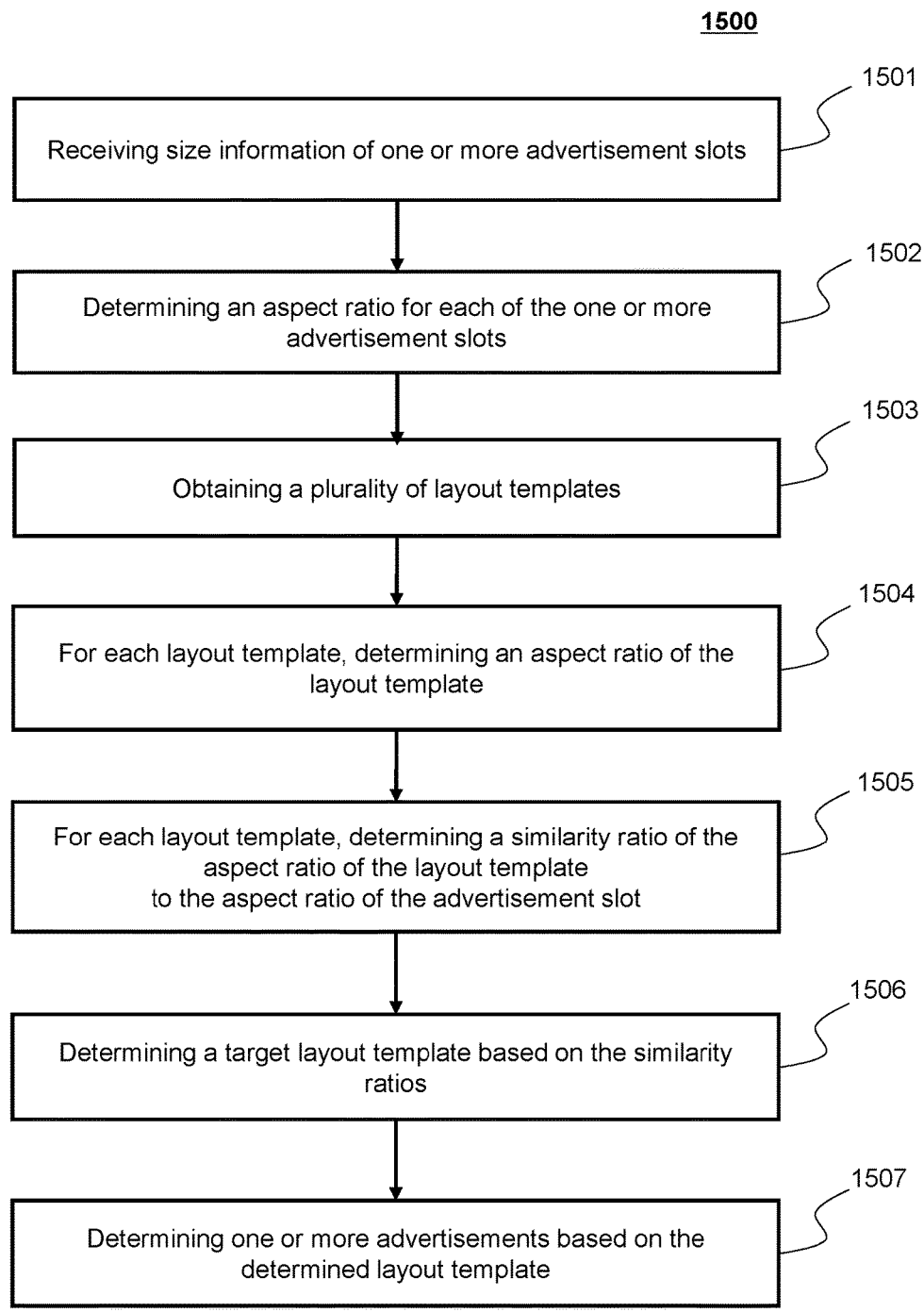
FIG. 15 is a flowchart illustrating an exemplary process for determining one or more ads based on size information of advertisement slots according to some embodiment of the present disclosure.

FIG. 15 is a flowchart illustrating an exemplary process for determining one or more ads based on the size information of advertisement slots according to some embodiments of the present disclosure. The process and/or method 1500 may be executed by the online advertisement service system 100. For example, the process and/or method 1500 may be implemented as a set of instructions (e.g., an application) stored in the storage 150. The CPU 220 may execute the set of instructions, and when executing the instructions, the processor may accordingly be directed to perform the process and/or method 1500. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 15 and described below is not intended to be limiting. In some embodiments, step 1302 of process 1300 may be performed according to the process 1500.

In 1501, the dispatch module 420 may receive a request including size information of one or more advertisement slots on a web page (also referred as ad slots). The request may be generated by a landing page based on a script code encoded in the landing page. Exemplary script code may include asp code, PHP code, asp.net code, javascript code, jquery code, VBScript code, dos code, etc. An ad slot may be used to display one or more ads for the user on the visited website. In some embodiments, the ad slot may be rectangular, and the size information of the ad slot may include a width and a height of the ad slot. The height of the ad slot may refer to the length of the side perpendicular to the horizontal plane. The width of the ad slot may refer to the length of the side parallel to the horizontal plane. For example, a rectangular ad slot on a website may have four sides. The length of the upper side and the lower side may be referred to as the width of the rectangular ad slot. The length of the left side and the right side may be referred to as the height of the square ad slot. The ad slot may be a predetermined ad slot. The predetermined ad slot may be an area of a website that a user visits. The area may locate near one of the corners of the website, or on a black area of the website. In some embodiments, the predetermined ad slot may be a script encoded in the website.

In 1502, the dispatch module 420 may determine an aspect ratio for each of the one or more advertisement slots on a web page. The aspect ratio refers to a ratio of the width to the height of the ad. In some embodiments, the dispatch module 420 may determine the aspect ratio of an ad slot by dividing the width of the ad slot by the height of the ad slot, shown in Equation (18):

$$r_a = w_a/h_a, \quad (18)$$

wherein $w_a$ refers to the width of the advertisement slot, $h_a$ refers to the height of the advertisement slot, and $r_a$ refers to the aspect ratio of the advertisement slot.

In 1503, the dispatch module 420 may obtain a plurality of layout templates. A layout template may represent a type of ad specification including, for example, size information. The layout template may be stored in a layout template database included in the storage of the present system (in, e.g., the storage 150, storage 150, storage 390). In some embodiments, a layout template may represent a plurality of ads with the same specification. In some embodiments, the dispatch module 420 may obtain the plurality of layout templates from a template database stored in the storage 150. Detail descriptions about the template database may be found elsewhere in this disclosure (e.g., FIG. 9 and the relevant description thereof). The plurality of layout templates may include a full column template, a banner template, a small banner template, a rectangle template, a small vertical template, a vertical template, etc. The plurality of layout templates may have various aspect ratios such as 10 to 3, 4 to 10, 9 to 1, etc. Detail examples for parameters of the layout template may be found elsewhere in this disclosure (e.g., FIG. 9 and the relevant description thereof).

In 1504, the dispatch module 420 may determine an aspect ratio for each layout template. In some embodiments, the dispatch module 420 may determine the aspect ratio of one of the layout templates by dividing the width of the layout template by the height of the layout template, shown in Equation (19):

$$r_m = w_m/h_m, \quad (19)$$

wherein $w_m$ refers to the width of the layout template, $h_m$ refers to the height of the layout template, and $r_m$ refers to the aspect ratio of the layout template. In some embodiments, the dispatch module 420 may determine the aspect ratios of the layout templates according to a look-up table recording the corresponding aspect ratios. The look-up table may be predetermined by the generating module 410 during layout template making process (e.g., FIG. 9), and stored in the storage 150.

In 1505, for each layout template, the dispatch module 420 may determine a similarity ratio between the layout template and the advertisement slot. A similarity ratio may be used to represent the similarity between a layout template and an ad slot. The similarity ratio may be determined based on the aspect ratio of the layout template and the aspect ratio of the ad slot. For example, the dispatch module 420 may determine a ratio of the aspect ratio of the layout template to the aspect ratio of the advertisement slot as the similarity ratio, shown in Equation (20):

$$R = r_m/r_a, \quad (20),$$

wherein, $r_m$ refers to the aspect ratio of the layout template, $r_a$ refers to the aspect ratio of the advertisement slot, and R refers to the similarity ratio.

In 1506, the dispatching module 420 may determine a layout template based on the similarity ratios. In some embodiments, the dispatch module 420 may determine a similarity value based on the similarity ratios for determining a target layout template. The target layout template may have the closest similarity ratio with the ad slot. For example, the dispatch module 420 may compare the similarity ratios with 1. In response to the determination that the similarity ratio R is greater than 1, the dispatch module 420 may determine the corresponding similarity value by transforming the similarity ratio R into a reciprocal value 1/R. In response to the determination that the similarity ratio R is not greater than 1, the dispatch module 420 may determine the corresponding similarity value as the similarity ratio R. In some embodiments, the dispatch module 420 may determine a layout template with the similarity value closest to 1 as the target layout template. In some embodiments, the dispatch module 420 may perform a scaling on the target layout template to fit the size information of the advertisement slot. For example, if the similarity value of the target template is equal to 1 with respect to the advertisement slot, the dispatch module 420 may perform a uniform scaling based on the same scaling ratio. The scaling ratio may be determined by Equation (21):

$$S_W = S_h = w_a/w_m \qquad (21),$$

wherein $S_w$ refers to a scaling ratio of the width of the target layout template, $S_h$ refers to a scaling ratio of the height of the target layout template, $w_a$ refers to the width of the advertisement slot, and $w_m$ refers to the width of the target layout template. For another example, if the similarity value of the target template is less than 1 with respect to the advertisement slot, the dispatch module 420 may perform a uniform scaling on the width of the target layout template based on a width scaling ratio. The dispatch module 420 may perform a scaling on the height of the target layout template based on a height scaling ratio. The width and the height scaling ratios may be respectively determined by Equations (22) and (23):

$$S_W = w_a/w_m \qquad (22),$$

$$S_h = h_a/h_m \qquad (23),$$

wherein $S_w$ refers to a width scaling ratio of the target layout template, $S_h$ refers to a height scaling ratio of the target layout template, $w_a$ refers to the width of an advertisement slot, $w_m$ refers to the width of the target layout template, $h_a$ refers to the height of the advertisement slot, and $h_m$ refers to the height of the target layout template. In some embodiments, the dispatch module 420 may also scale the advertisements associated with the layout template.

In 1507, the dispatch module 420 may determine one or more advertisements based on the determined target layout template. As disclosed elsewhere in the present disclosure, a layout template may correspond to one or more advertisements. The dispatch module 420 may determine a part or all of advertisements that corresponding to the target layout template together with other dispatching approaches (e.g., the process 1400).

It should be noted that the above description of the process/method for generating the one or more ads is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the operation 1503 and the operation 1504 may be combined into one operation.

Figure 16:
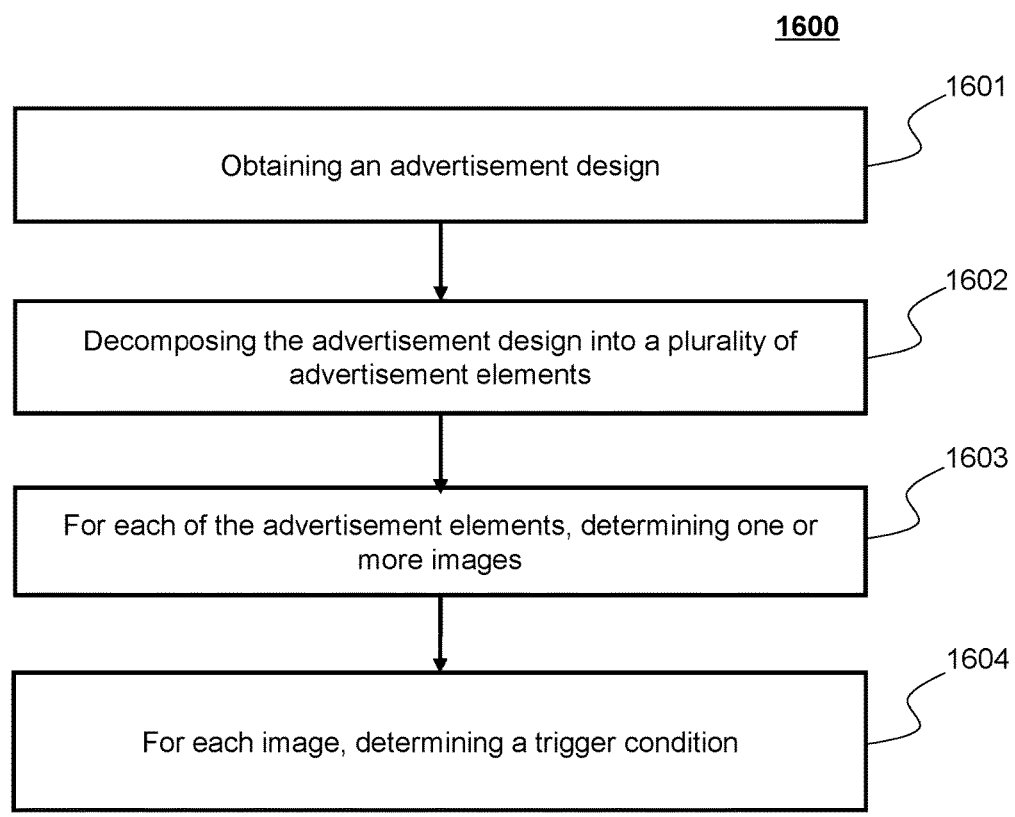
FIG. 16 is a flowchart illustrating an exemplary process for determining one or more trigger conditions for an advertisement element according to some embodiment of the present disclosure.

FIG. 16 is a flowchart illustrating an exemplary process for determining a trigger condition for an advertisement element according to some embodiments of the present disclosure. The process and/or method 1600 may be executed by the online advertisement service system 100. For example, the process and/or method 1600 may be implemented as a set of instructions (e.g., an application) stored in the storage 150. The CPU 220 may execute the set of instructions, and when executing the instructions, the processor may accordingly be directed to perform the process and/or method 1600. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 16 and described below is not intended to be limiting. In some embodiments, step 1302 of process 1300 may be performed for determining one or more images (i.e., a type of advertisement elements) according to the process 1600.

In some embodiments, the advertisement element may refer to the data portion of an advertisement. Exemplary advertisement elements may include a logo element, a product element, a copywrite element, a background element, a model element, a button element, an ornament element, or the like, or a combination thereof. One or more advertisement elements may consist an advertisement. The trigger condition may refer to conditions directing to an ad. When the trigger condition is satisfied, the dispatch module 420 may identify the corresponding ad. Exemplary trigger condition may include a time trigger, a location trigger, a weather trigger, a population trigger, a preference trigger, a label trigger, or the like, or a combination thereof.

In some embodiments, the dispatch module 420 may determine the one or more ads based on the trigger condition. The correlations between the trigger condition and the advertisement elements used to construct the one or more ads may be pre-determined by implementing the process 1600.

In 1601, the dispatch module 420 may obtain an advertisement design. The advertisement design may be an editable ad file, including a bitmap, a vector graph, or the like, or a combination thereof. The bitmap may include a PhotoShop file, a PowerPoint file, a Krita file, etc. The vector graph may include a CorelDRAW file, a RealDraw file, a YouiDraw file, an Adobe Illustrator file, a Visio file, etc. The advertisement design may include a plurality of advertisement elements. In some embodiments, the advertisement design may correspond to one or more advertisements by substituting one or more advertisement elements in an advertisement by one or more other advertisement elements. For example, the advertisement design may correspond to a series of advertisement schemes for a product or a service. The series of advertisement schemes may be generated by substituting one or more advertisement elements in one or more advertisements by other advertisement elements. For example, the first advertisement with a three-dimensional view of a product may be substituted by a front view of the product to generate a second advertisement with a front view of the product. In this way, a series of advertisements containing the three-dimensional view, the front view, the back view, the side view, the top view and the bottom view of the product may be generated. In some embodiments, the dispatch module 420 may obtain the advertisement design from the generating module 410, the data analysis module 440 or the storage 150.

In 1602, the dispatch module 420 may decompose the advertisement design into a plurality of advertisement elements. The advertisement elements may be classified in terms of content, e.g., a logo element, a product element, a copywrite element, a background element, a model element, a button element, an ornament element, or the like, or a combination thereof. In some embodiments, the advertisement elements may be classified in terms of format, e.g., a layer element. The layer element may include size information of the layer element, location information of the layer element in the advertisement design.

In some embodiments, the dispatch module 420 may decompose the advertisement design based on the layers. For example, the dispatch module 420 may decompose the advertisement design into a plurality of layers. In some embodiments, the dispatch module 420 may decompose the advertisement design according to image segmentation methods. The image segmentation methods may include a region-based segmentation method, an edge-based segmentation method, or the like, or a combination thereof. For example, the dispatch module 420 may decompose the advertisement design into a plurality of advertisement elements according to the region-based segmentation method.

In some embodiments, the dispatch module 420 may transform the format of each of the decomposed elements into a web page format. The format of the decomposed elements may include PSD format, EPS format, JPEG format, jpg format, BMP format, png format, TIFF format, PCX format, VCD format, VSDX format, etc. The web page format may include HTML format, ASP format, JSP format, PHP format, ASPX format, JSP X format, CGI format, etc. The HTML web page format may include HTML format, DHTML format, XHTML format, SHTM format, SHTML format, etc. For example, the dispatch module 420 may transform the PSD format of an advertisement element into an html5 format. The html5 format is the fifth generation HTML standard agreement.

In some embodiments, the dispatch module 420 may determine a label for each of the advertisement elements. The label may be a name for one or more advertisement elements. For example, the dispatch module 420 may label the one or more advertisement elements configured to show product images as "product."

In 1603, the dispatch module 420 may determine one or more images for each of the advertisement elements. An advertisement element may correspond to one or more images based on the topics or the content of the images. For example, the dispatch module 420 may determine images with product images for a product element.

In 1604, the dispatch module 420 may determine a trigger condition for each image. The trigger condition may include a time trigger, a location trigger, a weather trigger, a population trigger, a preference trigger, a label trigger, or the like, or a combination thereof. The time trigger may be a time condition directing to an ad. Exemplary time trigger condition may include a day time trigger, a night time trigger, a morning time trigger, a noontime trigger, or the like, or a combination thereof. The location trigger may be a location condition directing to an ad. Exemplary location trigger condition may include a country trigger, a city trigger, a home trigger, an office trigger, a public location trigger, or the like, or a combination thereof. The weather trigger may be a weather condition directing to an ad. Exemplary weather trigger condition may include a sunny day trigger, a raining day trigger, a windy day trigger, a snowy day trigger, a summer day trigger, a winter day trigger, or the like, or a combination thereof. The population trigger may be a population condition directing to an ad. Exemplary population trigger condition may include a teenager trigger, an adult people trigger, an aged people trigger, a male trigger, a female trigger, or the like, or a combination thereof. The preference trigger may be a preference condition directing to an ad. Exemplary preference trigger condition may include a color preference trigger, a star preference trigger, a field preference trigger, or the like, or a combination thereof. The label trigger may be a content implication directing to an ad. Exemplary label trigger condition may include a specific label. For example, a female trigger and/or a star preference trigger may be determined for one or more images with male models. When the user is an adult woman, the images with male models may be determined as candidate ads for displaying on the user terminal. For another example, a teenager trigger and/or a snowy trigger may be determined for one or more images with a thick winter pant for teenagers. When a teenage user wants to buy pants, and the weather is snowy, the images with thick winter pants for teenagers may be determined as candidate ads for displaying on the user terminal. For another example, a noontime trigger, an office trigger and/or a summer day trigger may be determined for one or more images with a set meal containing a cold drink. When a user searches a take-out on the website at the noon of a hot summer day, the images with a set meal containing a cold drink may be determined as candidate ads for displaying on the user terminal.

In some embodiments, the dispatch module 420 may determine the trigger condition for an image based on statistical data. The statistical data may include various information when an ad or a type of ad is presented to the user. The various information may include time information, location information, weather information, user information, CTR information, or the like, or a combination thereof. The statistical data may be obtained from the data analysis module 440.

In some embodiments, the dispatch module 420 may receive a request for displaying an ad at a user terminal. The request may include various information that a landing page records when the user visits the landing page. The various information may include time information, location information, weather information, user information, CTR information, or the like, or a combination thereof. In some embodiments, the dispatch module 420 may determine trigger condition in the request. For example, the dispatch module 420 may determine the trigger condition in the request according to the content contained in the request. In some embodiments, the dispatch module 420 may determine one or more ads based on the trigger condition and corresponding ads of which determined by process 1600. Then the dispatch module 420 may transmit the determined ads to the user terminal for display.

It should be noted that the above description of the process/method for generating the one or more ads is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, operation 1602 may be omitted when the obtained advertisement design in 1601 are a plurality of advertisement elements per se.

Figure 17:
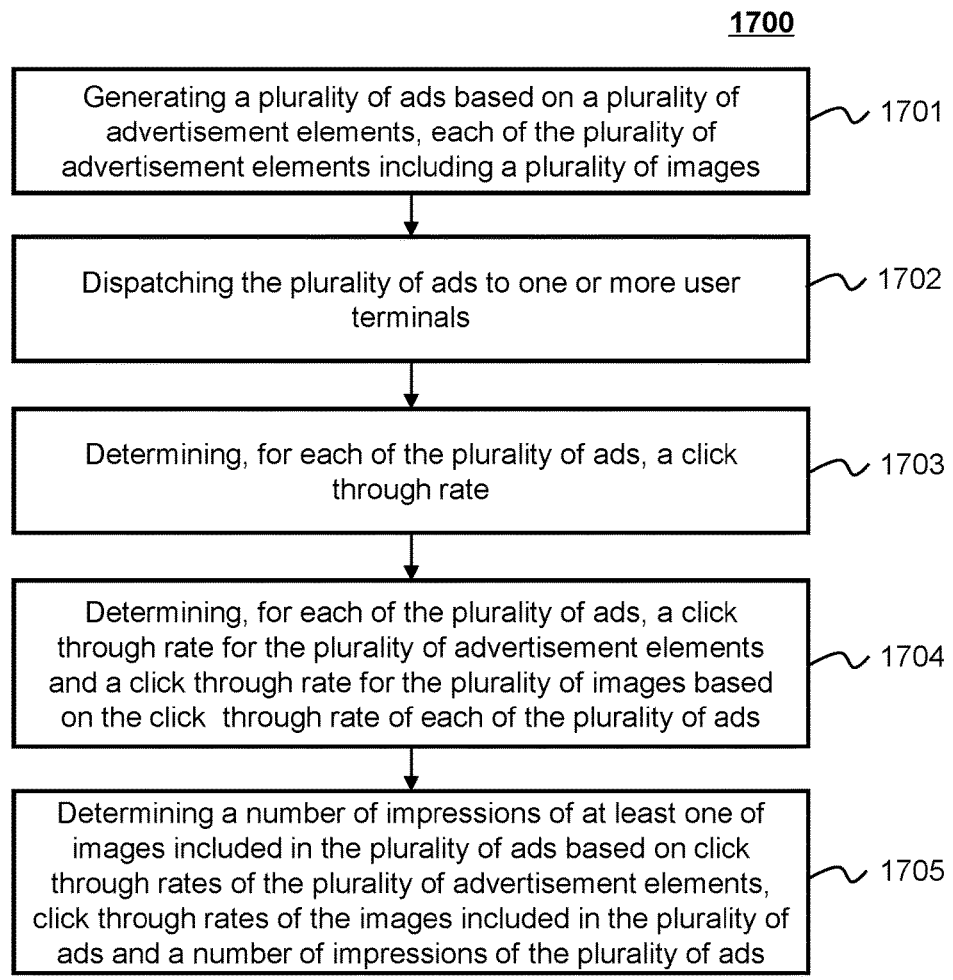
FIG. 17 is a flowchart illustrating an exemplary process for determining an impression of an image according to some embodiment of the present disclosure.

FIG. 17 is a flowchart illustrating an exemplary process and/or method 1700 for determining the number of impressions of an image according to some embodiments of the present disclosure. The process and/or method 1700 may be executed by the online advertisement service system 100. For example, the process and/or method 1700 may be implemented as a set of instructions (e.g., an application) stored in the storage 150. The CPU 220 may execute the set of instructions, and when executing the instructions, the processor may accordingly be directed to perform the process and/or method 1700. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 17 and described below is not intended to be limiting.

In 1701, the generating unit 410 may generate a plurality of ads. An ad may include a plurality of advertisement elements. In some embodiments, an advertisement element may relate to a logo, a product, a model, a copywrite, a button, a background, an ornament, an industry classification, an industry subclassification, a business name, or the like, or a combination thereof. Merely by way of example, for an ad of a lipstick, the ad may include four advertisement elements relating to logos, products, copywrite, and/or models. The advertisement element may include a plurality of images. It should be noted that an image is merely a material (also referred to as information component) of the advertisement element and is not intended to be limiting. The information component may include other suitable forms, for example, a text, a video. For example, for an advertisement element relating to products, the advertisement element may include one or more images of the products. More particularly, for example, the advertisement element may include four images of the products including an image of product A, an image of product B, an image of product C, and an image of product D.

In some embodiments, the generating module 410 may generate the plurality of ads by combining one or more advertisement elements, i.e., by combining one or more information components (e.g., one or more images) included in the one or more advertisements respectively. For illustration purposes only, a generation of the plurality of ads is used below as an example and is not intended to be limiting. Assume that an ad includes four advertisement elements (for example, an advertisement element relating to products, copywrite, logos, and buttons), the advertisement element relating to products includes three images (for example, an image of product A, an image of product B, an image of product C), the advertisement element relating to copywrite includes four images, the advertisement element relating to logos includes one image, and the advertisement element relating to buttons includes one image. The generating unit 410 may select one image of the advertisement element relating to products, copywrite, logos, and buttons respectively and generate an ad. For example, the generating unit 410 may select one of the images of product A, the image of product B, and the product C as an advertisement element to generate the ad. Accordingly, the generating unit 410 may generate twelve (i.e., 3*4*1*1) ads based on the advertisement elements relating to products, copywrite, logos, and buttons.

In some embodiments, the plurality of ads may be generated according to the process 600, process 700, process 800, process 900, process 1000, process 1200, or a combination of thereof.

In 1702, the dispatch module 420 may dispatch the generated ads to one or more user terminals. The one or more user terminals may display the ads received on one or more channels. The one or more channels refer to mediums displaying the plurality of ads, for example, Facebook, Weibo, and Twitter. In some embodiments, the plurality of ads may be shown at the user terminals in a given period. The period may be set automatically by, for example, by the dispatch module 420, or manually by a operator of the dispatch module 420. The period may be set falling in a specific period, for example, from 14:00 p.m. to 18:00 p.m. The period may be one hour, two hours, or any suitable ranges.

In some embodiments, the generated ads may be dispatched to one or more user terminals according to the process 1300, process 1400, process 1500, process 1600, or a combination thereof.

In 1703, the determination module 430 may determine, for each of the plurality of ads, a click-through rate. The click-through rate of an ad used herein refers to a ratio of the number of clicks on the ad to the number of impressions of the ad, and the impression refers to a visit by a user terminal to one or more channels displaying the ad.

In some embodiments, the number of clicks and the number of impressions of each of the plurality of ads may be measured in a pre-determined period. The predetermined period may be set manually by a user or automatically by, for example, the determination module 430. The predetermined period may be set falling in a given period, for example, from 14:00 p.m. to 18:00 p.m. The pre-determined period may be one hour, two hours, one day, one week, one month, or any suitable ranges.

In 1704, the data analysis module 440 may determine, for each of the plurality of ads, a click-through rate of the plurality of advertisement elements and a click-through rate for the plurality of images based on the click-through rate of each of the plurality of ads. The click-through rate of an advertisement element may refer to an average of click-through rates of information components included in the advertisement element. For illustration purposes only, assume that an advertisement element includes four images. The click-through rate of the advertisement element may refer to an average of click-through rates of the four images. The click-through rate of an image may refer to a ratio of the total number of clicks of one or more ads including the image to the total number of impressions of the one or more ads. For illustration purposes only, for an image, assume that four ads include the image. The click-through rate of the image may refer to a ratio of the number of clicks of the four ads to the number of impressions on the four ads.

In 1705, the data analysis module 440 may determine a number of impressions of at least one of images included in the plurality of ads based on click-through rates of the plurality of advertisement elements, click-through rates of the images included in the plurality of ads and a number of impressions of the plurality of ads. The number of impressions of the plurality of ads may be pre-determined by determined by, for example, the dispatch module 420 or an operator of the dispatch module 420. For example, the dispatch module 420 may determine the number of impressions for the ads to be deployed to one or more channels or web pages according to an advertisement campaign, which may be specified by a company or an agency.

In some embodiments, the data analysis module 440 may determine the number of impressions of an image based on a ratio of a weight of the image and a total weight of images included in the plurality of ads and the number of impressions of the plurality of ads. The weight of the image used herein refers to a ratio of a click-through rate of the image to a click-through rate of an advertisement element including the image. In some embodiments, the weight of the image may be determined by Equation (24) below:

$$\text{Weight}(n) = \frac{Ctr(n)}{Ctr}, \quad (24)$$

where Weight (n) represents a weight of an image, Ctr(n) represents a click rate of the image, and Ctr represent a click rate of an advertisement element including the image.

The total weight of images included in the plurality of ads refers to the sum of the weights of images included in the plurality of ads. In some embodiments, the total weight of images included in the plurality of ads may be determined as Equation (25) below:

$$\text{Weight}=\text{Weight}(1)+\text{Weight}(2),\ldots,+\text{Weight}(n) \quad (25),$$

where Weight represents a total weight of a plurality of images (e.g., images included in a plurality of ads displayed on one or more channels), and Weight(1), Weight(2), ..., Weight(n) represent a weight of an image respectively.

In some embodiments, the data analysis module 440 may determine the number of impressions of the image according to Equation (26) below:

$$\text{Impression}(n) = X * \frac{\text{Weight}(n)}{\text{Weight}}, \quad (26)$$

where Impression (n) represents an impression of an image, X represents the number of impressions of the plurality of ads displayed, Weight(n) represents a weight of the image, and Weight represents a total weight of a plurality of images included in the plurality of ads displayed. Merely by way of example, an advertisement element related to products may include four images of products (e.g., an image of product A, an image of product B, an image of product C, an image of product D), the number of impressions of ads displayed is 1,000,000, the click-through rate of the image of product A is 1.1%, the click-through rate of the image of product B is 1.2%, the click-through rate of the image of product C is 1.3%, and the click-through rate of the image of product D is 1.4%. The data analysis module 440 may determine the click rate of the advertisement element as 1.25%, i.e., (1.1%+1.2%+1.3%+1.4%)/4. The weight of the image of product A, the image of product B, the image of product C, and the image of product D, are 0.88 (i.e., $$\frac{1.1\%}{1.25\%}),$$

0.96 (i.e., $$\frac{1.2\%}{1.25\%}),$$

1.04 (i.e., $$\frac{1.3\%}{1.25\%}),$$

and 1.12 (i.e., $$\frac{1.4\%}{1.25\%}),$$

respectively. The total weight of the four images may be 4 (i.e., 0.88+0.96+1.04+1.12). The data analysis module 440 may also determine the number of impressions of at least one of the four images. For example, the number of impressions of the image product A may be 1000000*0.88/4, i.e., 220000. Similarly, the number of impressions of the image product B may be 240000, the number of impressions of the image product C may be 260000, and the number of impressions of the image product D may be 280000. The statistics may be represented in table 3 as below:

TABLE 3

| Advertisement Element Regarding Products (image) | Click-through Rate | Weight | Impressions |
| --- | --- | --- | --- |
| Product A | 1.1% | 0.88 | 220000 |
| Product B | 1.2% | 0.96 | 240000 |
| Product C | 1.3% | 1.04 | 260000 |
| Product D | 1.4% | 1.12 | 280000 |
| Total | 1.25% | 4 | 1000000 |

According to the data collected discussed above regarding the impressions of advertisement elements and images, the data analysis module 440 may further generate one or more analysis results. For example, the data analysis module 440 may determine that the image of product D is more popular than the images of product A, product B, and product C. The image of product D may be determined to have more impressions than other images.

It should be noted that the above description of the process/method for determining the number of impressions of an image is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the data analysis module 440 may update the number of impressions of an image dynamically according to a specific period (e.g., one month, fifteen days). As another example, the data analysis module 440 may determine more than one numbers of impressions of an image corresponding to different periods and determine an average number of impressions of the image.

Figure 18:
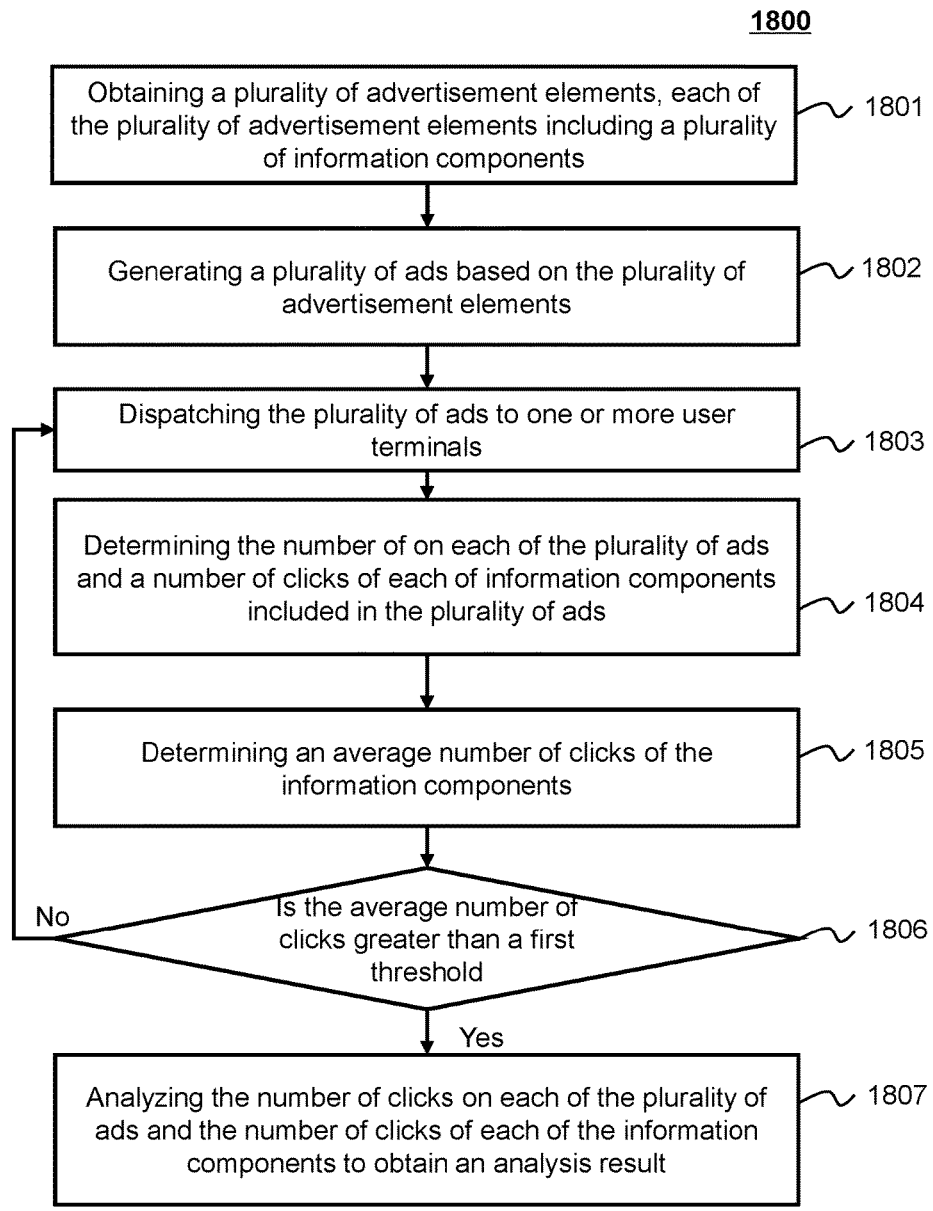
FIG. 18 is a flowchart illustrating an exemplary process for generating an analysis result according to some embodiment of the present disclosure.

FIG. 18 is a flowchart illustrating an exemplary process and/or method 1800 for generating an analysis result according to some embodiments of the present disclosure. The process and/or method 1800 may be executed by the online advertisement service system 100. For example, the process and/or method 1800 may be implemented as a set of instructions (e.g., an application) stored in the storage 150. The CPU 220 may execute the set of instructions, and when executing the instructions, the processor may accordingly be directed to perform the process and/or method 1800. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 18 and described below is not intended to be limiting.

In 1801, the generating module 410 may obtain a plurality of advertisement elements, each of the plurality of advertisement elements including a plurality of information components. As described elsewhere in the disclosure, an advertisement element may relate to a logo, a product, a model, a copywrite, a button, a background, an ornament, or the like, or a combination thereof. An information component may include an image, a text, a video, and the like. Merely by way of example, an advertisement component relating to products may include at least one image of products.

The generating module 410 may obtain the plurality of advertisement elements via the Internet or a storage device (e.g., storage 150, storage 390).

In some embodiments, the generating module 410 may segment one or more pre-existing ads using an image segmentation technique and obtain at least one advertisement element from the one or more pre-existing ads. The image segmentation may include thresholding techniques, edge detection techniques, region-growing techniques, histogram-based techniques, and/or any image segmentation techniques.

In 1802, the generating module 410 may generate a plurality of ads based on the plurality of advertisement elements. In some embodiments, the generating module 410 may generate the plurality of ads by performing one or more operations as described in step 1701. In some embodiments, the plurality of ads may be generated according to the process 600, process 700, process 800, process 900, process 1000, process 1200, or a combination of thereof.

In 1803, the dispatch module 420 may dispatch the plurality of ads to one or more user terminals. In some embodiments, the dispatch module 420 may dispatch the plurality of ads to one or more channels. The one or more channels may belong to a same or different medium. For example, the one or more channels may include sports channel of Sina and news channel of Sina. The one or more channels may relate to the same theme. For example, the one or more channels may include the sports channel of Sina, the sports channel of Sohu, and the like. The number of visits to the one or more channels may be comparative. In some embodiments, the dispatch module 420 may dispatch the plurality of ads with the same conditions. For example, the dispatch module 420 may dispatch the plurality of ads in the same time period in the same day. As another example, the dispatch module 420 may dispatch the plurality of ads to the same channel. Thus, the numbers of clicks on different ads may be effected mainly by the information components included in the different ads.

In some embodiments, the dispatch module 420 may dispatch the same ad to different channels. The dispatch module 420 may dispatch the same ad on the different channels with the same conditions. Thus, the numbers of clicks on an ad on displayed on different channels may be effected mainly by channels. Further, the data analysis module 440 may analyze the influence of different channels on the click-through rate of ads as described below.

In some embodiments, the generated ads may be dispatched to one or more user terminals according to the process 1300, process 1400, process 1500, process 1600, or a combination thereof.

In 1804, the determination module 430 may determine the number of clicks on each of the plurality of ads and a number of clicks of each of information components included in the plurality of ads. The number of clicks of an information component may refer to the total number of clicks of one or more ads including the information component.

In 1805, the data analysis module 440 may determine an average number of clicks of the information components. In some embodiments, the data analysis module 440 may determine the number of clicks of an advertisement element. The advertisement element may include more information elements than other advertisement element included in the plurality of ads, i.e., the number of information components included in the advertisement element is greatest. The data analysis module 440 may further determine the average number of clicks of the information components based on the number of clicks of the advertisement element. The average number of clicks of the information components may refer to a ratio of the number of clicks of the advertisement element to the number of information components included in the advertisement element.

In 1806, the data analysis module 440 may determine whether the average number of clicks is greater than a first threshold. The first threshold may be set manually by a user, or automatically by, for example, by the data analysis module 440. In some embodiments, the first threshold may be set as 300.

In some embodiments, in order to determine whether the average number of clicks is greater than a first threshold, the data analysis module 440 may determine whether the number of clicks of the advertisement element that includes the most information components is greater than a second threshold. The second threshold may be a multiple of the first threshold and the number of information components included in the advertisement element. For illustration purposes, assume that an ad includes four advertisement element relating to products, logos, copywrite, and buttons, the advertisement element relating to products includes four information elements, the advertisement element relating to logos includes one information elements, the advertisement element relating to copywrite includes two information elements, the advertisement element relating to buttons includes one information elements, and the first threshold is 300. In order to determine whether the average number of clicks is greater than 300, the data analysis module 440 may determine whether the number of clicks of the advertisement element including most information components is greater than 1200, i.e., 300*4.

In response to the determination that the average number of clicks is not greater than a threshold, the process 1800 may loop back to 1803 to dispatch the plurality of ads for another period. For example, the process 1800 may dispatch the plurality of ads for one hour continually.

On the other hand, in response to the determination that the average number of clicks is greater than a threshold, the process 1800 may proceed to 1807.

In 1807, the data analysis module 440 may analyze the number of clicks on each of the plurality of ads and the number of clicks of each of the information components to obtain an analysis result. The analysis result may include a ranking of the plurality of ads, an analysis of the plurality of information components, an analysis of the one or more channels, or the like, or the combination thereof. The analysis of the plurality of information components may include a ranking of the plurality of information components.

In some embodiments, the data analysis module 440 may analyze the number of clicks on each of the plurality of ads to obtain a ranking of the plurality of ads. The data analysis module 440 may further determine the most popular ad among the plurality of ads.

In some embodiments, the data analysis module 440 may analyze the number of clicks of each of the information components to obtain a ranking of the plurality of information components. The data analysis module 440 may further determine the most popular information component among the plurality of information components.

In some embodiments, the data analysis module 440 may determine the numbers of clicks on one or more same ads displayed one different channel respectively. Further, the data analysis module 440 may analyze the numbers of clicks on the one or more same ads to obtain an analysis of the one or more channels. For example, the data analysis module 440 may determine a ranking of one or more channels according to numbers of clicks of the one or more same ads displayed on the one or more channels. The data analysis module 440 may further determine the most popular channel among the one or more channels.

In some embodiments, the data analysis module 440 may analyze the copywrite included in the plurality of ads. For example, the data analysis module 440 may analyze keywords included in the copywrite. In some embodiments, the generation module may generate new ad template and/or new ad based, at least in part, on the analysis result. For example, the data analysis module 440 may generate an analysis result for the first plurality of advertisements. The analysis result may include the click-through rate, the number of impressions, or the conversion rate of the plurality of ads (and/or of the information component of the first plurality of ads). The generation module 410 may generate a plurality of new ads based, at least in part, on a result of the analysis of the at least one of the click-through rate, the number of impressions, or the conversion rate of the first plurality of ads. For example, the generation module 410 may be more likely to select an advertisement element having a high ranking of the click-through rate (after being updated) among the advertisement elements to be inserted into a new ad. In some embodiments, the data analysis module 440 may analyze the number of impressions of each of the plurality of ads and the number of impressions of the information components to obtain the analysis result. The data analysis module 440 may analyze the conversion rate of each of the plurality of ads and the conversion rate of each of the information components to obtain the analysis result. The plurality of ads may be generated according to the process 600, process 700, process 800, process 900, process 1000, process 1100, or a combination of thereof, but with the updated scores of the ads, information components, advertisement templates, images, which are determined by the data analysis module 440 as described elsewhere in this disclosure.

It should be noted that descriptions relating to a number of clicks and/or an average number of clicks above may be used as only an example of determining an analysis result. The process 1800 may determine an analysis result based on any suitable statistics. For example, the process 1800 may determine the number of impressions of each of the plurality of ads and a number of impressions of each of information components included in the plurality of ads. Further, the process 1800 may determine an analysis result based on the number of impressions of each of the plurality of ads and the number of impressions of each of information components. As another example, the process 1800 may determine the number of conversions of each of the plurality of ads and a number of conversions of each of information components included in the plurality of ads. Further, the process 1800 may determine an analysis result based on the number of conversions of each of the plurality of ads and the number of conversions of each of information components. A conversion may refer to act, for example, purchasing a product, adding a product to a shopping cart, after clicking an ad. In some embodiments, the process 1800 may select statistics relating to at least one of a number of clicks, a number of impressions, and a number of conversions to determine the analysis result. The selection may be performed manually by a user, or automatically by, for example, the determination module 430.

Figure 19:
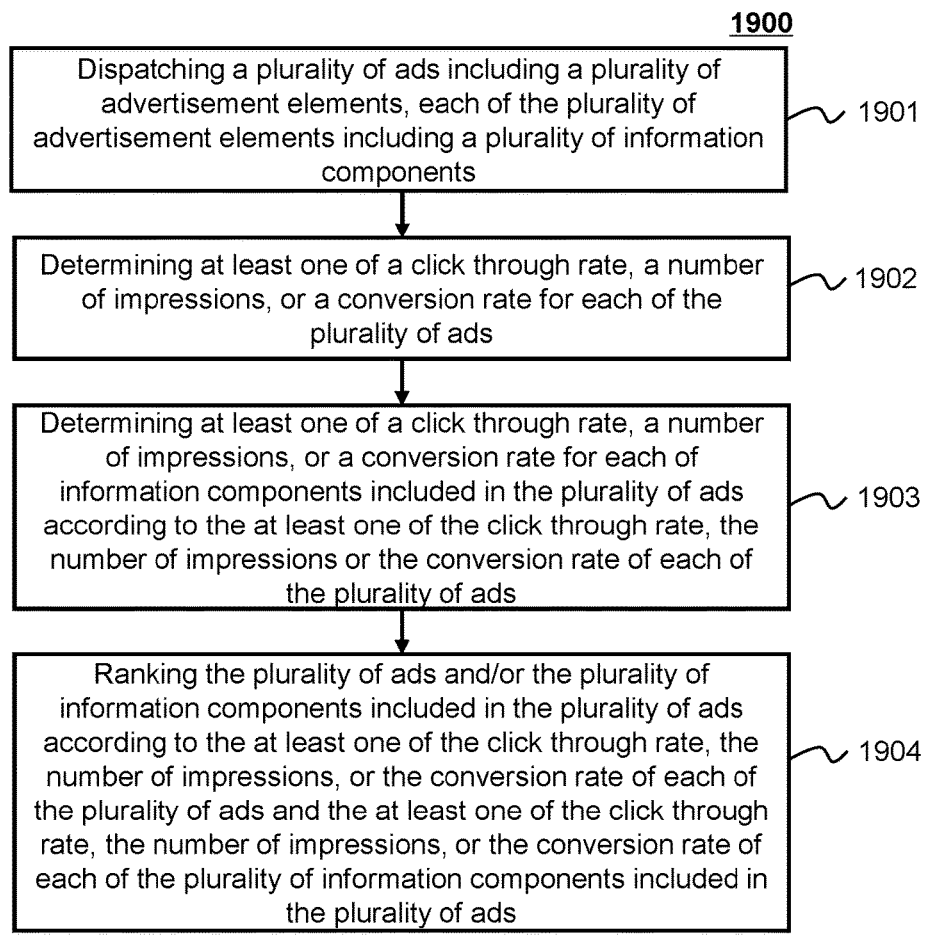
FIG. 19 is a flowchart illustrating an exemplary process for a ranking a plurality of ads and/or a plurality of information components according to some embodiment of the present disclosure.

FIG. 19 is a flowchart illustrating an exemplary process and/or method 1900 for ranking a plurality of ads and/or a plurality of information components according to some embodiments of the present disclosure. The process and/or method 1900 may be executed by the online advertisement service system 100. For example, the process and/or method 1900 may be implemented as a set of instructions (e.g., an application) stored in the storage 150. The CPU 220 may execute the set of instructions, and when executing the instructions, the processor may accordingly be directed to perform the process and/or method 1900. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 19 and described below is not intended to be limiting.

In 1901, the dispatch module 420 may dispatch a plurality of ads including a plurality of advertisement elements, each of the plurality of advertisement elements including a plurality of information components. As described elsewhere in the disclosure, the plurality of ads may be generated by the generating module 410 according to one or more advertisement elements. In some embodiments, the ads to be dispatched may be generated according to the process 600, process 700, process 800, process 900, process 1000, process 1200, or a combination of thereof. The one or more advertisements may relate to a logo, a product, a copywrite, a model, an industry classification, an industry subclassification, a business name, or the like, or a combination thereof. An information component may include an image, a text, a video, and the like.

Merely by way of example, the plurality of ads may be generated by the generating module 410 according to four advertisement elements, each relating to copywrite, products, models, and business names. The advertisement element relating to copywrite may include three information components, the advertisement element relating to products may include two information components, the advertisement element relating to models may include one information components, and the advertisement element relating to business names may include one information components. Accordingly, the generating module 410 may generate six (i.e., 3*2*1*1) ads based on the advertisement elements relating to products, copywrite, logos, and buttons.

In 1902, the determination module 420 may determine at least one of a click-through rate, a number of impressions, or a conversion rate for each of the plurality of ads. The click-through rate of an ad may refer to a ratio of the number of clicks on the ad to the number of impressions of the ad. The conversion rate of an ad may refer to a ratio of the number of conversions of the ad to the number of clicks on the ad. As described elsewhere in the disclosure, the number of impressions of an ad, the number of clicks on an ad, and the number of conversions of an ad may be obtained in a pre-determined period. In some embodiments, the pre-determined period may be one hour.

In 1903, the data analysis module 440 may determine at least one of a click-through rate, a number of impressions, or a conversion rate for each of information components included in the plurality of ads according to the at least one of the click-through rate, the number of impressions or the conversion rate of each of the plurality of ads. The click-through rate of an information component may refer to a ratio of the total number of clicks of one or more ads including the information component to the total number of impressions of the one or more ads. The number of impressions of an information component may refer to the number of impressions of one or more ads including the information component. The conversion rate of an information component may refer to a ratio of the total number of conversions of one or more ads including the information component to the total number of clicks of the one or more ads.

For illustration purposes, a determination of click-through rates of information components is used below as merely an example. For brevity purposes, an information component relating to a copywrite, a product, a model, a name may be described as a copywrite, a product, a model, a name. Assume that a first ad includes a first copywrite, a first product, a third model, and a second name. A second ad includes the first copywrite, a second product, the third model, and a first name. A third ad includes a second copywrite, the first product, the third model, and the second name. For each of the three ads, the number of clicks is one. Accordingly, the data analysis module 440 may determine that the number of clicks of the first product is 2, i.e., 1+1, the number of clicks of the third model is 3, i.e., 1+1+1, etc. Further, the data analysis module 440 may determine the click-through rate of the first product and the third model according to a number of impressions of the first product and the third model.

In 1904, the data analysis module 440 may rank the plurality of ads and/or the plurality of information components included in the plurality of ads according to the at least one of the click-through rate, the number of impressions, or the conversion rate of each of the plurality of ads and the at least one of the click-through rate, the number of impressions, or the conversion rate of each of the plurality of information components included in the plurality of ads. For example, the data analysis module 440 may determine the ranking of the plurality of ads based on one of the clicks through rates of the plurality of ads, the numbers of impressions of the plurality of ads, and the conversion rates of the plurality of ads. As another example, the data analysis module 440 may determine the ranking of the plurality of ads based on at least one of the click-through rates of the plurality of ads, the numbers of impressions of the plurality of ads, and the conversion rates of the plurality of ads. More particularly, the data analysis module 440 may assign a weight to each of the at least one of the click-through rates of the plurality of ads, the numbers of impressions of the plurality of ads, and the conversion rates of the plurality of ads respectively. Thus, for each of the plurality of ads, the ad may include a weighted click-through rate, a weighted number of impression, and a weighted conversion rate. Further, for each of the plurality of ads, the data analysis module 440 may determine a sum of the weighted click-through rate, the weighted number of impression, and the weighted conversion rate. Then the data analysis module may determine the ranking of the plurality of ads based on the sum of each of the plurality of ads.

Similarly, for the plurality of information components, the data analysis module 440 may determine the ranking of the plurality of information components based on one of the click-through rates of the plurality of information components, the numbers of impressions of the plurality of information components, and the conversion rates of the plurality of information components. Optionally, the data analysis module 440 may determine the ranking of the plurality of information components based on at least one of the click-through rates of the plurality of information components, the numbers of impressions of the plurality of information components, and the conversion rates of the plurality of information components. The data analysis module 440 may assign a weight to each of the at least one of the click-through rates of the plurality of information components, the numbers of impressions of the plurality of information components, and the conversion rates of the plurality of information components respectively. Thus, for each of the plurality of information components, the information component may include a weighted click-through rate, a weighted number of impression, and a weighted conversion rate. Further, for each of the plurality of information components, the data analysis module 440 may determine a sum of the weighted click-through rate, the weighted number of impression, and the weighted conversion rate. Then the data analysis module may determine the ranking of the plurality of information components based on the sum of each of the plurality of information components. In some embodiments, the weight of an information component and the weight of an ad may be the same or different.

To facilitate describing process 1900, an example is used below and is not intended to be limiting. Assume that an advertisement element relating to products includes product 1, product 2, product 3, and product 4. An advertisement element relating to logos includes logo 1. An advertisement element relating to copywrite includes copywrite 1, copywrite 2, and copywrite 3. An advertisement element relating to buttons includes buttons 1. For each of the information components, the data analysis module 440 may determine a click-through rate, as illustrated in Table 4.

TABLE 4

| Advertisement Element | Information Component | Click-through Rate |
|---|---|---|
| Product | Product 2 | 1.7% |
|  | Product 4 | 1.6% |
|  | Product 1 | 1.1% |
|  | Product 3 | 0.8% |
| Copywrite | Copywrite 3 | 1.375% |
|  | Copywrite 1 | 1.275% |
|  | Copywrite 2 | 1.25% |
| Logo | Logo 1 | 1.3% |
| Button | Button 1 | 1.3% |

The generating module 410 may generate twelve ads according to the information components illustrated in Table 4. For each of the ads, the data analysis module 440 may determine a click-through rate, as illustrated in Table 5. Further, the data analysis module 440 may rank the twelve ads according to the click-through rates.

TABLE 5

| Ad | Product | Copywrite | Logo | Button | Click-through Rate |
|---|---|---|---|---|---|
| Ad 1 | Product 2 | Copywrite 1 | Logo 1 | Button 1 | 2.0% |
| Ad 2 | Product 4 | Copywrite 3 | Logo 1 | Button 1 | 1.8% |
| Ad 3 | Product 2 | Copywrite 2 | Logo 1 | Button 1 | 1.6% |

TABLE 5-continued

| Ad | Product | Copywrite | Logo | Button | Click-through Rate |
|---|---|---|---|---|---|
| Ad 4 | Product 4 | Copywrite 2 | Logo 1 | Button 1 | 1.6% |
| Ad 5 | Product 1 | Copywrite 3 | Logo 1 | Button 1 | 1.5% |
| Ad 6 | Product 2 | Copywrite 1 | Logo 1 | Button 1 | 1.5% |
| Ad 7 | Product 4 | Copywrite 3 | Logo 1 | Button 1 | 1.4% |
| Ad 8 | Product 1 | Copywrite 2 | Logo 1 | Button 1 | 1.0% |
| Ad 9 | Product 3 | Copywrite 1 | Logo 1 | Button 1 | 1.0% |
| Ad 10 | Product 3 | Copywrite 3 | Logo 1 | Button 1 | 0.8% |
| Ad 11 | Product 1 | Copywrite 2 | Logo 1 | Button 1 | 0.8% |
| Ad 12 | Product 3 | Copywrite 1 | Logo 1 | Button 1 | 0.6% |

As illustrated in Table 5, the ad 1 with the greatest click-through rate may be assigned as the top ranking, and the ad 12 with least click-through rate may be assigned as the bottom ranking.

In some embodiments, the data analysis module 440 may determine the most popular combination of the information components (i.e. ad 1) according to the ranking. In some embodiments, the data analysis module 440 may determine a difference between the product 1, the product 2, the product 3, and the product 4 is greater than a difference between the Copywrite 1, the Copywrite 2, and the Copywrite 3. Further, the data analysis module 440 may determine the most important factor influencing the click-through rates of the twelve ads is the advertisement element relating to products. If the difference between the product 2 and the product 3 is color, the data analysis module 440 may determine the most important factor influencing the click-through rates of products is color.

It should be noted that the above description of the process/method for ranking a plurality of ads and/or a plurality of information components is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the data analysis module 440 may determine a click-through rate, a number of impressions, or a conversion rate for each of the plurality of advertisement elements. Further, the data analysis module 440 may rank the plurality of advertisement elements according to at least one of the click-through rate, the number of impressions, or the conversion rate for each of the plurality of advertisement element.

Figure 20:
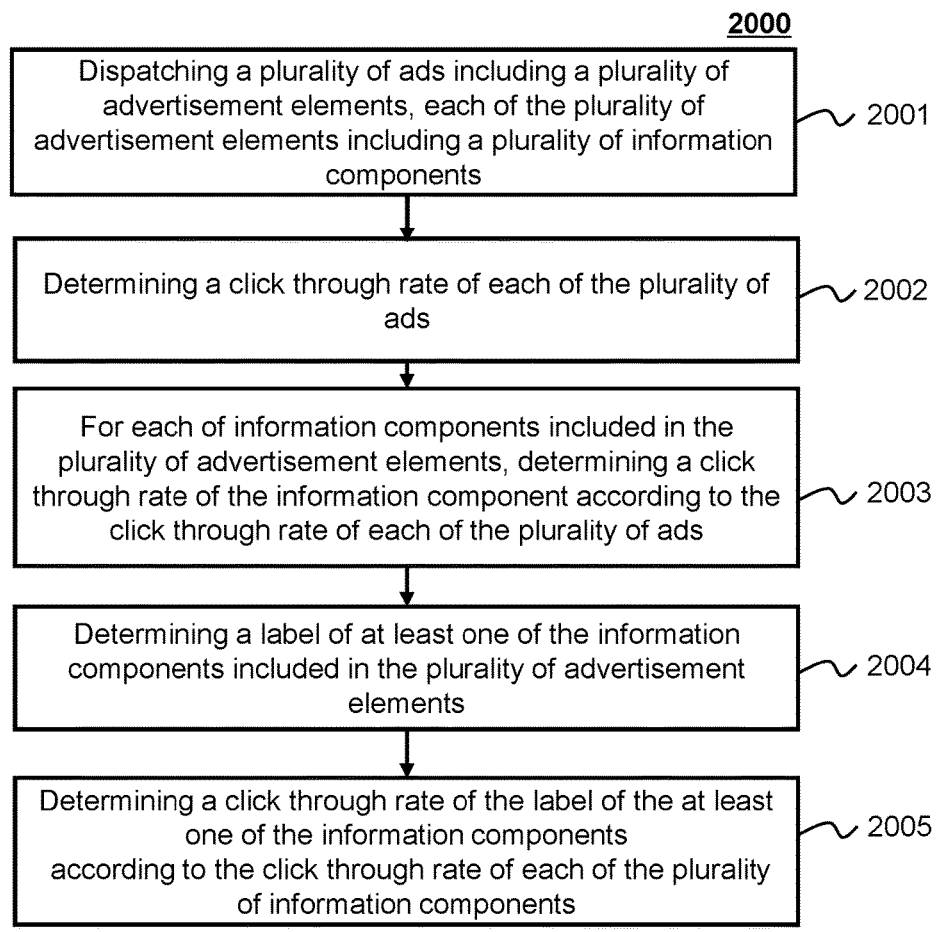
FIG. 20 is a flowchart illustrating an exemplary process for determining a click-through rate of a label of an information according to some embodiment of the present disclosure.

FIG. 20 is a flowchart illustrating an exemplary process and/or method 2000 for determining a click-through rate of a label of an information component according to some embodiments of the present disclosure. The process and/or method 2000 may be executed by the online advertisement service system 100. For example, the process and/or method 2000 may be implemented as a set of instructions (e.g., an application) stored in the storage 150. The CPU 220 may execute the set of instructions, and when executing the instructions, the processor may accordingly be directed to perform the process and/or method 2000. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 20 and described below is not intended to be limiting.

In 2001, the dispatch module 420 may dispatch a plurality of ads including a plurality of advertisement elements, each of the plurality of advertisement elements including a plurality of information components. For example, an advertisement element relating to logos may include one or more logos of "mineral water." The one or more logos of "mineral water" may be different in a word front, a word size, a word color, a language, etc. In some embodiments, the dispatch module 420 may perform one or more operations described in connection with step 1901 in FIG. 19.

In 2002, the determination module 430 may determine a click-through rate of each of the plurality of ads. In some embodiments, the determination module 430 may perform one or more operations described in connect with step 1703 in FIG. 17.

In 2003, for each of information components included in the plurality of advertisement elements, the data analysis module 440 may determine a click-through rate of the information component according to the click-through rate of each of the plurality of ads. In some embodiments, the data analysis module 440 may perform one or more operations described in connect with step 1903 in FIG. 19.

In 2004, the data analysis module 440 may determine a label of at least one of information components included in the plurality of advertisement elements. In some embodiments, the data analysis module 440 may determine the label of an information component according to a position and a physical attribute of the information component. In some embodiments, details regarding the determination of the label of an information component may be found elsewhere in this disclosure (e.g., in connection with FIG. 21).

In 2005, the data analysis module 440 may determine a click-through rate of the label of the at least one of the information components according to the click-through rate of each of the plurality of information components. The click-through rate of the label of an information component may refer to an average click-through rate of one or more ads including the information component and corresponding to the same advertisement template.

In some embodiments, the process 2000 may further include determining a label in the advertisement element level. In some embodiments, the determination of the label in an advertisement element level may be performed according to the processes 2100 and 2200 illustrated in FIGS. 21 and 22.

In some embodiments, the data analysis module 440 may determine a click-through rate of the label. For example, the data analysis module 440 may determine the click-through rate of the label in the advertisement element level according to click-through rates of information components included in an advertisement element. The click-through rate of the label in the advertisement element level may refer to an average click-through rate of labels of information components included in an advertisement element.

The data analysis module 440 may also analyze click-through rates of labels of information components and click-through rates of labels in the advertisement element level. In some embodiments, the data analysis module 440 may determine an influence of a position of the information component of the click-through rate of the information component and/or click-through rates of ads including the information component. For instance, the data analysis module 440 may determine the influence of the position of the information component by comparing a click-through rate of a first label of the information component and a click-through rate of a second label of the information component. In some embodiments, the data analysis module

440 may determine an influence of a relative position of a first information component to that of a second information component according to click-through rates of the ads that include the first information component and the second information component. The data analysis 440 may compare a click-through rate of a first label in the advertisement element level and a click-through rate of a second label in the advertisement element level, and determine the influence of the relative position of the first information component to the second information component based on the comparison. The first label in the advertisement element level and the second label in the advertisement element level may relate to the same information components, and the positions of the same information components may be different. In some embodiments, the data analysis module 440 may determine that an ad having a combination of the first label of a first information component and a second label of a second information component is more popular, by analyzing click-through rates of labels in the advertisement level. The labels in the advertisement level may include at least one of the first label of the first information component and the second label of the second information component.

Figure 21:
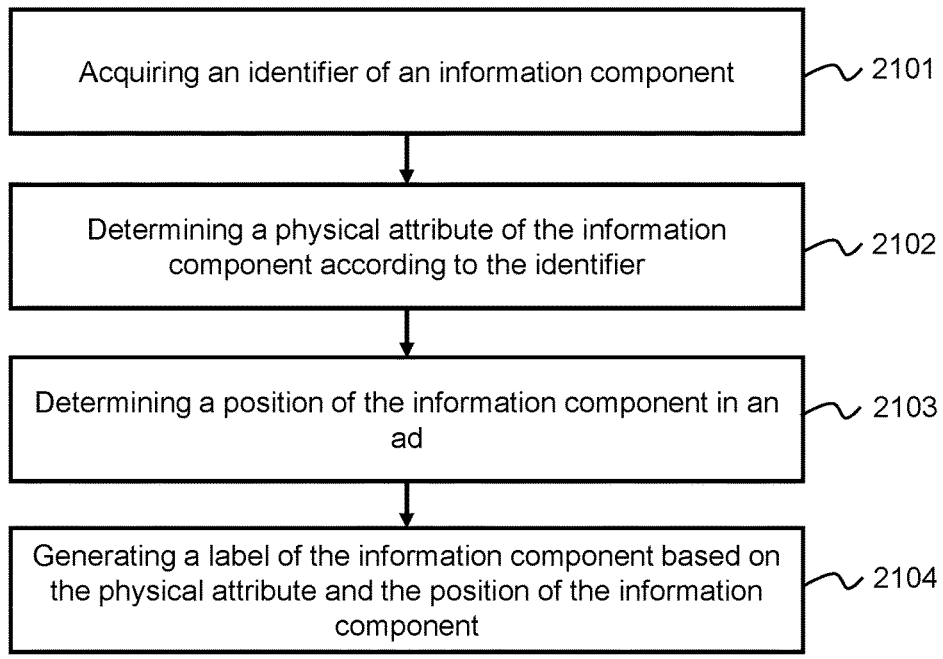
FIG. 21 is a flowchart illustrating an exemplary process for generating a label of an information component according to some embodiment of the present disclosure; and, FIG. 22 is a flowchart illustrating an exemplary process for generating a label of an advertisement element according to some embodiment of the present disclosure.

FIG. 21 is a flowchart illustrating an exemplary process and/or method 2100 for generating a label of an information component according to some embodiments of the present disclosure. The process and/or method 2100 may be executed by the online advertisement service system 100. For example, the process and/or method 2100 may be implemented as a set of instructions (e.g., an application) stored in the storage 150. The CPU 220 may execute the set of instructions, and when executing the instructions, the processor may accordingly be directed to perform the process and/or method 2100. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 21 and described below is not intended to be limiting.

In 2101, the generating module 410 may acquire an identifier of an information component. In some embodiments, information components may be stored in a memory (e.g., the storage 150). In some embodiments, each information component may be encoded and include an identifier.

In 2102, the generating module 410 may determine a physical attribute of the information component according to the identifier. Each identifier corresponds to an information component. The generating module 410 may obtain the information component according to the identifier of the information component. Further, the generating module 410 may identify and acquire the physical attribute of the information component automatically. In some embodiments, the physical attribute of an information component may include area ratio, color, quantity, race, gender, package, or the like, or the combination thereof.

For example, the generating module 410 may determine a physical attribute of logo 1 according to the identifier "123" of the logo 1. The physical attribute includes an area ratio below 10%, the blue color. As another example, the generating module 410 may determine a physical attribute of model 1 according to the identifier "456" of the model 1. The physical attribute includes an area ratio of 40%-50%, the pink color, the number of models as 1, a male model, the yellow race. As still another example, the generating module 410 may determine a physical attribute of product 1 according to the identifier "789" of the product 1. The physical attribute includes an area ratio of 40%-50%, the number of products as 2, a package as a box.

In 2103, the generating module 410 may determine a position of the information component in an ad. An ad may correspond to an advertisement template. An advertisement template may include one or more regions. Each region may correspond to an information component. The generating module 410 may determine the position of the information component according to the corresponding region in the advertisement template. In some embodiments, an advertisement template may be divided into nine regions including a top left region, a top right region, a bottom left region, a bottom right region, a middle region, a top region, a bottom region, a left region, and a right region. For example, the generating module 410 may determine the position of logo 1 in the top left region. As another example, the generating module 410 may determine the position of model 1 in the left region. As still another example, the generating module 410 may determine the position of product 1 in the right region.

In 2104, the generating module 410 may generate a label of the information component based on the physical attribute and the position of the information component. Due to positions of the same information component in different ads corresponding to different advertisement templates are different, the same information component may correspond to one or more labels. Referring the examples described in steps 2102 and 2103, the generating module 410 may generate a label of the logo 1 as "position: top left region, area ratio: below 10%, color: blue," a label of the model 1 as "position: left region, area ratio: 40%-50%, color: pink, quantity: 1, gender: man, race: yellow," a label of the product 1 as "position: right region, area ratio: 40%-50%, quantity: 2, package: box."

In some embodiments, the step 2104 may further include generating a label in the advertisement element level. In some embodiments, the label in the advertisement element level may relate to information components included in different advertisement elements. Referring the examples in steps 2102 to 2104, if an advertisement element includes the logo 1, the model 1 and the product 1, the identifier of the advertisement element is "123, 456, 789," the label in the advertisement element level is a combination of the label of the logo 1, the label of the model 1, and the label of the product 1. In some embodiments, the label in the advertisement element level may relate to information components included in the same advertisement element (also referred as to a label of an advertisement element).

Figure 22:
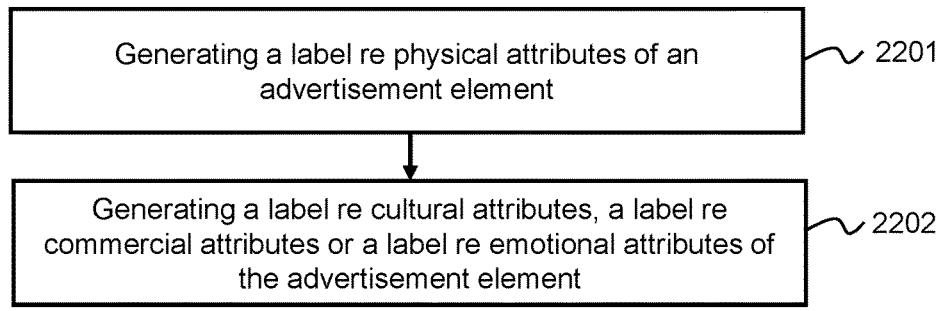

In some embodiments, step 2104 of the process 2100 may be performed according to an exemplary process illustrated in FIG. 22 for generating of a label of an advertisement element. The process and/or method 2200 may be executed by the online advertisement service system 100. For example, the process and/or method 2200 may be implemented as a set of instructions (e.g., an application) stored in the storage 150. The CPU 220 may execute the set of instructions, and when executing the instructions, the processor may accordingly be directed to perform the process and/or method 2200. The operations of the illustrated process and/or method presented below are intended to be illustrative. In some embodiments, the process and/or method may be accomplished with one or more additional operations not described, and/or without one or more of the operations discussed. Additionally, the order in which the operations of the process and/or method as illustrated in FIG. 22 and described below is not intended to be limiting.

In 2201, the generating module 410 may generate a label related to physical attributes of an advertisement element. In some embodiments, the generating module 410 may determine a physical attribute of the advertisement element using image recognition technologies or information technologies. Each physical attribute of an advertisement element corresponds to a label related to physical attributes. The corresponding relationship between a label related to physical attributes and a physical attribute may be set manually by an operator of the server 110 and stored in a storage device (e.g., the storage 150). The generating module 410 may assign a label related to physical attributes of the advertisement element according to the corresponding relationship. The label related to physical attributes may include a position of an advertisement element, an area ratio of an advertisement element, a color of an advertisement element, a label of the model, the number of lines of a text, a label of the product, or the like, or a combination thereof. The position of an advertisement element refers to its position in an ad and may be determined by the coordinates (e.g., a horizontal coordinate, a longitudinal coordinate) of pixels of the advertisement element. The area ratio of an advertisement element refers to an area of the advertisement element to an area of an ad. The color of an advertisement element refers to a main (or theme) color of the advertisement element. The label of the model may include a quantity, a gender, race, a group a model associated with, a displayed part of the model, a deflection angle of the model, a product the model takes, etc. The label of the product may include a quantity, a package, etc. In some embodiments, the color, the label of the model, and the label of the product may be determined using image recognition technologies.

In 2202, the generating module 410 may generate a label related to cultural attributes, a label related to commercial attributes, and/or a label related to emotional attributes of the advertisement element. The label related to cultural attributes may relate to culture. For example, the label re cultural attributes may include a design style (e.g., aestheticism, purity, cool tone, solemnity, high technology), taste (e.g., enthusiasm, glee, melancholy), etc. The label related to commercial attributes may relate to features of a brand personality, a purpose of a brand promotion, an attribute of the product. The brand personality may include the attributes associated with a brand (e.g., honesty, fashion, sincerity). The brand promotion may include a brand image campaign, a new release, promotion, free samples, etc. The label related to emotional attributes may refer to an emotion of a person when seeing an ad, for example, happy, unhappy, desired, and undesired. The label related to cultural attributes, the label related to commercial attributes, or the label related to emotional attributes may be set manually by a user.

It should be noted that the above description of the process/method for generating of a label of an advertisement element is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure. For example, the process 2200 may generate a label related to physical attributes after generating a label related to cultural attributes, a label related to commercial attributes or a label related to emotional attributes of the advertisement element. As another example, the process 2200 may further include generating a label related to physical attributes, a label related to cultural attributes, a label related to commercial attributes or a label related to emotional attributes for a combination of one or more advertisement elements (e.g., an advertisement element relating to models and background).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for automatically displaying advertisements on interfaces of user terminals, comprising:
    at least one network port to communicate with a first group of user terminals and a second group of user terminals via a network;
    at least one processor coupled to the at least one network port, wherein during operation the at least one processor is configured to cause the system to:
    generate a first plurality of ads including a first plurality of advertisement elements, and each of the first plurality of advertisement elements including one or more information components of a first plurality of information components;
    display the first plurality of ads on at least one interface of the first group of user terminals by transmitting, via the at least one network port, the first plurality of ads to the first group of user terminals;
    determine at least one of a click-through rate, a number of impressions, or a conversion rate for the first plurality of ads associated with the first group of user terminals;
    determine at least one of a click-through rate, a number of impressions or a conversion rate of the first plurality of information components based on the at least one of the click-through rate, the number of impressions or the conversion rate of the first plurality of ads;
    obtain a ranking of the first plurality of information components based on the at least one of a click-through rate, a number of impressions or a conversion rate of the first plurality of information components;
    automatically generate a second plurality of ads including at least one information component of the first plurality of information components based, at least in part, on the ranking; and
    display the second plurality of ads on at least one interface of the second group of user terminals by transmitting, via the at least one network port, the second plurality of ads to the second group of user terminals.

2. The system of claim 1, wherein to generate the first plurality of ads, the at least one processor is further configured to cause the system to:
    obtain the first plurality of advertisement elements; and
    generate at least one of the first plurality of ads according to two of the obtained first plurality of advertisement elements.

3. The system of claim 2, wherein to obtain the first plurality of advertisement elements, the at least one processor is further configured to cause the system to:
    segment one or more pre-existing ads; and
    obtain at least one of the first plurality of advertisement elements based on the segmentation of the one or more pre-existing ads.

4. The system of claim 1, wherein:
    the plurality of information components includes a plurality of images, and
    the at least one processor is further configured to cause the system to:
    obtain a number of impressions of the first plurality of ads;
    determine, for each of the first plurality of advertisement elements, a click-through rate;
    determine, for each of the first plurality of images, a click-through rate; and
    determine a number of impressions of at least one of the first plurality of images based on click-through rates of the first plurality of advertisement elements, click-through rates of the first plurality of images, and the number of impressions of the first plurality of ads.

5. The system of claim 4, wherein to determine the number of impressions of the at least one of the plurality of images, the at least one processor is further configured to cause the system to:
    determine a weight of the at least one of the first plurality of images, the weight being a ratio of a click-through rate of the at least one of the first plurality of images to a click-through rate of an advertisement element including the at least one of the first plurality of images;
    determine a total weight of the first plurality of images, the total weight being a sum of weights of the first plurality of images; and
    determine the number of impressions of the at least one of the first plurality of images based on the weight of the at least one of the first plurality of images and the total weight of the first plurality of images.

6. The system of claim 1, wherein to determine the at least one of the click-through rate, the number of impressions, or the conversion rate of the first plurality of ads, the at least one processor is further configured to cause the system to:
    determine the at least one of the click-through rate, the number of impressions, or the conversion rate for of the first plurality of ads being displayed within a pre-determined time period.

7. The system of claim 1, wherein the at least one processor is further configured to cause the system to:

determine a number of clicks of each of the first plurality of ads;

determine a number of clicks of each of the first plurality of information components;

determine an average number of clicks of the first plurality of information components;

determine whether the average number of clicks of the first plurality of information components is greater than a threshold; and in response to the determination the average number of clicks is greater than the threshold, analyze the number of clicks of each of the first plurality of ads and the number of clicks of each of the first plurality of information components to obtain an analysis result.

8. The system of claim 7, wherein the analysis result includes at least one of: a ranking of the first plurality of ads or an analysis of the first plurality of information components.

9. The system of claim 7, wherein the threshold is 300.

10. The system of claim 1, wherein to determine the at least one of the click-through rate, the number of impressions, or the conversion rate of the first plurality of ads, the at least one processor is further configured to cause the system to:

rank the first plurality of ads according to the at least one of the click-through rate, the number of impressions or the conversion rate of the first plurality of ads.

11. The system of claim 10, the at least one processor is further configured to cause the system to:

assign a weight to the at least one of the click-through rate, the number of impressions or the conversion rate of the first plurality of ads to generate at least one of a weighted click-through rate, a weighted number of impressions, or a weighted conversion rate of the first plurality of ads;

determine a sum of the at least one of the weighted click-through rate, the weighted number of impressions, or the weighted conversion rate; and rank the first plurality of ads according to the sum of the at least one of the weighted click-through rate, the weighted number of impressions, or the weighted conversion rate.

12. The system of claim 10, the at least one processor is further configured to cause the system to:

assign a weight to the at least one of the click-through rate, the number of impressions or the conversion rate of the first plurality of information components to generate at least one of a weighted click-through rate, a weighted number of impressions, or a weighted conversion rate of the first plurality of information components;

determine a sum of the at least one of the weighted click-through rate, the weighted number of impressions, or the weighted conversion rate of the first plurality of information components; and rank the plurality of information components according to the sum of the at least one of the weighted click-through rate, the weighted number of impressions, or the weighted conversion rate of the first plurality of information components.

13. The system of claim 1, wherein the plurality of information components includes at least one of an image, a text, or a video.

14. The system of claim 1, wherein to determine the at least one of the click-through rate, the number of impressions, or the conversion rate of the first plurality of information components, the at least one processor is further configured to cause the system to:

determine a click-through rate of the first plurality of information components according to the click-through rate of the first plurality of ads;

determine a label of at least one of the first plurality of information components; and determine a click-through rate of the label according to the click-through rate of the first plurality of information components.

15. The system of claim 14, wherein to determine the label of the at least one of the first plurality of information components, the at least one processor is further configured to cause the system to:

acquire an identifier of the at least one of the first plurality of information components;

determine a physical attribute of the at least one of the first plurality of information components according to the identifier;

determine a position of the at least one of the first plurality of information components in an ad; and determine the label of the at least one of the first plurality of information components based on the physical attribute and the position.

16. The system of claim 15, wherein the physical attribute of the at least one of the first plurality of information component includes an area ratio of the at least one of the first plurality of information components in the ad, a color of the at least one of the first plurality of information components, a number of models included in the at least one of the first plurality of information components, a race of a model, a gender of a model included in the at least one of the first plurality of information components, or a package of a product included in the at least one of the first plurality of information components.

17. The system of claim 16, the at least one processor is further configured to cause the system to:

determine a label in an advertisement element level; and determine a click-through of the label in the advertisement element level.

18. The system of claim 17, wherein to determine the label in the advertisement element level, the at least one processor is further configured to cause the system to:

generate a first label related to physical attributes of an advertisement element; and generate a second label related to cultural attributes of the advertisement element.

19. A method for automatically displaying advertisements on interfaces of user terminals and implemented on a system comprising:

at least one network port to communicate with a first group of user terminals and a second group of user terminals via a network; and at least one processor coupled to the at least one network port;

the method comprising:

generating a first plurality of ads including a first plurality of advertisement elements, and each of the first plurality of advertisement elements including one or more information components of a first plurality of information components;

displaying the first plurality of ads on at least one interface of the first group of user terminals by transmitting, via the at least one network port, the first plurality of ads to the first group of user terminals;

determining at least one of a click-through rate, a number of impressions, or a conversion rate for the first plurality of ads associated with the first group of user terminals;

determining at least one of a click-through rate, a number of impressions or a conversion rate of the first plurality of information components based on the at least one of the click-through rate, the number of impressions or the conversion rate of the first plurality of ads;

obtaining a ranking of the first plurality of information components based on the at least one of a click-through rate, a number of impressions or a conversion rate of the first plurality of information components; and automatically generating a second plurality of ads including at least one information component of the first plurality of information components based, at least in part, on the ranking; and displaying the second plurality of ads on at least one interface of the second group of user terminals by transmitting, via the at least one network port, the second plurality of ads to the second group of user terminals.

20. The method of claim 19, wherein the generating the first plurality of ads comprises:

obtaining the first plurality of advertisement elements; and generating at least one of the first plurality of ads according to two of the obtained first plurality of advertisement elements.

* * * * *